United States Patent
De Rudder et al.

(10) Patent No.: US 9,598,999 B2
(45) Date of Patent: *Mar. 21, 2017

(54) INTEGRATED EXHAUST TREATMENT DEVICE HAVING COMPACT CONFIGURATION

(71) Applicant: DONALDSON COMPANY, INC., Minneapolis, MN (US)

(72) Inventors: Korneel De Rudder, Winkswele (BE); Stephane Le Merdy, Roullours (FR); Bart Schellens, Heverlee (BE); Nic Degelin, Baal (BE); Corine Chauvin, Brussels (BE); Jeffrey Curtis Gillen, Faribault, MN (US)

(73) Assignee: Donaldson Company, Inc., Minneapolis, MN (US)

( * ) Notice: Subject to any disclaimer, the term of this patent is extended or adjusted under 35 U.S.C. 154(b) by 73 days.

This patent is subject to a terminal disclaimer.

(21) Appl. No.: 14/395,632

(22) PCT Filed: Apr. 19, 2013

(86) PCT No.: PCT/IB2013/001048
§ 371 (c)(1),
(2) Date: Oct. 20, 2014

(87) PCT Pub. No.: WO2013/156856
PCT Pub. Date: Oct. 24, 2013

(65) Prior Publication Data
US 2015/0132192 A1    May 14, 2015

Related U.S. Application Data

(60) Provisional application No. 61/635,677, filed on Apr. 19, 2012.

(51) Int. Cl.
*B01D 53/94* (2006.01)
*F01N 3/28* (2006.01)
(Continued)

(52) U.S. Cl.
CPC ....... *F01N 3/2892* (2013.01); *B01D 53/9431* (2013.01); *B01F 3/04049* (2013.01);
(Continued)

(58) Field of Classification Search
None
See application file for complete search history.

(56) References Cited

U.S. PATENT DOCUMENTS 2,561,457 A   7/1951  Beales et al.
2,898,202 A   8/1959  Houdry et al.
(Continued)

FOREIGN PATENT DOCUMENTS

DE    42 03 807 A1    8/1993
DE    199 55 013 A1   5/2001
(Continued)

OTHER PUBLICATIONS

Johansen et al. Novel Base Metal-Palladium Catalytic Diesel Filter Coating with NO2 Reducing Properties. Society of Automotive Engineers of Japan, Inc. 2007, pp. 1-9. http://www.topsoe.com/sites/default/files/sae_paper_2007_01_1921.ashx_0.pdf.*

(Continued)

*Primary Examiner* — Walter D Griffin
*Assistant Examiner* — Jelitza Perez
(74) *Attorney, Agent, or Firm* — Merchant & Gould P.C.

(57) ABSTRACT

An exhaust treatment device is disclosed. The exhaust treatment device has a compact configuration that includes integrated reactant dosing, reactant mixing and contaminant removal/treatment. The mixing can be achieved at least in (Continued)

part by a swirl structure and contaminant removal can include NO$_x$ reduction.

19 Claims, 52 Drawing Sheets

(51) Int. Cl.
| | | |
|---|---|---|
| *F01N 3/00* | (2006.01) | |
| *F01N 3/20* | (2006.01) | |
| *B01F 3/04* | (2006.01) | |
| *B01F 5/00* | (2006.01) | |

(52) U.S. Cl.
CPC ............. *F01N 3/00* (2013.01); *F01N 3/2066* (2013.01); *F01N 3/28* (2013.01); *B01F 2005/0088* (2013.01); *F01N 2240/20* (2013.01); *F01N 2470/18* (2013.01); *F01N 2610/02* (2013.01); *Y02T 10/24* (2013.01); *Y10T 137/87652* (2015.04)

(56) References Cited

U.S. PATENT DOCUMENTS

| | | |
|---|---|---|
| 2,946,651 A | 7/1960 | Houdry et al. |
| 3,048,376 A | 8/1962 | Howald |
| 3,072,457 A | 1/1963 | Bloch |
| 3,779,335 A | 12/1973 | Chelminski |
| 3,863,678 A | 2/1975 | Pettersson et al. |
| 3,867,508 A | 2/1975 | Hass |
| 3,964,875 A | 6/1976 | Chang |
| 4,498,786 A | 2/1985 | Ruscheweyh |
| 4,902,487 A | 2/1990 | Cooper et al. |
| 4,916,897 A | 4/1990 | Hayashi et al. |
| 5,138,834 A | 8/1992 | Maund |
| 5,272,871 A | 12/1993 | Oshima et al. |
| 5,315,824 A | 5/1994 | Takeshima |
| 5,489,153 A | 2/1996 | Berner et al. |
| 5,540,897 A | 7/1996 | Chu et al. |
| 5,601,792 A | 2/1997 | Hug et al. |
| 5,653,105 A | 8/1997 | Noirot et al. |
| 5,662,869 A | 9/1997 | Abe et al. |
| 5,693,299 A | 12/1997 | Chopin et al. |
| 5,701,735 A | 12/1997 | Kawaguchi |
| 5,772,972 A | 6/1998 | Hepburn et al. |
| 5,884,474 A | 3/1999 | Topsøe |
| 5,916,134 A | 6/1999 | Yang et al. |
| 5,941,069 A | 8/1999 | Heath |
| 5,992,141 A | 11/1999 | Berriman |
| 6,041,594 A | 3/2000 | Brenner |
| 6,050,088 A | 4/2000 | Brenner |
| 6,192,677 B1 | 2/2001 | Tost |
| 6,199,375 B1 | 3/2001 | Russell |
| 6,294,141 B1 | 9/2001 | Twigg et al. |
| 6,312,650 B1 | 11/2001 | Frederiksen et al. |
| 6,314,722 B1 | 11/2001 | Matros et al. |
| 6,401,449 B1 | 6/2002 | Hofmann |
| 6,442,933 B2 | 9/2002 | Rusch |
| 6,444,177 B1 | 9/2002 | Müller et al. |
| 6,449,947 B1 | 9/2002 | Liu et al. |
| 6,539,708 B1 | 4/2003 | Hofmann et al. |
| 6,546,717 B1 | 4/2003 | Chandler et al. |
| 6,606,854 B1 | 8/2003 | Siefker |
| 6,680,037 B1 | 1/2004 | Allansson et al. |
| 6,689,327 B1 | 2/2004 | Reck |
| 6,712,869 B2 | 3/2004 | Cheng |
| 6,722,123 B2 | 4/2004 | Liu |
| 6,722,124 B2 | 4/2004 | Pawson et al. |
| 6,770,252 B2 | 8/2004 | Cheng |
| 6,824,743 B1 | 11/2004 | Pawson et al. |
| 6,863,874 B1 | 3/2005 | Twigg |
| 6,935,105 B1 | 8/2005 | Page et al. |
| 7,104,251 B2 | 9/2006 | Kim |
| 7,168,241 B2 | 1/2007 | Rudelt et al. |
| 7,448,206 B2 | 11/2008 | Meingast et al. |
| 7,537,083 B2 | 5/2009 | Frederiksen |
| 7,712,305 B2 | 5/2010 | Kapsos et al. |
| 7,877,983 B2 | 2/2011 | Kunkel et al. |
| 8,015,802 B2 | 9/2011 | Nishiyama et al. |
| 8,499,548 B2 | 8/2013 | De Rudder et al. |
| 8,539,758 B2 | 9/2013 | Muller-Haas |
| 2002/0162322 A1 | 11/2002 | Ganzmann et al. |
| 2003/0003029 A1 | 1/2003 | Rogers et al. |
| 2003/0079467 A1 | 5/2003 | Liu et al. |
| 2003/0108457 A1 | 6/2003 | Gault et al. |
| 2003/0226539 A1 | 12/2003 | Kim |
| 2004/0040782 A1 | 3/2004 | Frederiksen |
| 2004/0237511 A1 | 12/2004 | Ripper et al. |
| 2007/0101703 A1 | 5/2007 | Kanaya et al. |
| 2007/0144158 A1 | 6/2007 | Girard |
| 2007/0189936 A1 | 8/2007 | Suwabe et al. |
| 2007/0274877 A1 | 11/2007 | Bush et al. |
| 2008/0041052 A1 | 2/2008 | Doring et al. |
| 2008/0141662 A1 | 6/2008 | Schuster et al. |
| 2008/0245060 A1 | 10/2008 | Stieglbauer |
| 2009/0000287 A1 | 1/2009 | Blaisdell et al. |
| 2009/0019843 A1 | 1/2009 | Levin et al. |
| 2009/0173063 A1 | 7/2009 | Boorse et al. |
| 2009/0205327 A1 | 8/2009 | Kabat et al. |
| 2010/0107612 A1 | 5/2010 | Yamazaki et al. |
| 2010/0139258 A1 | 6/2010 | Hackett et al. |
| 2010/0199645 A1 | 8/2010 | Telford |
| 2010/0212301 A1* | 8/2010 | De Rudder ........... F01N 3/2066 60/299 |
| 2011/0113759 A1 | 5/2011 | Tilinski et al. |
| 2011/0167810 A1 | 7/2011 | Lebas et al. |
| 2011/0219755 A1 | 9/2011 | Muller-Haas |
| 2011/0308234 A1 | 12/2011 | De Rudder et al. |

FOREIGN PATENT DOCUMENTS

| | | |
|---|---|---|
| DE | 20 2006 011281 | 9/2006 |
| DE | 10 2007 009890 | 9/2008 |
| DE | 10 2007 012790 | 9/2008 |
| DE | 10 2008 031136 | 1/2010 |
| DE | 10 2008 048796 | 3/2010 |
| EP | 0319299 | 6/1989 |
| EP | 0 555 746 A1 | 8/1993 |
| EP | 0628706 | 12/1994 |
| EP | 0666099 | 8/1995 |
| EP | 0758713 | 2/1997 |
| EP | 0839996 | 5/1998 |
| EP | 0849441 | 6/1998 |
| EP | 0862941 | 9/1998 |
| EP | 1 054 722 | 11/2000 |
| EP | 0 779 415 B1 | 5/2001 |
| EP | 1 262 644 | 12/2002 |
| EP | 1 109 993 B1 | 5/2003 |
| EP | 1 054 139 B1 | 3/2004 |
| EP | 1 712 753 A2 | 10/2006 |
| EP | 1 770 253 A1 | 4/2007 |
| EP | 1 890 016 A2 | 2/2008 |
| EP | 1947307 | 7/2008 |
| EP | 1 712 756 B1 | 3/2009 |
| EP | 2 111 916 | 10/2009 |
| EP | 2168672 | 3/2010 |
| FR | 2 384 206 | 10/1978 |
| GB | 2 381 218 A | 4/2003 |
| GB | 2 434 557 A | 8/2007 |
| JP | 11-166410 | 6/1999 |
| JP | 2003-232218 | 8/2003 |
| JP | 2005-273564 | 10/2005 |
| JP | 2006-105414 | 4/2006 |
| JP | 2006-205077 | 8/2006 |
| JP | 2008-128093 | 6/2008 |
| JP | 2008-309000 | 12/2008 |
| JP | 2009-144614 | 7/2009 |
| WO | WO 97/01387 | 1/1997 |
| WO | WO 99/44725 | 9/1999 |
| WO | WO 01/04466 A1 | 1/2001 |
| WO | WO 01/42630 | 6/2001 |
| WO | WO 03/004839 A1 | 1/2003 |
| WO | WO 03/036056 A1 | 5/2003 |
| WO | WO 03/104624 A2 | 12/2003 |

(56) References Cited

FOREIGN PATENT DOCUMENTS

| WO | WO 2006/009056 | 1/2004 |
|---|---|---|
| WO | WO 2004/033866 A1 | 4/2004 |
| WO | WO 2004/038192 | 5/2004 |
| WO | WO 2004/113690 | 12/2004 |
| WO | WO 2005/073524 A1 | 8/2005 |
| WO | WO 2006/010922 | 2/2006 |
| WO | WO 2006/014129 | 2/2006 |
| WO | WO 2008/061734 A1 | 5/2008 |
| WO | WO 2008/111254 | 9/2008 |
| WO | WO 2009/012885 | 1/2009 |
| WO | WO 2009/157995 | 12/2009 |
| WO | WO 2010/032077 | 3/2010 |
| WO | WO 2011/126930 | 10/2011 |

OTHER PUBLICATIONS

International Search Report for International Application No. WIPO/IB2013/001048 mailed Nov. 20, 2013 (4 pages).
International Search Report and Written Opinion from WIPO/US2009/068529 mailed Mar. 16, 2010 (12 pages).
Jungmin Seo, "Aftertreatment Package Design for SCR Performance Optimization" Apr. 12, 2011, *SAE International*, 7 pages.
Alano et al., "Compact SCR for Passenger Cars" Apr. 12, 2011, *SAE International*, 9 pages.
Akiyoshi et al., "Development of Efficient Urea-SCR Systems for EPA 2010-Compliant Medium Duty Diesel Vehicles" Apr. 12, 2011, *SAE International*, 8 pages.

\* cited by examiner

INTEGRATED EXHAUST TREATMENT DEVICE HAVING COMPACT CONFIGURATION

CROSS-REFERENCE TO RELATED APPLICATION

The present patent application is a National Stage Application of PCT/IB2013/001048, filed Apr. 19, 2013, which claims the benefit of U.S. Provisional Patent Application Ser. No. 61/635,677, filed Apr. 19, 2012, and which applications are hereby incorporated by reference in their entirety. To the extent appropriate, a claim of priority is made to each of the above disclosed applications.

BACKGROUND

Vehicles equipped with diesel engines typically include exhaust systems that have aftertreatment components such as selective catalytic reduction catalyst devices, lean NOx catalyst devices, or lean NOx trap devices to reduce the amount of undesirable gases, such as nitrogen oxides (NOx) in the exhaust. For these types of aftertreatment devices to work properly, a doser injects reactants, such as urea, ammonia, or hydrocarbons, into the exhaust gas. As the exhaust gas and reactants flow through the aftertreatment device, the exhaust gas and reactants convert the undesirable gases, such as NOx, into more acceptable gases, such as nitrogen and oxygen. However, the efficiency of the aftertreatment system depends upon how evenly the reactants are mixed with the exhaust gases. Example exhaust treatment devices are disclosed at U.S. Patent Publication Nos. US 2011/0167810; US 2010/0212301; and US 2009/0000287. There is also a need for exhaust treatment devices that are compact and that provide efficient and effective mixing of reactants.

SUMMARY

The present disclosure relates generally to compact exhaust treatment devices that include integrated reactant dosing, reactant mixing and contaminant removal/treatment. The present disclosure also relates to mixing arrangements that mix reactant within an exhaust stream over a relatively short length.

The present disclosure also relates to an exhaust treatment device having an outer housing that includes opposite first and second end walls and a length that extends between the first and second end walls. The outer housing also includes a side wall that extends along the length from the first end wall to the second end wall. The outer housing defines an interior space. The exhaust treatment device also has a divider wall within the interior space of the outer housing. The divider wall is positioned at an intermediate location along the length of the outer housing. The divider wall separates the interior space of the outer housing into a first region and a second region. The first region is defined between the divider wall and the first end wall and the second region are defined between the divider wall and the second end wall. The exhaust treatment device includes a device inlet that is in fluid communication with the first region of the interior space. The exhaust treatment device has a device outlet that is in fluid communication with the second region of the interior space and an exhaust treatment substrate mounted in the second region of the interior space. The exhaust treatment device has an exhaust treatment and mixing assembly that includes a swirl chamber positioned adjacent to the first end wall of the outer housing, a mixing passage that is defined by an inner conduit that extends along the length of the outer housing. The mixing passage provides fluid communication between the swirl chamber and the second region of the interior space;

The exhaust treatment and mixing assembly also includes an exhaust passage that surrounds the inner conduit. The exhaust passage is configured to direct exhaust flow into the swirl chamber. The exhaust treatment and mixing assembly further includes a swirl structure for swirling the exhaust flow directed from the exhaust passage into the swirl chamber. The exhaust treatment devices includes a dispenser mounting location provided at the first end wall of the outer housing for mounting a dispenser used for dispensing a reactant into the swirl chamber.

The present disclosure also relates to an exhaust treatment device having an outer housing that includes opposite first and second end walls and a length that extends between the first and second end walls. The outer housing also includes a cylindrical side wall that extends along the length from the first end wall to the second end wall. The cylindrical side wall defines a central longitudinal axis of the outer housing that extends along the length of the outer housing. The outer housing defines an interior space. The exhaust treatment device also has a divider wall within the interior space of the outer housing. The divider wall is positioned at an intermediate location along the length of the outer housing. The divider wall separates the interior space of the outer housing into a first region and a second region. The first region is defined between the divider wall and the first end wall and the second region is defined between the divider wall and the second end wall. The exhaust treatment device also has a device inlet that is defined through the cylindrical side wall. The device inlet is in fluid communication with the first region of the interior space. The exhaust treatment device has a device outlet that is in fluid communication with the second region of the interior space and a $NO_x$ treatment substrate that is mounted in the second region of the interior space. The exhaust treatment device also has an exhaust treatment and mixing assembly that includes a swirl chamber positioned adjacent to the first end wall of the outer housing and a mixing passage defined by an inner conduit that is co-axially aligned with the central longitudinal axis of the outer housing. The mixing passage extends from the swirl chamber to the divider wall. The mixing passage provides fluid communication between the swirl chamber and the second region of the interior space. The exhaust treatment and mixing assembly also has an annular exhaust passage defined between the inner conduit and an outer conduit that surrounds the inner conduit. The annular exhaust passage is configured to direct exhaust flow into the swirl chamber. Additionally, the exhaust treatment and missing assembly includes a first swirl structure for swirling the exhaust flow directed from the annular exhaust passage into the swirl chamber and an annular exhaust treatment substrate positioned within the annular exhaust passage for treating the exhaust that flows through the annular exhaust passage. The exhaust treatment device has a dispenser mounting location for mounting a dispenser used for dispensing a reactant into the exhaust treatment and mixing assembly.

The present disclosure further relates to an exhaust treatment device having an outer housing and an inlet for directing exhaust into the outer housing and an outlet for directing the exhaust from the outer housing. The exhaust treatment device also has a ring-shaped exhaust treatment substrate that has a hollow interior and a conduit that defines a mixing passage. The conduit is positioned within the outer housing. The conduit extends through the hollow interior of the ring-shaped exhaust treatment substrate. Furthermore, the exhaust treatment device has a dispenser for dispensing reactant into the outer housing. The reactant is mixed with the exhaust within the mixing passage of the conduit. The exhaust enters the outer housing at the inlet, flows through the conduit that extends through the ring-shaped exhaust treatment substrate, reverses direction after passing through the conduit and flows through a media of the exhaust treatment structure for treatment before reaching the device outlet.

The present disclosure also relates to a mixing arrangement having a conduit that defines a central longitudinal axis and a swirl structure for swirling exhaust about the central longitudinal axis. The mixing arrangement also has a swirl concentrator for intensifying swirl within the conduit. The swirl concentrator defines a flow opening aligned with the central longitudinal axis. The flow opening has a cross-dimension CD1 that is smaller than a corresponding cross-dimension CD2 of a passage of the conduit. The swirl structure is located upstream from the swirl concentrator. The mixing arrangement has a reactant dispenser positioned upstream from the swirl concentrator. The reactant dispenser is configured to spray reactant along the central longitudinal axis and through the flow opening. The reactant dispenser is positioned and configured such that the reactant spray does not impinge upon an upstream side of the swirl concentrator.

A variety of additional aspects will be set forth in the description that follows. These aspects can relate to individual features and to combinations of features. It is to be understood that both the foregoing general description and the following detailed description are exemplary and explanatory only and are not restrictive of the broad concepts upon which the embodiments disclosed herein are based.

DRAWINGS

FIG. 1 schematically depicts an exhaust treatment system in accordance with the principles of the present disclosure;

DETAILED DESCRIPTION

Reference will now be made in detail to the exemplary aspects of the present disclosure that are illustrated in the accompanying drawings. Wherever possible, the same reference numbers will be used throughout the drawings to refer to the same or like structure.

Aspect of the present disclosure relate to exhaust treatment devices adapted for use in treating exhaust gas generated by engines such as diesel engine. In certain examples, exhaust treatment devices in accordance with the principles of the present disclosure can be used to treat exhaust generated by diesel engines of vehicles such as over-the-road trucks, off-road vehicles (e.g., agricultural vehicles such as tractors, construction vehicles such as graders, bull-dozers, front end loaders, or other vehicles). Certain aspects of the present disclosure result in an exhaust treatment device that is relatively compact and can be readily mounted under the vehicle hood, under the vehicle cabin, adjacent the vehicle hood, adjacent the vehicle cabin or elsewhere on the vehicle. In certain examples, exhaust treatment devices in accordance with the principles if the present disclosure can be mounted horizontally, vertically or at an angle.

Figure 1:
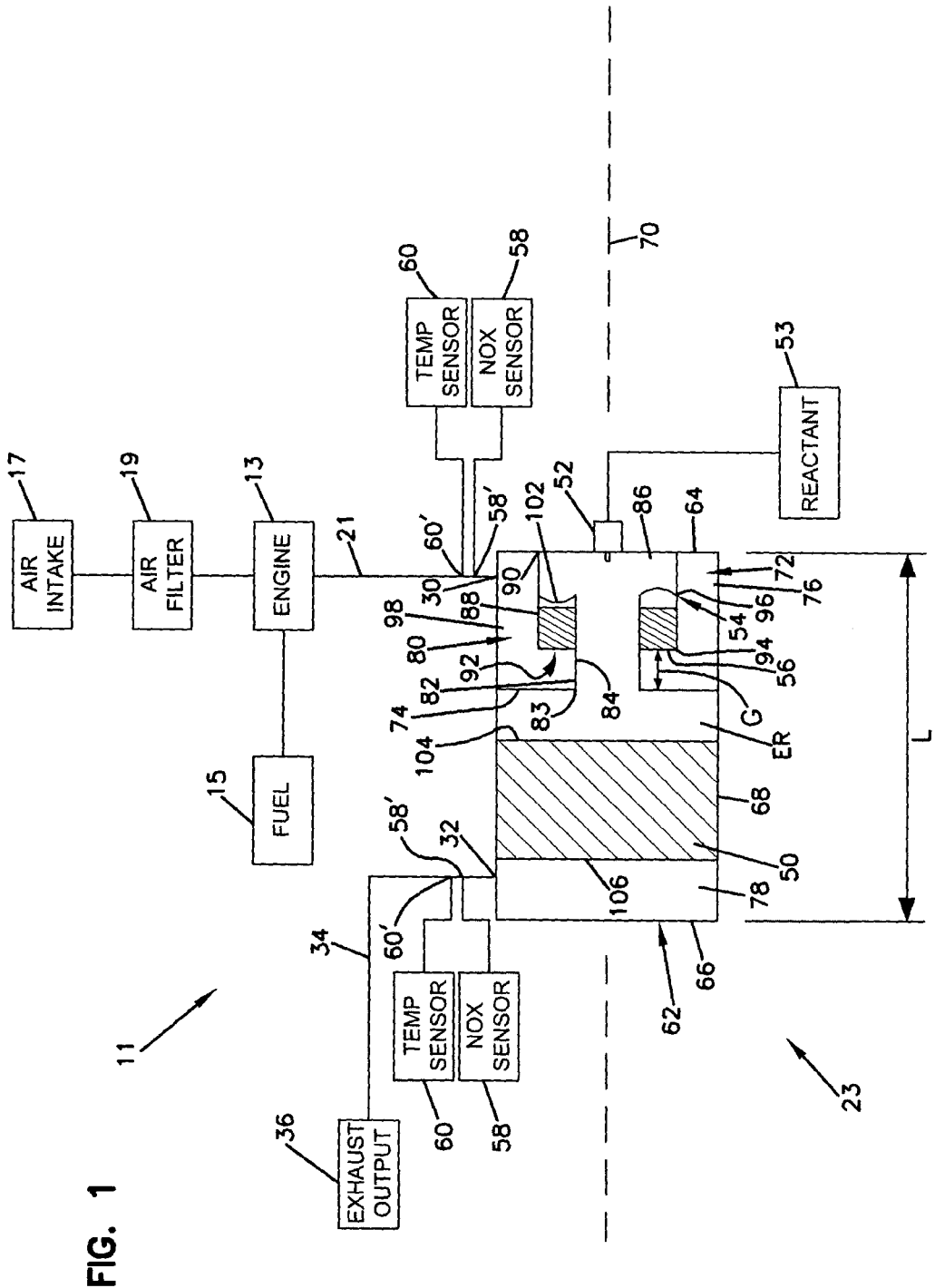
Figure 2:
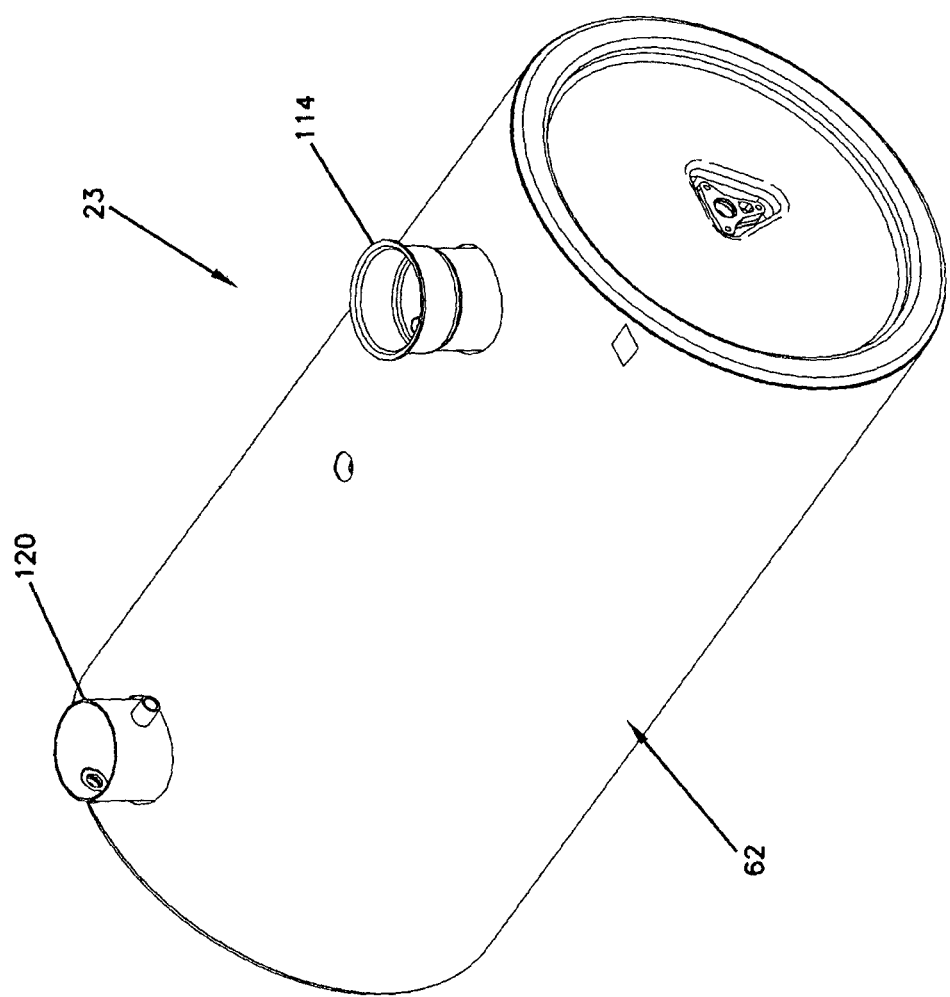
FIG. 2 is a perspective view of an exhaust treatment device in accordance with the principles of the present disclosure.
Figure 3:
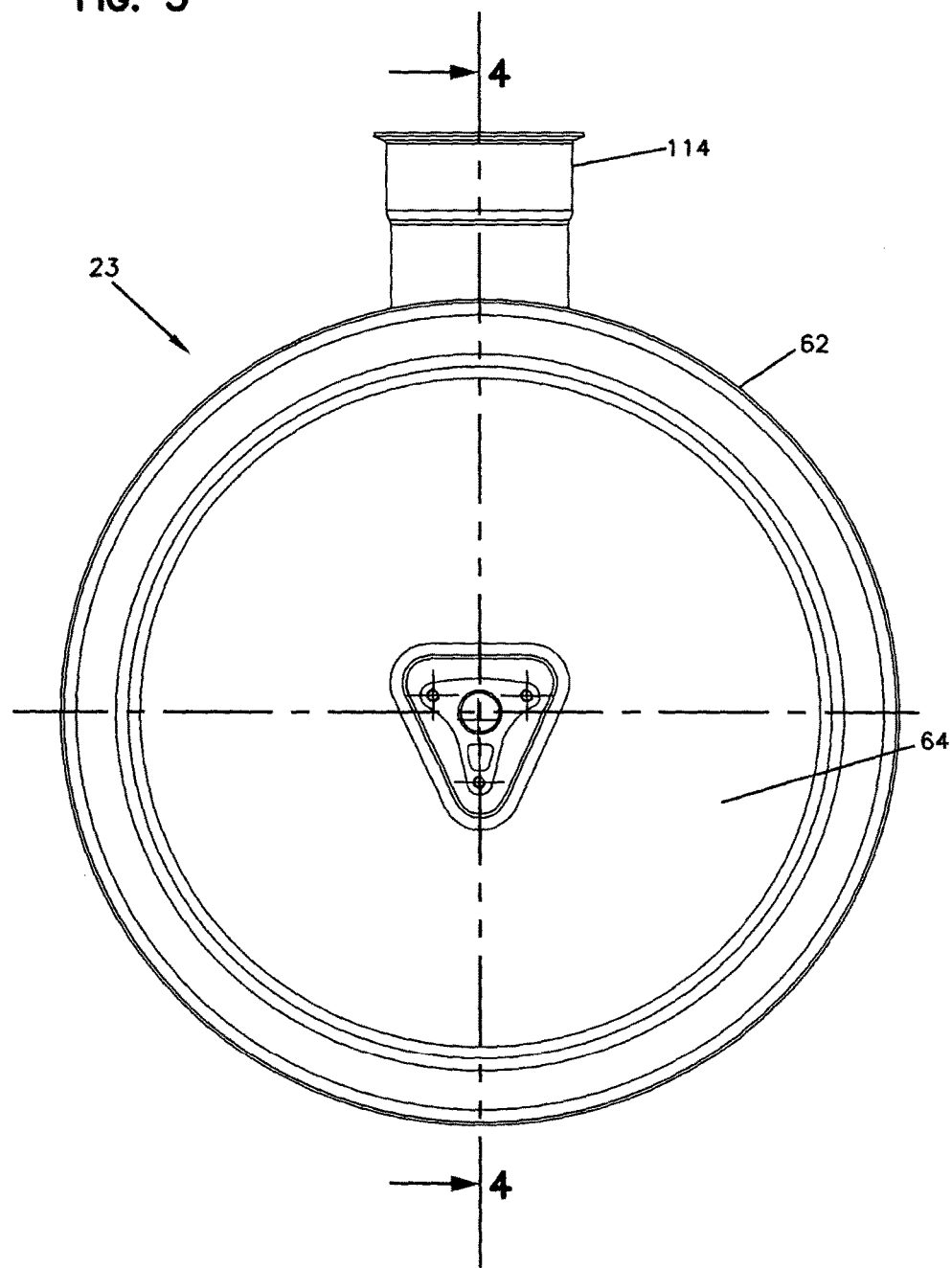
FIG. 3 is an end view of the exhaust treatment device of FIG. 2.

Referring now to FIG. 1, an engine exhaust system, generally designated 11, is shown. The engine exhaust system 11 includes an engine 13, a fuel tank 15 for supplying fuel (e.g., diesel fuel) to the engine 13, an air intake 17, an air filter 19, and an exhaust conduit 21 for conveying exhaust gas away from the engine 13. The engine exhaust system 11 also includes an exhaust treatment device 23 in fluid communication with the exhaust conduit 21. The exhaust treatment device 23 includes a device inlet 30 that receives exhaust from the exhaust conduit 21 and a device outlet 32 that directs treated exhaust to an exhaust conduit 34. The exhaust conduit 34 carries the treated exhaust to an exhaust outlet 36 in fluid communication with atmosphere. An exhaust treatment device such as a diesel particulate filter (e.g., a flow-through filter, a wall flow filter, etc.) or a diesel oxidation catalyst can optionally be provided upstream or downstream from the exhaust treatment device 23. Also, a noise abatement structure such as a muffler can be provided along the exhaust conduit 34.

The exhaust treatment device 23 is preferably configured to reduce the concentration of $NO_x$ (or other contaminants/pollutants) present in the exhaust stream. In a preferred embodiment, the exhaust treatment device 23 includes a treatment substrate for contaminants, particularly a $NO_x$ treatment substrate 50 (e.g. a SCR substrate, a lean NOx catalyst substrate, a lean $NO_x$ trap or other structure, an SCR coated filter (e.g., an SCR coated DPF or flow-through filter), etc.) for removing $NO_x$ (or other contaminants such as $SO_2$, CO, VOCs, etc.) from the exhaust stream. The exhaust treatment device 23 also includes a doser 52 (e.g., an injector, a spray nozzle, or other dispensing structure) that supplies a reactant (e.g., urea (e.g., aqueous urea), ammonia, hydrocarbons or other reducing agents) suitable for reacting with $NO_x$ (or other contaminants such as SO2, CO, VOCs, etc.) at the $NO_x$ treatment substrate 50 to reduce the overall concentration of contaminants such as $NO_x$ in the exhaust stream. The doser 52 is positioned upstream from the $NO_x$ treatment substrate 50. The exhaust treatment device 23 further includes a mixing arrangement 54 that generates turbulence (e.g., swirling) for assisting in mixing and volatilizing the reactant from the doser 52 before the reactant reaches the $NO_x$ treatment substrate 50. In certain examples, substrate 50 can include multiple substrates arranged in series within the device 23 at a location downstream from the doser 52 and the mixing arrangement 54 (e.g., a DPF, a SCR substrate, and an optional DOC (e.g., a reactant oxidation catalyst for oxidizing excess reactant) arranged in series). In certain embodiments, the exhaust treatment device 23 includes an optional exhaust treatment substrate 56 positioned upstream from the mixing arrangement 54. By way of example, the exhaust treatment substrate 56 can include a catalytic converter or a flow-through filter (example flow-through filters are disclosed at U.S. Pat. Nos. 7,340,888 and 7,862,640, which are hereby incorporated by reference in their entireties). In other examples the exhaust treatment substrate 56 can be eliminated from the device 23 and/or provided by a separate device provided upstream form the device 23. The exhaust treatment device 23 also includes contaminant sensors 58 (e.g., $NO_x$ sensors) and temperature sensors 60. In the depicted embodiment, one set of sensors 58, 60 is positioned adjacent the device inlet 30 and a second set of sensors 58, 60 as positioned adjacent the device outlet 32. Ports 58' are contaminant sensor ports and ports 60' are temperature sensor ports.

It will be appreciated that the various components of the exhaust treatment device 23 are relatively positioned to provide a compact configuration. While the configuration is compact, the components are configured such that the reactants from the doser 52 are effectively mixed and volatized prior to reaching the $NO_x$ treatment substrate 50 such that the $NO_x$ treatment substrate 50 efficiently removes $NO_x$ (or other contaminants such as $SO_2$, CO, VOCs, etc.) from the exhaust stream. In certain embodiments, the exhaust treatment device 23 has a volume less than or equal to 24 liters and is adapted to treat an exhaust flow up to 650 kilograms per hour at rated power. In other embodiments, the exhaust treatment device has a volume less than or equal to 95 liters, and is adapted to treat an exhaust flow up to 1700 kilograms per hour at rated power. In other embodiments, the exhaust treatment device has a volume less than or equal to 135 liters, and is adapted to treat an exhaust flow up to 2000 kilograms per hour at rated power. In still other embodiments, the ratio of the volume of the exhaust treatment device (liters) to the exhaust flow for which the exhaust treatment device is intended to treat (kilograms per hour at rated power) is in the range of 0.03 to 0.07. In certain embodiments, the upstream face of the $NO_x$ treatment substrate 50 is spaced less than 750 millimeters from the doser 52. In other embodiments, the upstream face of the $NO_x$ treatment substrate 50 is spaced in the range of 230-750 millimeters from the doser 52. Referring still to FIG. 1, the exhaust treatment device 23 includes an outer housing 62 including a length L that extends between first and second opposite end walls 64, 66 of the outer housing 62. The outer housing also includes a side wall 68 that extends along the length L from the first end wall 64 to the second end wall 66. In one embodiment, the side wall 68 is cylindrical, but elliptical shapes, oval shapes, rectangular shapes or other shapes could also be used. The side wall 68 defines a central longitudinal axis 70 of the outer housing 62. The central longitudinal axis 70 extends along the length L of the outer housing 62. The outer housing 62 defines an interior space 72 of the exhaust treatment device 23.

The exhaust treatment device 23 also includes a divider wall 74 positioned within the interior space 72 of the outer housing 62. The divider wall 74 is positioned at an intermediate location along the length L of the outer housing 62. The divider wall 74 separates the interior space 72 of the outer housing 62 into a first region 76 and a second region 78. The first region 76 is defined between the first end wall 64 and the divider wall 74. The second region 78 is defined between the second end wall 68 and the divider wall 74. The doser 52 is positioned in the first region 76, the $NO_x$ treatment substrate 50 is positioned in the second region 78, and the mixing arrangement 54 is positioned between the doser 52 and the $NO_x$ treatment substrate 50.

The device inlet 30 is in fluid communication with the first region 76 of the interior space 72 and the device outlet 32 is in fluid communication with the second region 78 of the interior space 72. In a preferred embodiment, the device inlet 30 is defined through the side wall 68 of the outer housing 62 and is configured for directing exhaust flow into the first region 76. It will be appreciated that the device inlet 30 can have a radial configuration, a tangential configuration or an angled configuration. Additionally, in other embodiments, the device inlet 30 can be an axial inlet defined through the first end wall 64. The device outlet 32 is shown being defined through the side wall 68 and is configured for receiving exhaust flow from the second region 78 and for directing the exhaust flow out of the outer housing 62. Similar to the device inlet, device outlet 32 can have a radial configuration, a tangential configuration or an angled configuration. Additionally, in other embodiments, the device outlet 32 can have an axial configuration in which the device outlet 32 is defined through the second end wall 66.

The mixing arrangement 54 is part of an exhaust treatment and mixing assembly 80 positioned within the interior space 72. The exhaust treatment and mixing assembly 80 includes an inner conduit 82 (e.g., a mixing tube) defining a mixing passage 84 that is coaxially aligned with the central longitudinal axis 70 of the outer housing 62. The inner conduit 82 provides fluid communication between the first region 76 and the second region 78 of the interior space 72. As shown at FIG. 1, the inner conduit 82 extends from a swirl chamber 86 of the mixing arrangement 54 to the divider wall 74. The inner conduit 82 provides fluid communication between the swirl chamber 86 and the second region 78 of the interior space 72. The inner conduit 82 is attached to the divider wall 74 adjacent an end 83 of the inner conduit 82. In one embodiment, the divider wall 74 separates the first region 76 of the interior space 72 from the second region 78 of the interior space 72 such that only the mixing passage 84 provides fluid communication between the first and second regions 76, 78.

The exhaust treatment and mixing assembly 80 further includes an outer conduit 88 that surrounds the inner conduit 82. An end 90 of the outer conduit 88 is attached to the first end wall 64 of the outer housing 62. An exhaust passage 92 is defined between the inner conduit 82 and the outer conduit 88. In one embodiment, the inner conduit 82 and the outer conduit 88 are cylindrical, and the exhaust passage 92 is annular. In other embodiments, the inner and outer conduits 82 and 88 can be oval, rectangular, elliptical, or have other shapes. The exhaust passage 92 is configured to direct exhaust flow to the swirl chamber 86. The exhaust passage 92 includes a first end 94 and an opposite second end 96. The first end 94 is spaced from the divider wall 74 by a gap G which forms an axial spacing between the first end 94 and the divider wall 74. The second end 96 is positioned adjacent the swirl chamber 86. An outer portion 98 of the first region 76 of the interior space 72 surrounds the outer conduit 88. The outer portion 98 is depicted as being annular in shape. The outer portion 98 of the first region 76 of the interior space 72 defines a region for directing/transitioning exhaust flow from the device inlet 30 to the gap G. From the gap G, exhaust flows into the exhaust passage 92 through the first end 94. The exhaust then flows through the exhaust passage 92 and exits the exhaust passage 92 through the second end 96 into the swirl chamber 86.

The exhaust treatment substrate 56 is positioned within the exhaust passage 92. In one embodiment, exhaust treatment substrate 56 is a catalytic converter substrate. In another embodiment, the exhaust treatment substrate 56 is a flow-through filter substrate. In embodiments that include an exhaust treatment substrate 56, it will be appreciated that the exhaust treatment substrate 56 provides some initial treatment of the exhaust gas before the exhaust gas is directed to the swirl chamber 86.

The mixing arrangement 54 of the exhaust treatment and mixing assembly 80 includes a swirl structure 102 positioned at the second end 96 of the exhaust passage 92. The swirl structure 102 preferably includes a configuration adapted for causing the exhaust flow that exits the second end 96 of the exhaust passage 92 to swirl about the central longitudinal axis 70 of the outer housing 62. In certain embodiments, the swirl structure 102 can include scoops, baffles, vanes, deflectors, bent tubes, angled tubes, or other structures adapted for causing the exhaust flow to rotate or swirl about the central longitudinal axis 70 within the swirl chamber 86. Example swirl structures are disclosed at U.S. Patent Publication Nos. US2011/0167810; US2010/0212301; and US2009/0000287, which are hereby incorporated by reference in their entireties.

The exhaust treatment and mixing assembly 80 further includes the doser 52. Shown at FIG. 1, the doser 52 is mounted to the first end wall 64. In one embodiment, the doser 52 aligns with the central longitudinal axis 70 of the outer housing 62. In use of the doser 52, reactant from a reactant source 53 is dispensed (e.g., sprayed, injected, etc.) into the swirling exhaust within the swirl chamber 86. The swirling exhaust within the swirl chamber 86 provides turbulence for uniformly mixing the reactant in the exhaust. The swirling action is carried from the swirl chamber 86 into the mixing passage 84 of the inner conduit 82. Thus, mixing of the reactant with the exhaust continues as the exhaust flows through the inner conduit 82. The swirling continues as the exhaust exits the inner conduit 92 and enters the second region 78 of the interior space 72. An exhaust expansion region ER is defined between the inner conduit 82 and the $NO_x$ treatment substrate 50. Uniform mixing of the reactant has preferably occurred by the time the exhaust reaches an upstream face 104 of the $NO_x$ treatment substrate 50. By uniformly distributing the reactant within the exhaust stream, the efficiency of the chemical reactions that take place at the NO$_x$ treatment substrate 50 can be optimized by ensuring that a maximum surface area of the NO$_x$ treatment substrate 50 is used. After the exhaust passes through a downstream face 106 of the NO$_x$ treatment substrate 50, the exhaust exits the outer housing 62 through the device outlet 32.

Figure 4:
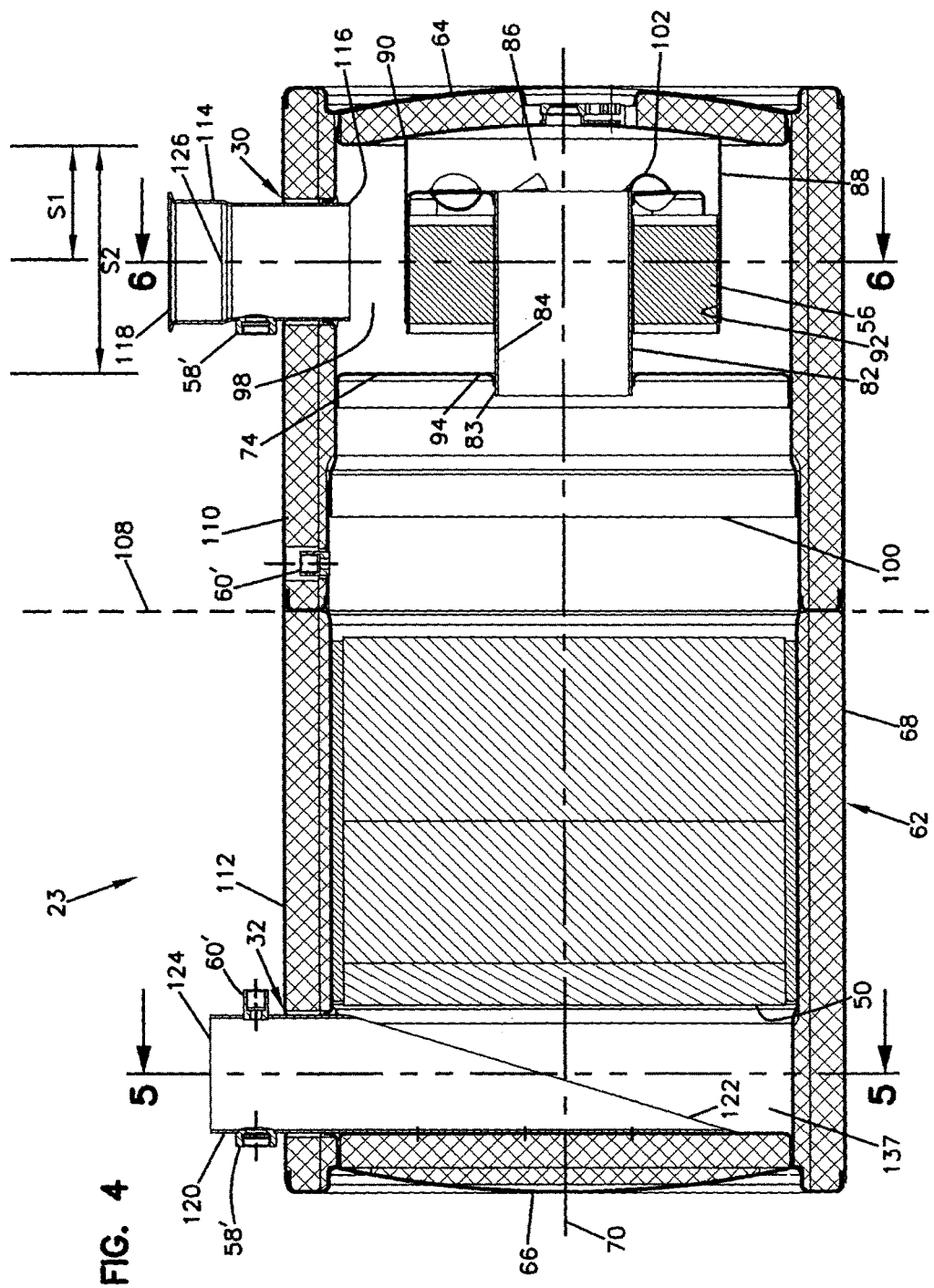
FIG. 4 is a cross-sectional view taken along section line 4-4 of FIG. 3.

Referring to FIGS. 2-6, more detailed drawings of the exhaust treatment device 23 are provided. As shown at FIG. 4, a reference bisection plane 108 divides the outer housing 62 into a first half 110 and a second half 112. The device inlet 30 and the device outlet 32 are preferably on opposite sides of the bisection plane 108. For example, the device inlet 30 is shown at the first half 110 of the outer housing 62 and the device outlet 32 is shown at the second half 112 of the outer housing 62. In one embodiment, the device inlet 30 is closer to the first end wall 64 than to the bisection plane 108.

Referring to FIG. 4, the device inlet 30 is shown including an inlet pipe 114 that extends through the side wall 68. Inlet pipe 114 includes an inner end 116 in direct fluid communication with the outer portion 98 of the first region 76 of the interior space 72. The inlet pipe 114 also includes an outer end 118 adapted for connection to another pipe, such as the exhaust conduit 21 (FIG. 1).

The device outlet 32 is shown including an outlet pipe 120 that extends through the side wall 68. The outlet pipe 120 has an inner end 122 that is mitered (i.e., cut at an angle). Outlet pipe 120 also includes an outer end 124 adapted for connection to a conduit such as the exhaust conduit 34.

Figure 5:
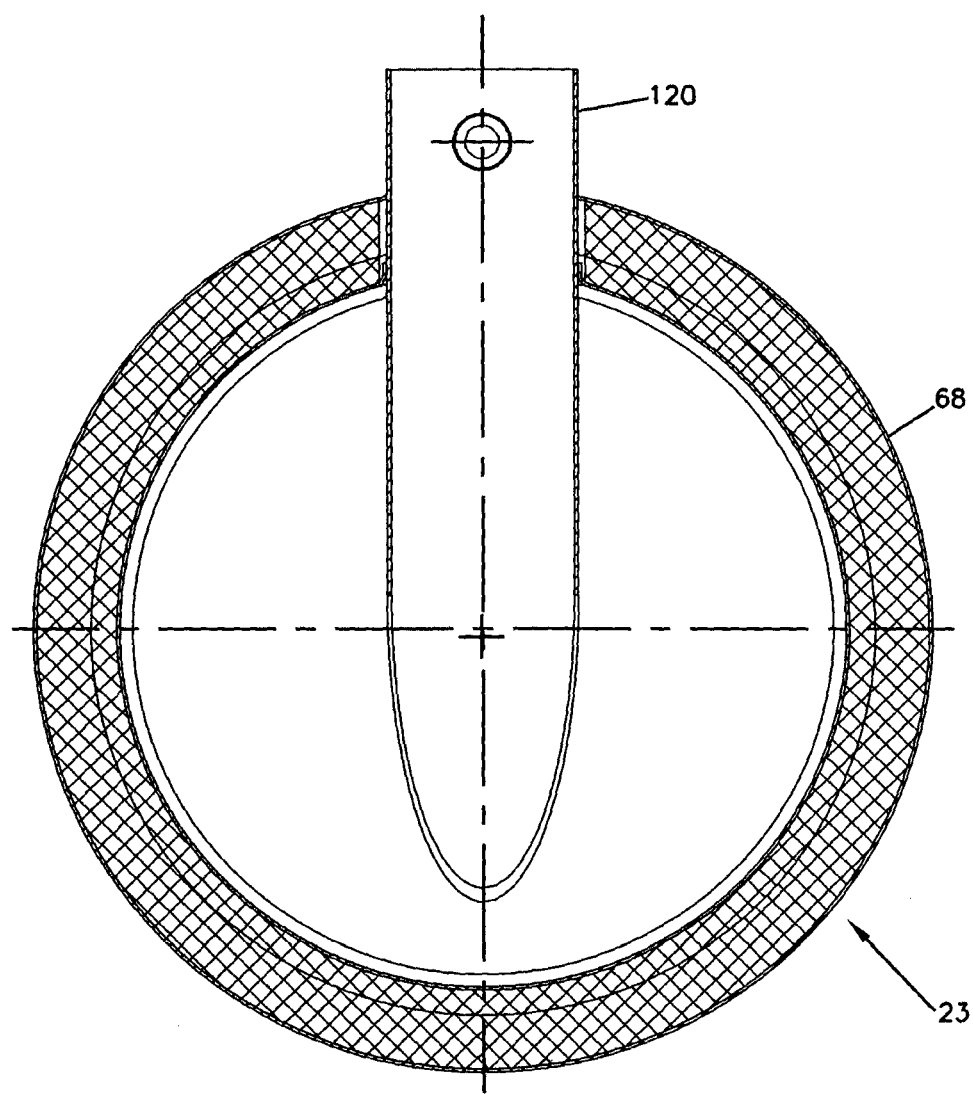
FIG. 5 is a cross-sectional view taken along section line 5-5 if FIG. 4.
Figure 6:
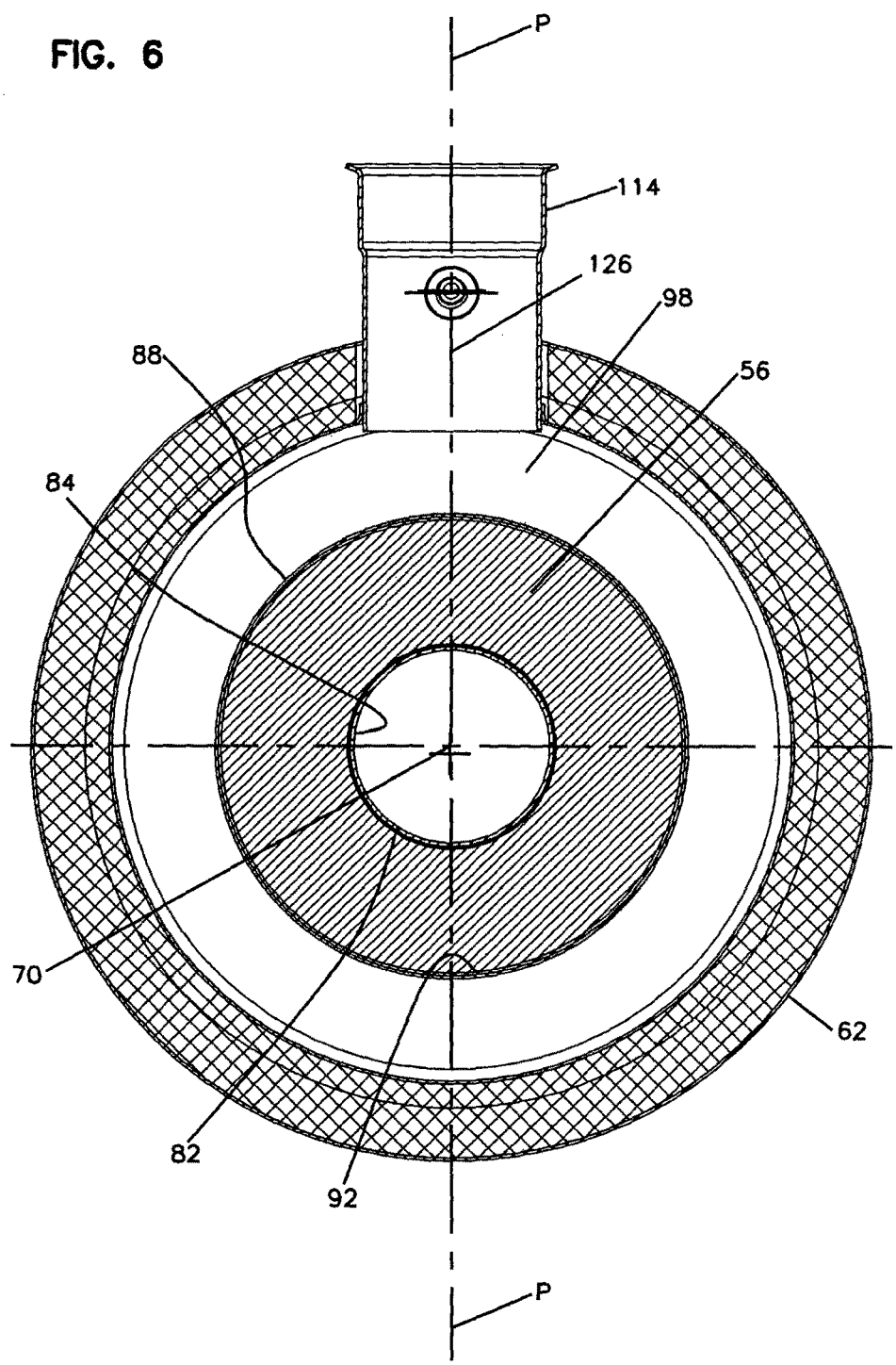
FIG. 6 is a cross-sectional view taken along section line 6-6 of FIG. 4.

Referring to FIGS. 4-6, the first end wall 64, the second end wall 66 and the side wall 68 are preferably insulated. For example, each of the walls 64, 66 and 68 has a multilayer construction including an insulation layer sandwiched between an inner layer or wall and an outer layer or a wall.

Referring to FIG. 4, the inlet pipe 114 has centerline 126 that intersects the exhaust treatment substrate 56 and the inner conduit 82. In the depicted embodiment, the centerline 126 is aligned along a plane P that bisects the inner and outer conduits 82, 88 and intersects the central longitudinal axis 70 of the outer housing (see FIG. 6). In the depicted embodiment, the inlet pipe 114 is located at an axial position that at least partially axially overlaps the outer conduit 88. More particularly, the inlet pipe 114 is shown at an axial position that completely axially overlaps the axial position of the outer conduit 88. In certain embodiments, at least a portion of the inlet pipe 114 is located at an axial position that is axially between the first end 94 of the exhaust passage 92 and the first end wall 64. In certain embodiments, at least a portion of the inlet pipe 114 is axially closer to the first end wall 64 than the first end 94 of the exhaust passage 92 of the depicted embodiment. The centerline 126 of the inlet pipe 114 is shown positioned at a first spacing S1 from the first end wall 64 that is smaller than a second spacing S2 defined between the first end wall 64 and the first end 94 of the exhaust passage 92. Because of this configuration, at least a portion of the exhaust flow input into the first regions 76 through the inlet pipe 114 initially flows within the outer portion 98 along the flow path FP in a direction toward the second end wall 66 before entering the gap G and reversing directions to flow through the exhaust passage 92 in a direction toward the first end wall 64.

Figure 7:
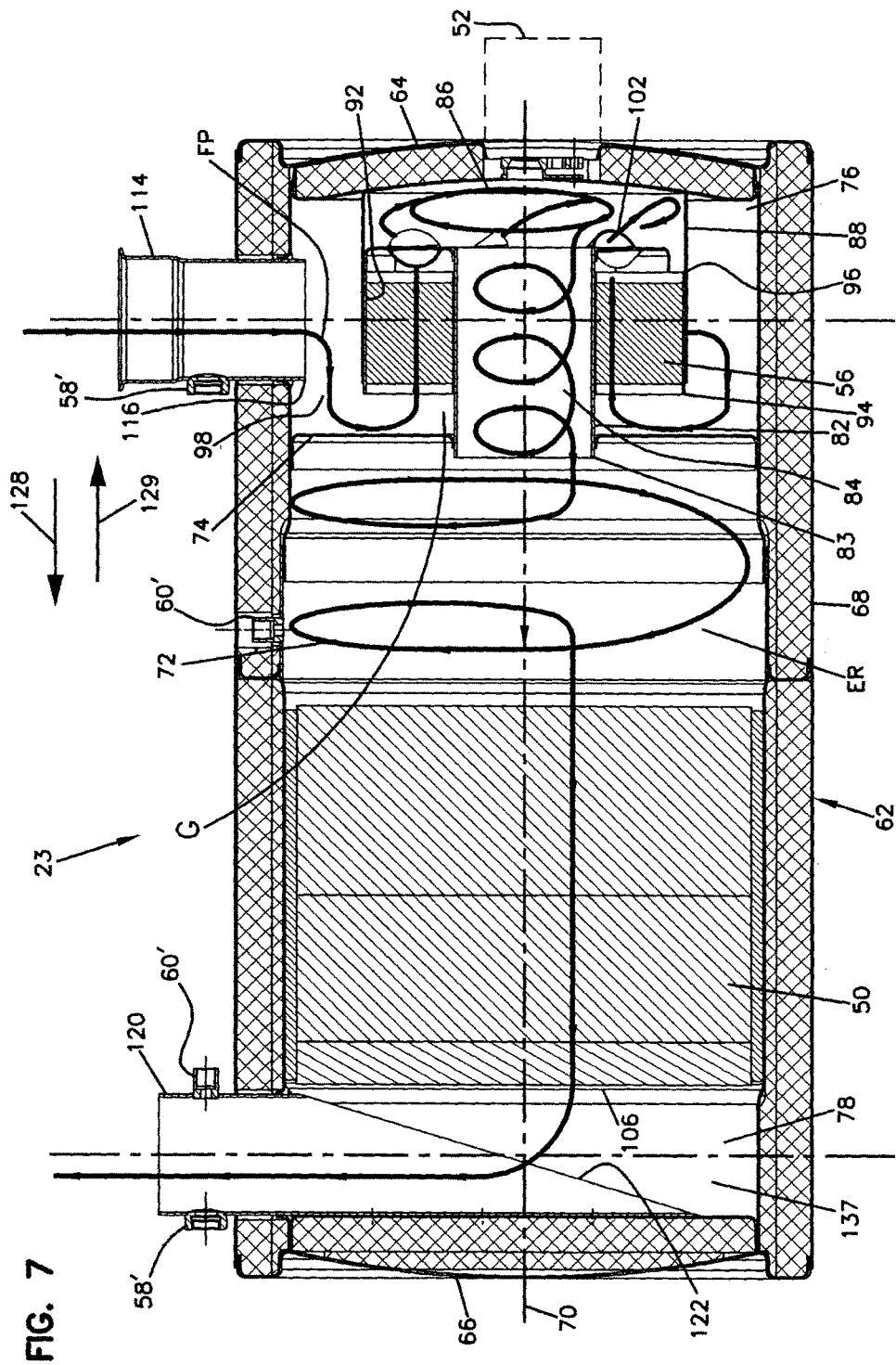
FIG. 7 shows an exhaust flow path for the exhaust treatment device of FIGS. 2-6.

The flow routing path FP for the exhaust treatment device 23 is shown at FIG. 7. As shown at FIG. 7, the exhaust enters the interior space 72 of the outer housing 62 through the inlet pipe 114. Specifically, from the inner end 116 of the inlet pipe 114, the exhaust flows into the outer portion 98 of the first region 76 of the interior space 72. Within the outer portion 98, the exhaust flows along the flow path FP at least partially in a direction 128 oriented toward the second end wall 66 of the outer housing 62. Thus, the flow within the outer portion 98 is directed toward the divider wall 74. The divider wall 74 directs the flow to the gap G. From the gap G, the exhaust flows through the exhaust passage 92 and from the first end 94 toward the second end 96. The exhaust within the passage 92 flows through the exhaust treatment device 56 and flows at least partially in a direction 129 oriented toward the first end wall 64. At the second end 96, the swirl structure 102 causes the exhaust exiting the exhaust passage 92 to be swirled within the swirl chamber 86 about the central longitudinal axis 70.

The doser 52 injects reactant into the swirling exhaust within the swirl chamber 86. The swirling exhaust within the swirl chamber 86 flows into the mixing passage 84 and flows back toward the second end wall 66 at least partially in the direction 128. As the exhaust flows in the mixing passage 84, the swirling motion generated by the swirl structure 102 is maintained. The swirling exhaust flows through the mixing passage 84 and exits the end 83 of the inner conduit 82 into the expansion region ER defined by the second region 78 of the interior space 72. The exhaust, with the reactant contained therein, then flows through the NO$_x$ treatment substrate 50 where at least a portion if the NO$_x$ within the exhaust is removed from the exhaust stream. After passing through the NO$_x$ treatment substrate 50, the exhaust flows through a transition space 137 defined between the downstream face 106 of the NO$_x$ treatment substrate 50 and the second end wall 66 of the outer housing 62. From the transition space 137, the exhaust enters the inner end 122 of the outlet pipe 120 and exits the exhaust treatment device 23 through the outlet pipe 120.

Figure 8:
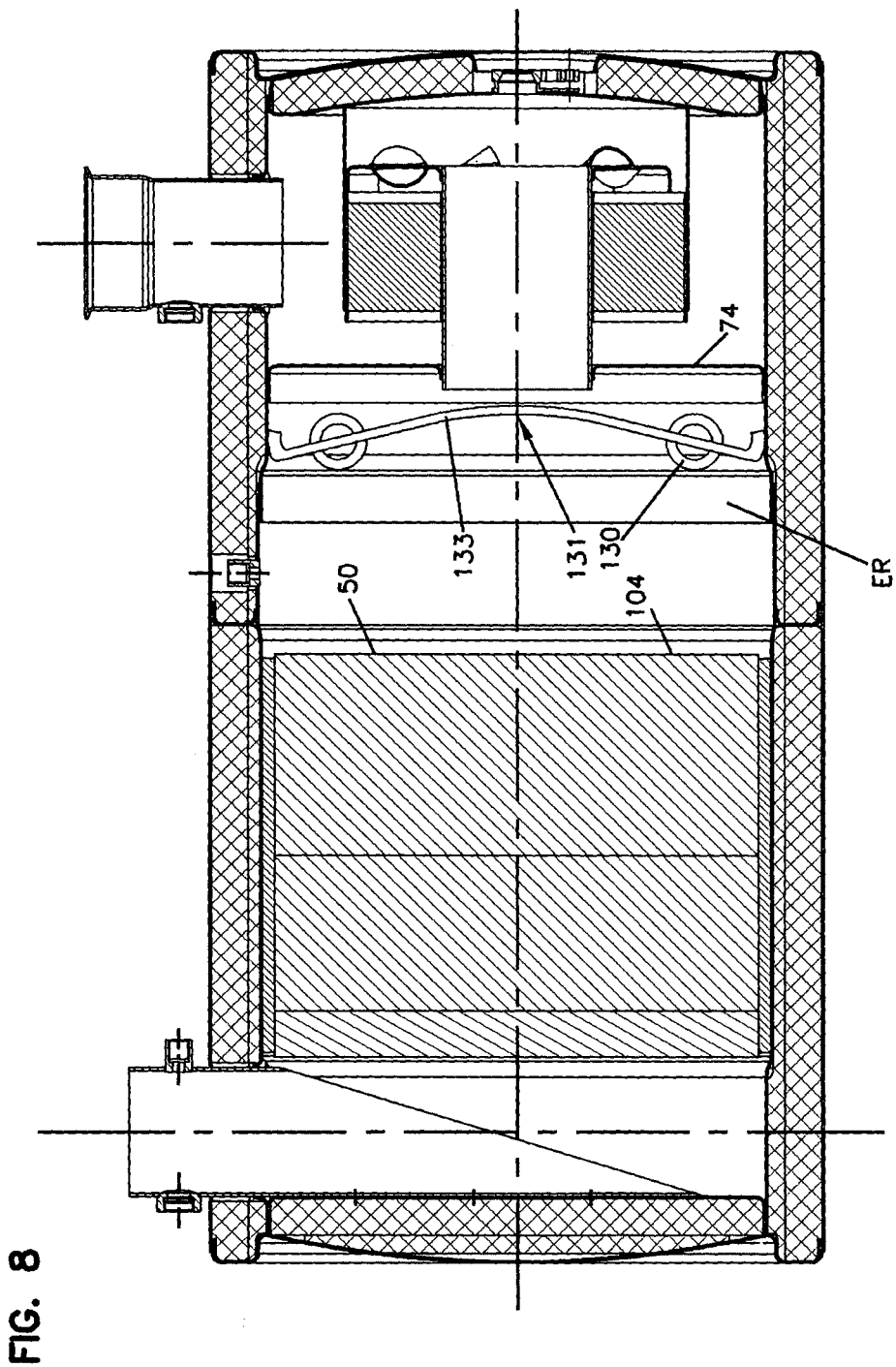
FIG. 8 shows the exhaust treatment device of FIGS. 2-6 modified to include an additional swirling structure.

FIG. 8 shows the exhaust treatment device 23 of FIGS. 2-6 with the addition of an extra swirl structure 131 positioned between the divider wall 74 and the upstream face 104 of the NO$_x$ treatment substrate 50. The swirl structure 131 is adapted for providing the exhaust with additional swirling action in the expansion region ER between the divider wall 74 and the upstream face 104 of the NO$_x$ treatment substrate 50. As shown, the swirl structure 131 includes a plate 133 defining swirl elements 130 for generating the swirling action. It will be appreciated that the swirl elements 130 can include louvers, scoops or any of the other swirl structures identified above.

Figure 9:
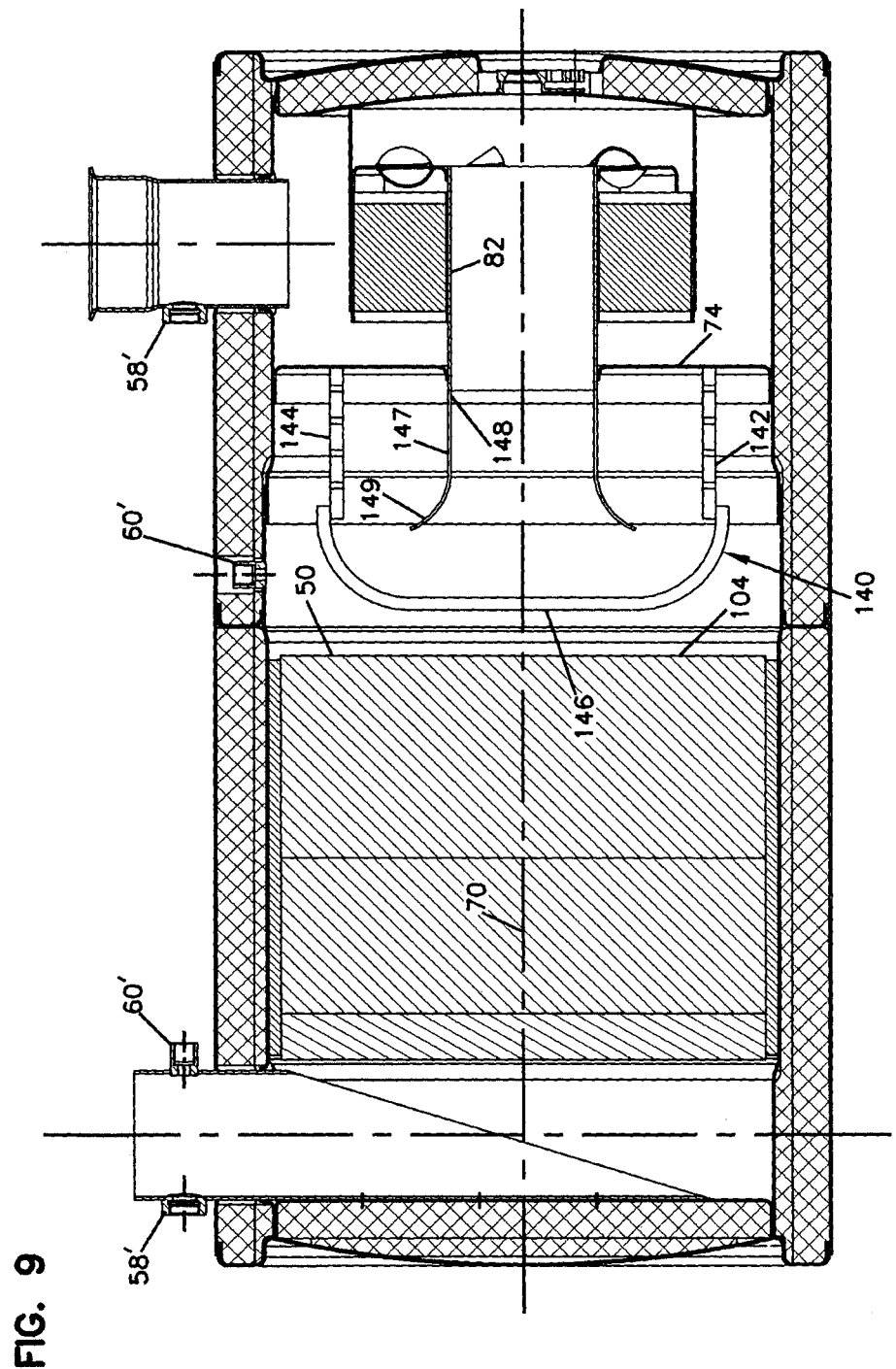
FIG. 9 shows the exhaust treatment device of FIGS. 2-6 modified to include an additional flow distribution structure.

FIG. 9 shows the exhaust treatment device 23 of FIGS. 2-6 modified to include an additional mixing structure 140 between the divider wall 74 and the upstream face 104 of the NO$_x$ treatment substrate 50. The mixing structure 140 includes a housing 142 having a perforated side wall 144 that surrounds the central longitudinal axis 70 and an end cap 146 that encloses an axial end of the housing 142. The mixing structure 140 also includes an extension 147 that extends outwardly from the inner conduit 82 along the central longitudinal axis 70. A first end 148 of the extension 147 receives flow from the inner conduit 82 while an opposite second end 149 directs exhaust flow into the interior of the housing 142. The second end 149 of the extension 147 can have a bell-mouthed configuration. In use of the mixing structure 140, exhaust from the inner conduit 82 flows through the extension 147 and enters the housing 142 through the bell-mouth of the extension 147. The flow then reverses directions and exits the housing 142 through the perforated side wall 144. Perforations in the perforated side wall 144 assist in distributing the flow uniformly across the upstream face 104 of the NO$_x$ treatment substrate 50. The perforations can include openings, slots, louvers or other structures.

Figure 10:
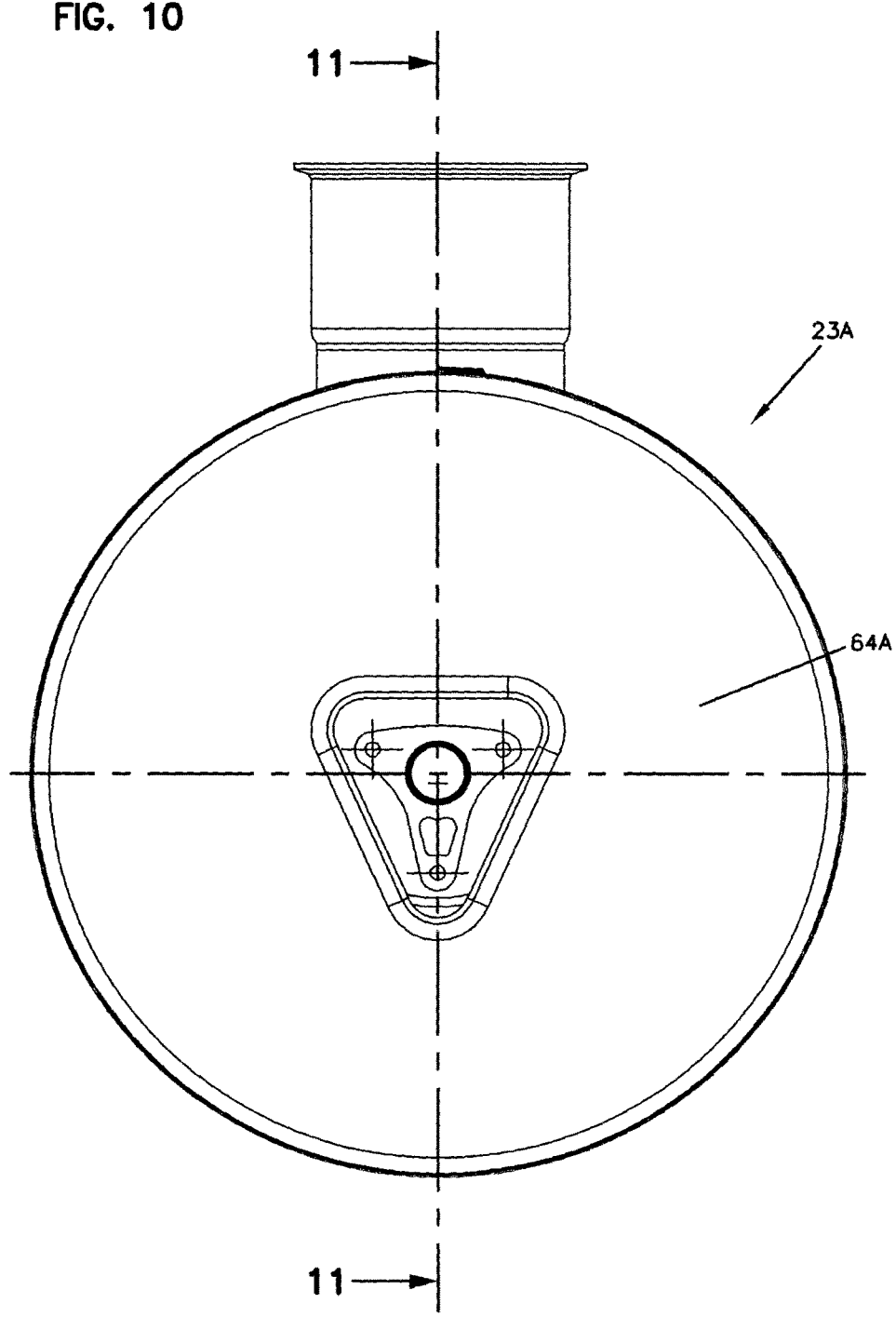
FIG. 10 is an end view of a second exhaust treatment device in accordance with the principles of the present disclosure.
Figure 11:
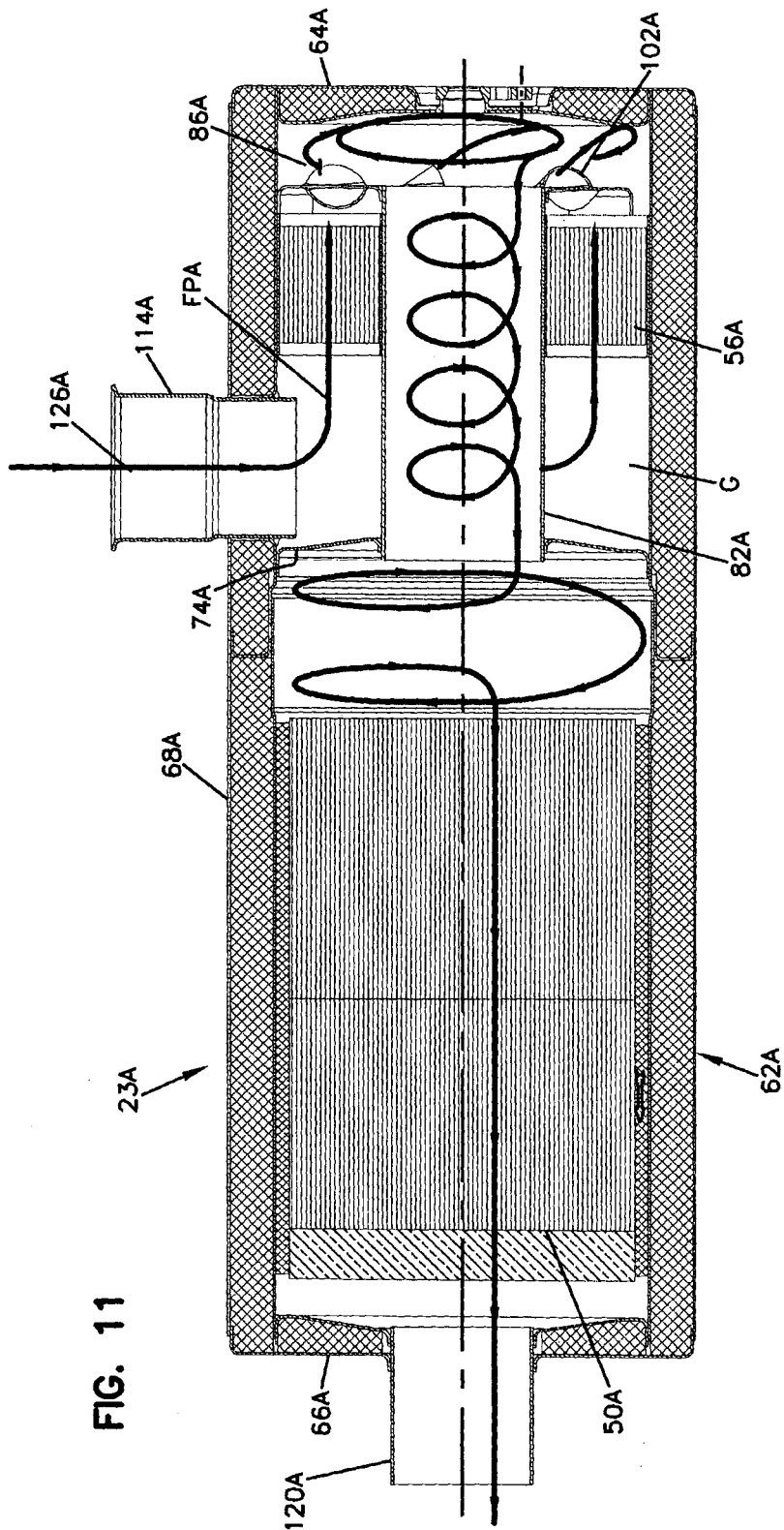
FIG. 11 is a cross-sectional view taken along section line 11-11 on FIG. 10.
Figure 12:
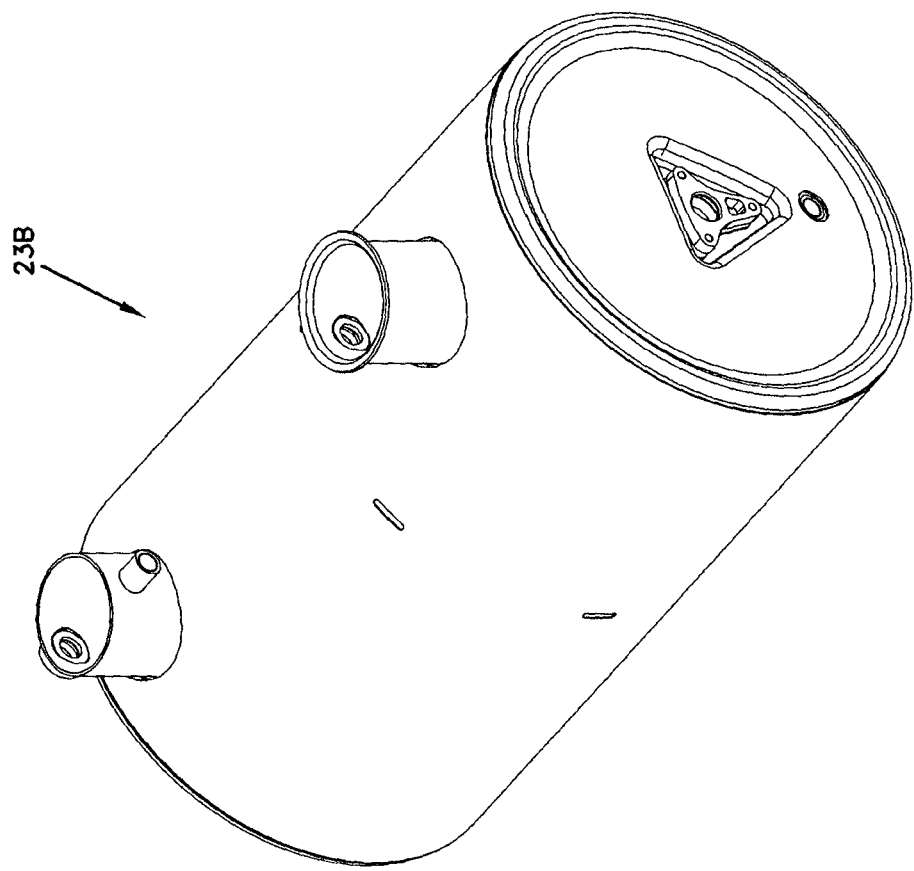
FIG. 12 is a perspective view of a third exhaust treatment device in accordance with the principles of the present disclosure.
Figure 13:
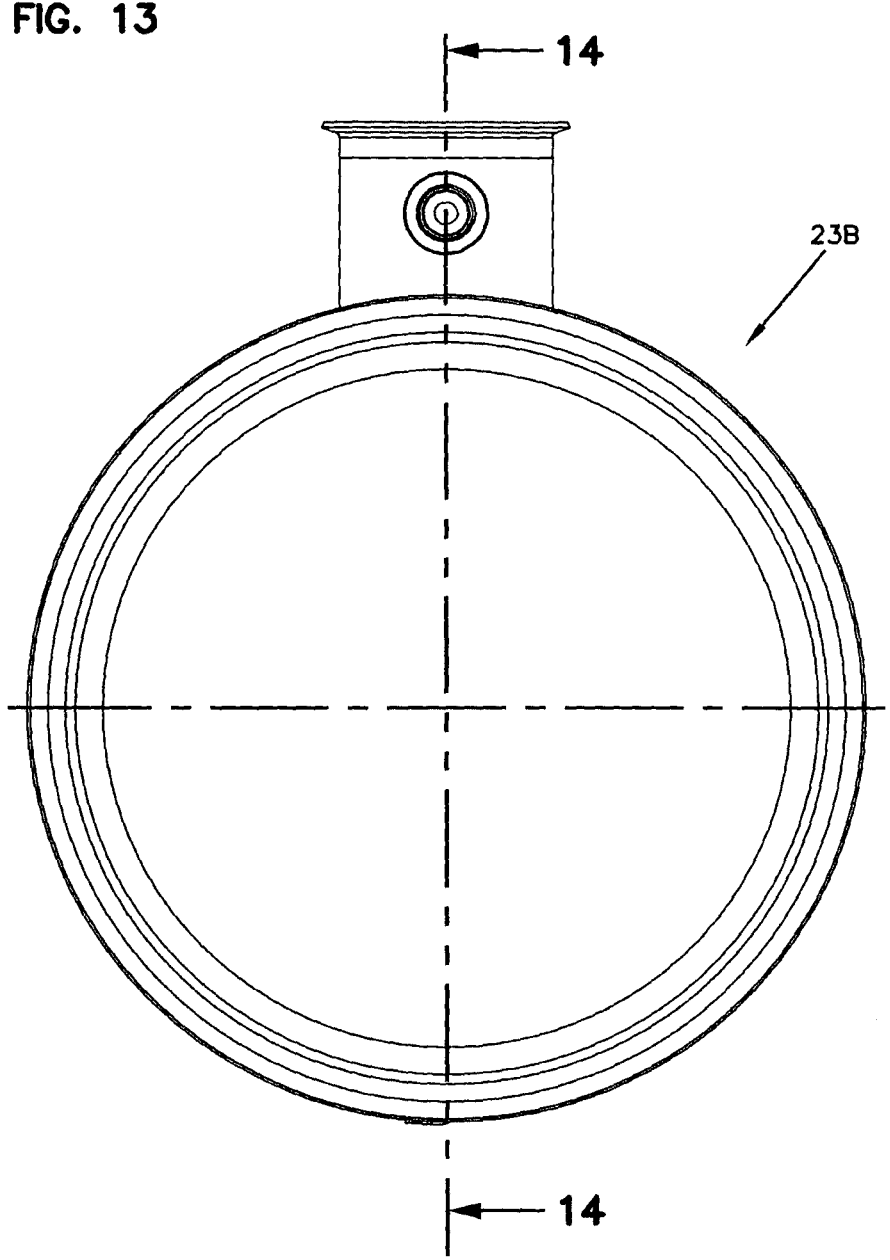
FIG. 13 is an end view of the exhaust treatment device of FIG. 12.
Figure 14:
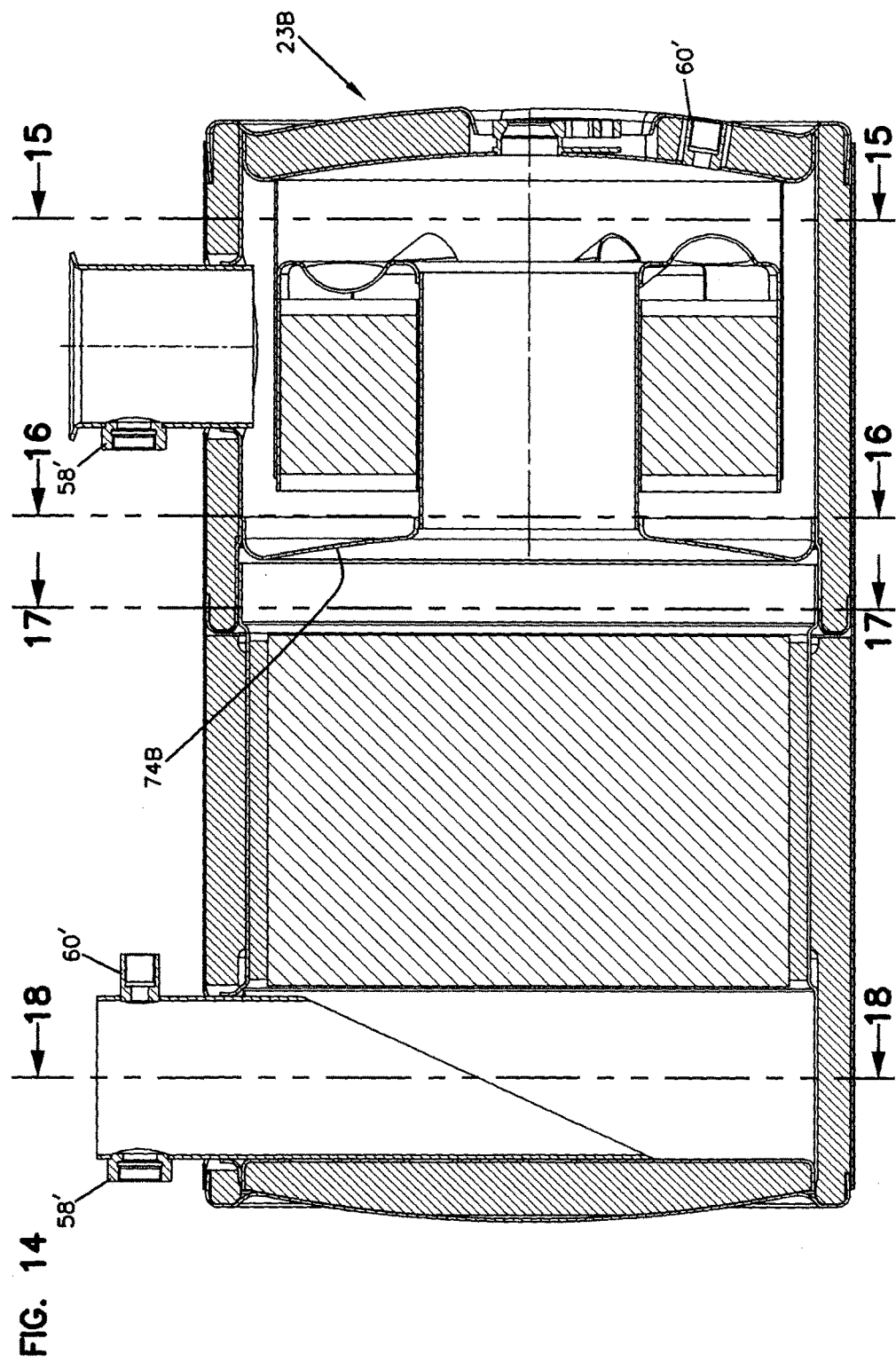
FIG. 14 is a cross-sectional view taken along section line 14-14 of FIG. 13.
Figure 15:
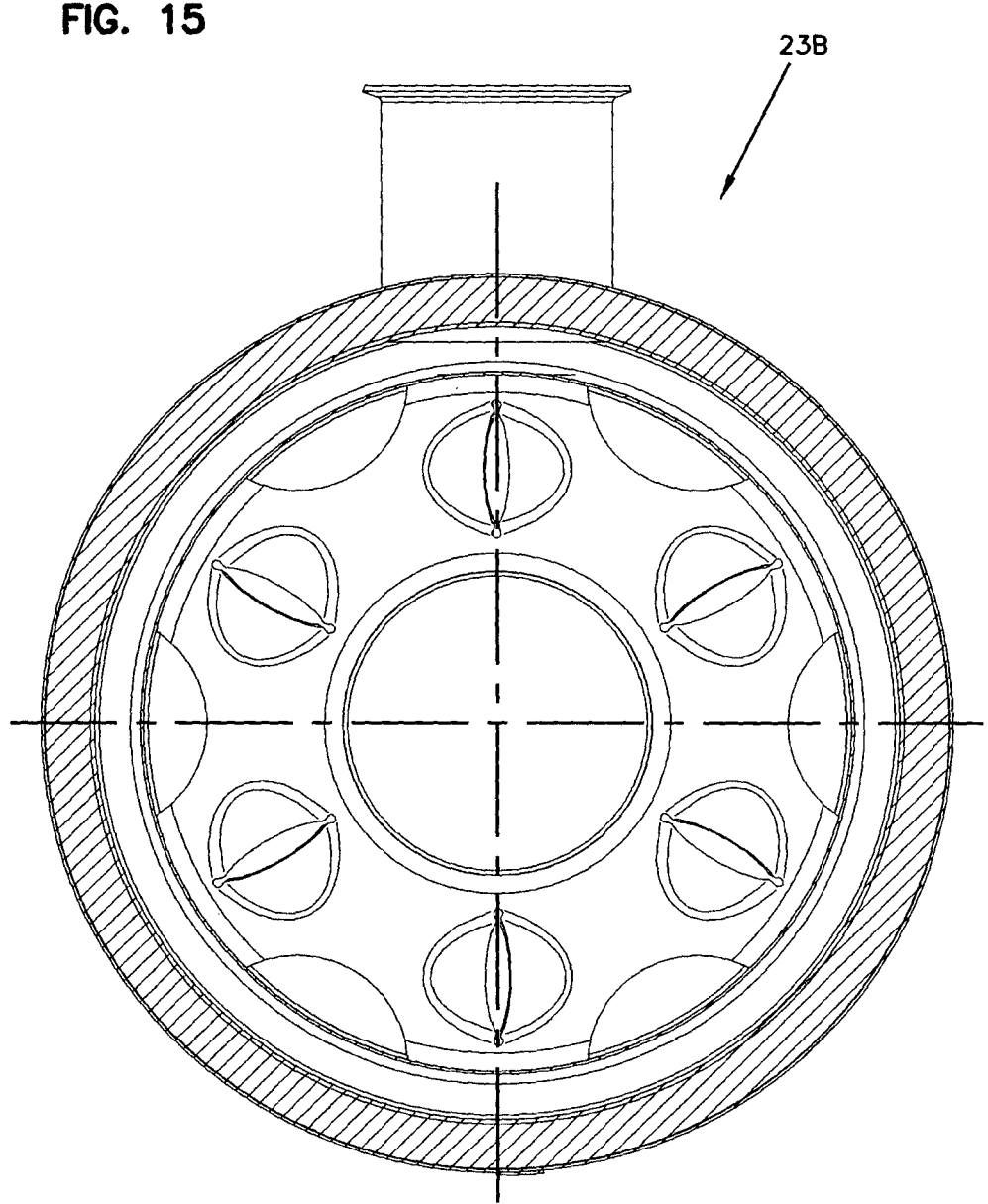
FIG. 15 is a cross-sectional view taken along section line 15-15 of FIG. 14.
Figure 16:
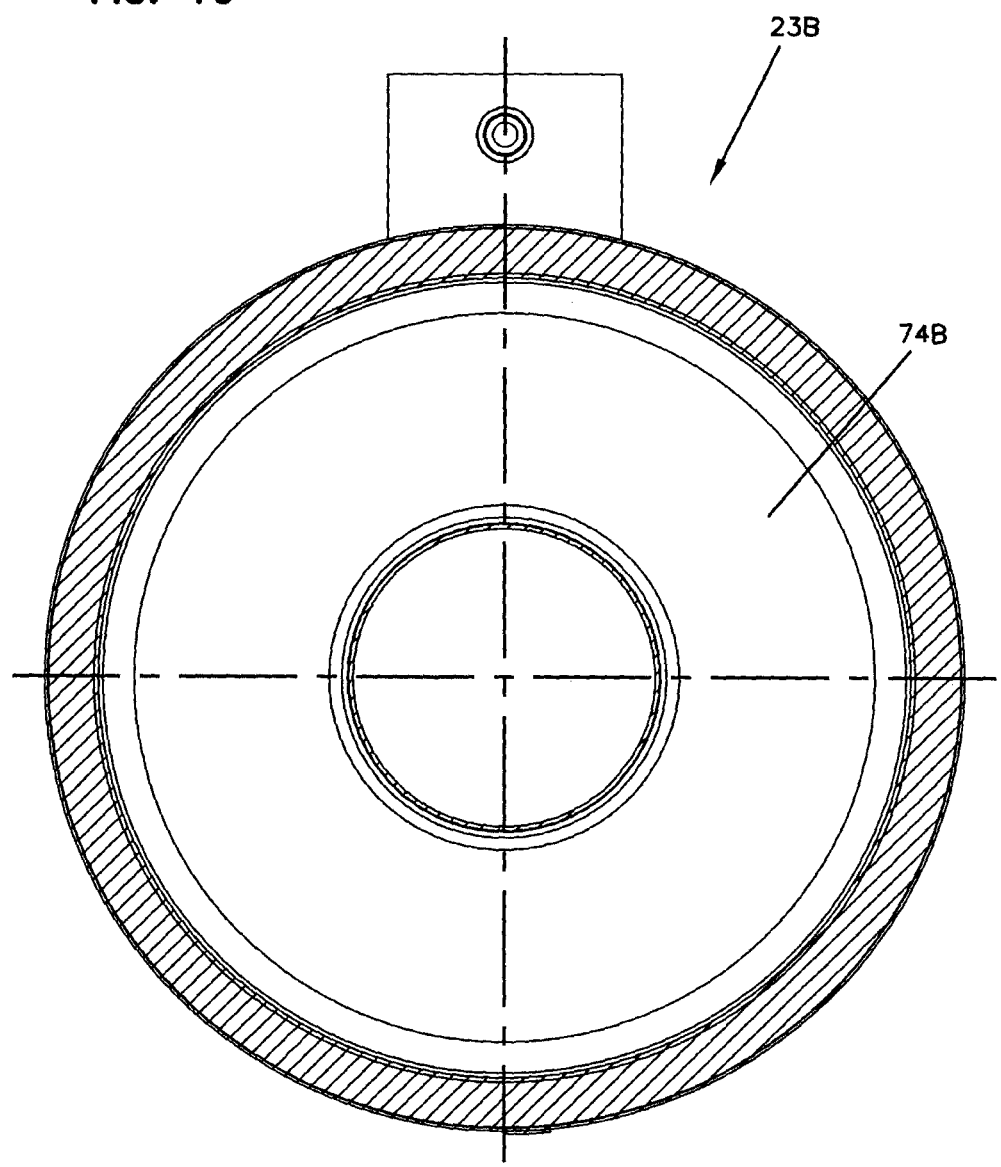
FIG. 16 is a cross-sectional view taken along the section line 16-16 of FIG. 14.
Figure 17:
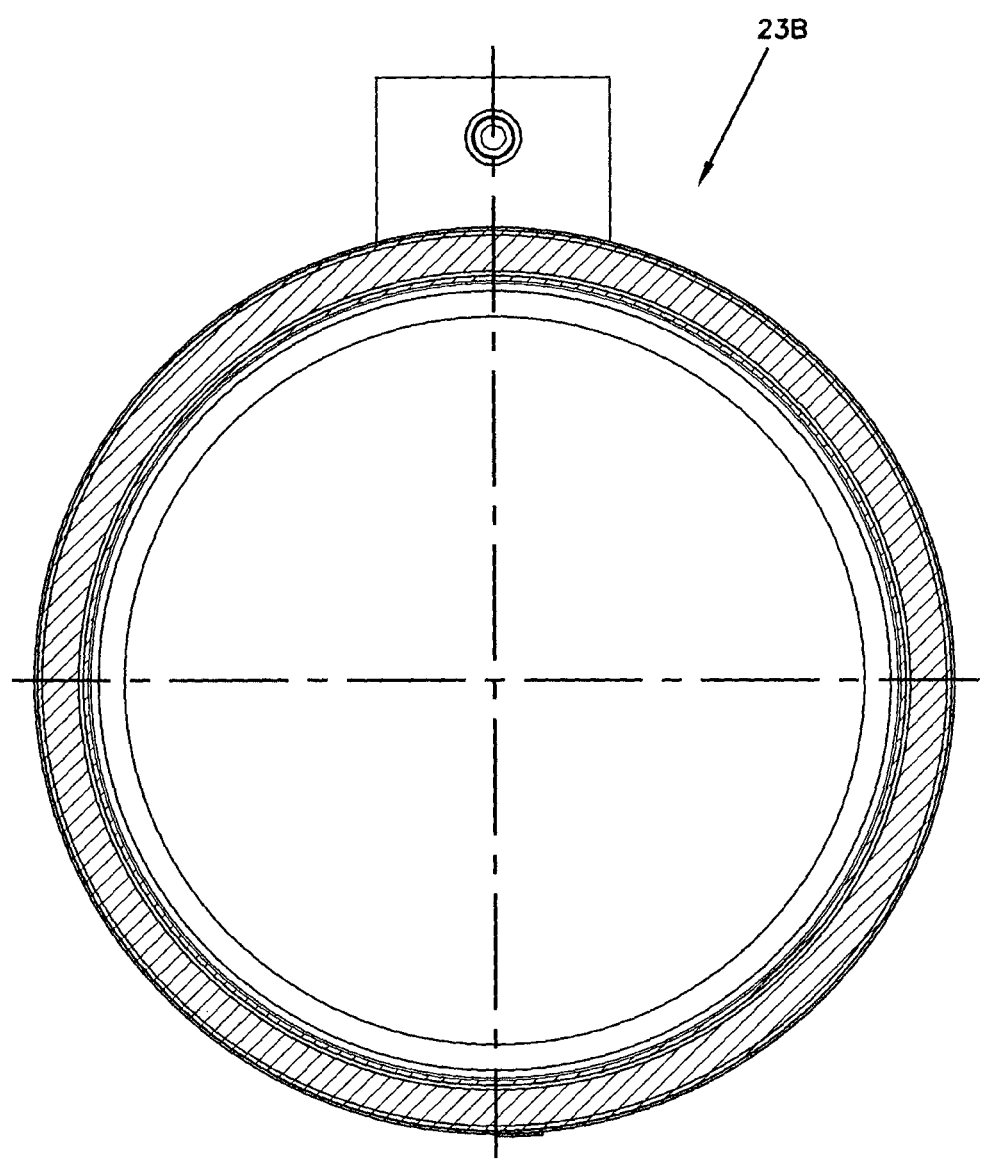
FIG. 17 is a cross-sectional view taken along section line 17-17 of FIG. 14.
Figure 18:
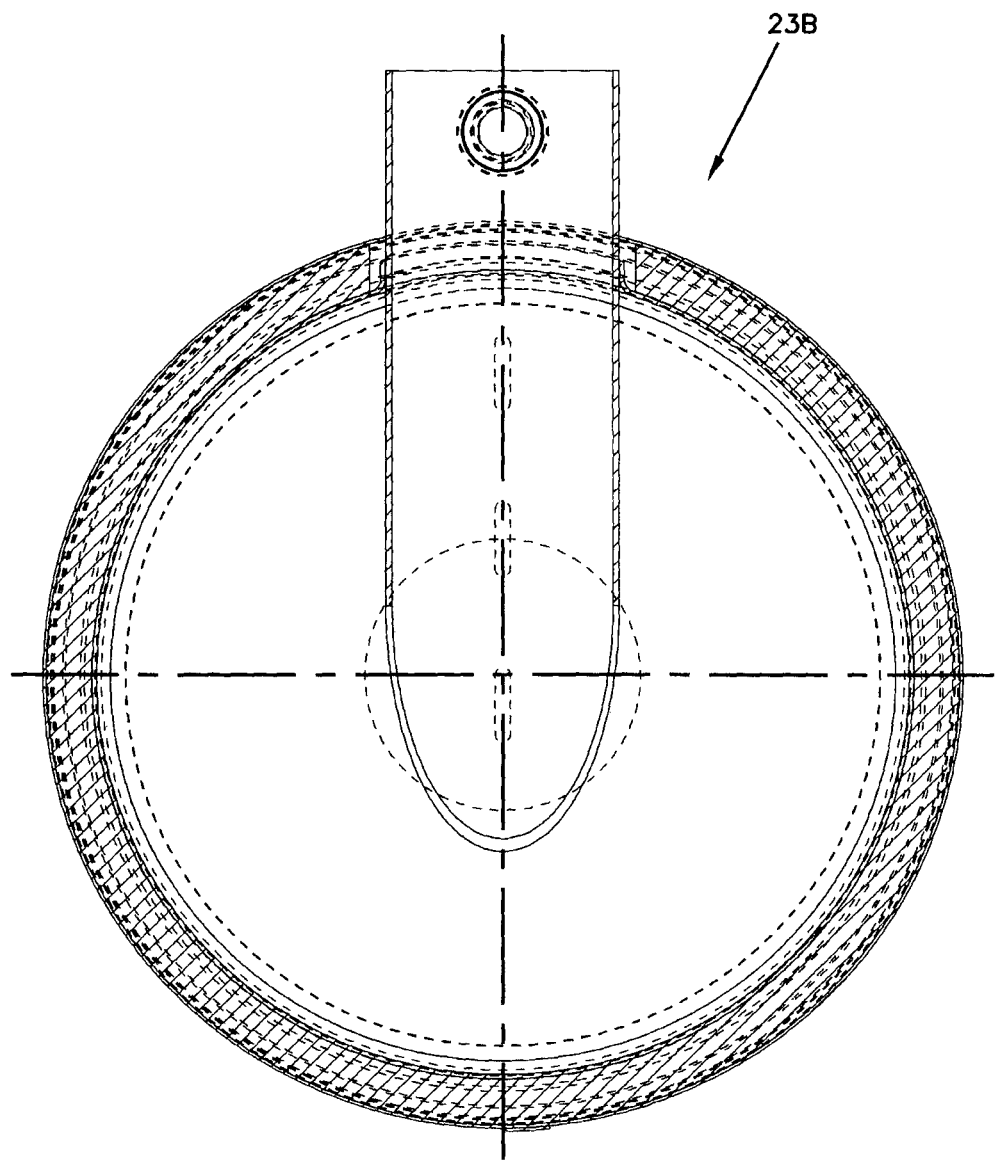
FIG. 18 is a cross-sectional view taken along section line 18-18 of FIG. 14.

FIGS. 10 and 11 depict a second exhaust treatment device 23A in accordance with the principles of the present disclosure. The exhaust treatment device 23A includes an outer housing 62A enclosing a $NO_x$ treatment substrate 50A, a divider wall 74A, an inner conduit 82A, an exhaust treatment substrate 56A that surrounds the inner conduit 82A, a swirl chamber 86A, and a swirl structure 102A. The outer housing 62A includes a first end wall 64A and a second end wall 66A. A doser mounting location is provided at the center of the first end wall 64A. An outlet pipe 120A is provided at the center of the second end wall 66A. The outlet pipe 120A provides the exhaust treatment device with an axial outlet. An inlet pipe 114A is mounted through a side wall 68A of the housing 62A. A centerline 126A of the inlet pipe 114A intersects the inner conduit 82A and also intersects a gap G defined between the divider wall 74A and the exhaust treatment substrate 56A. The inlet pipe 114A is positioned at an axial position aligned between the divider wall 74A and the exhaust treatment substrate 56A. As shown at FIG. 11, the inlet pipe 114A is fully axially offset from the exhaust treatment substrate 56A and aligns with the gap G. Still referring to FIG. 11, a line FPA shows an example flow path through the exhaust treatment device 23A.

FIGS. 12-18 show a third exhaust treatment device 23B in accordance with the principles of the present disclosure. The exhaust treatment device 23B has generally the same configuration as the exhaust treatment device 23, except divider wall 74B has more of a domed configuration as compared to the divider wall 74. A concave side of the divider wall 74B faces toward the $NO_x$ treatment device.

Figure 19:
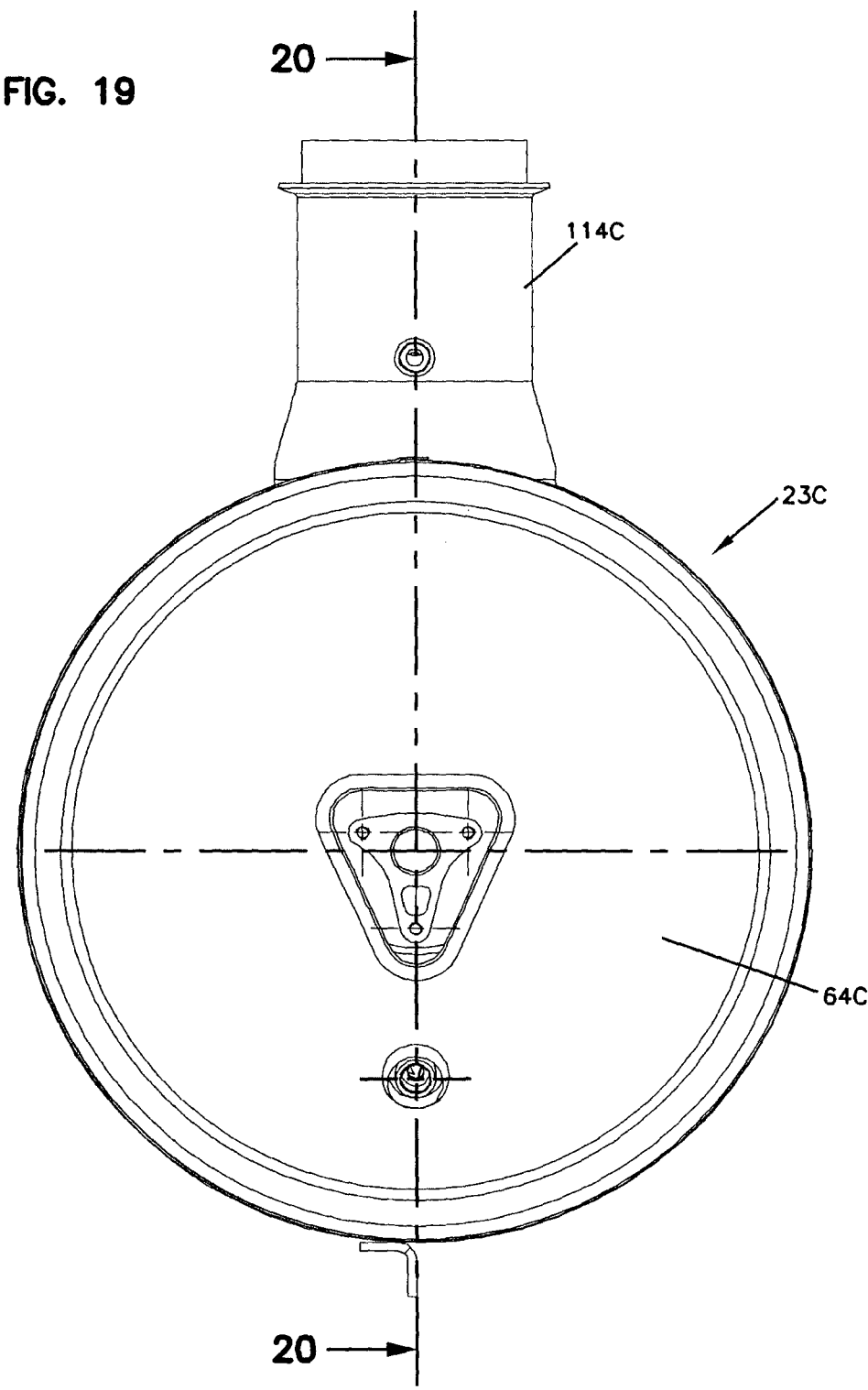
FIG. 19 is an end view of a fourth exhaust treatment device in accordance with the principles of the present disclosure.
Figure 20:
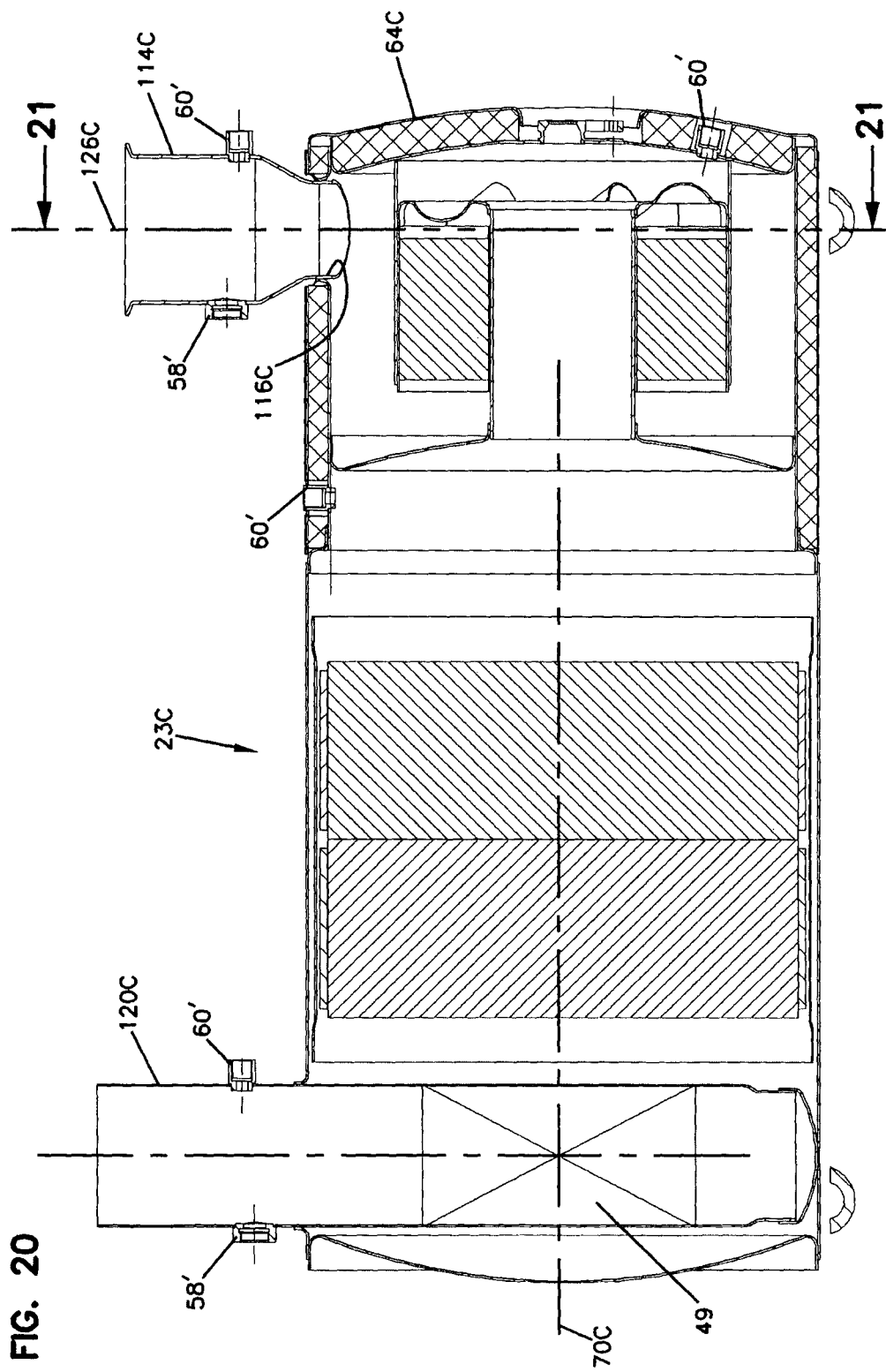
FIG. 20 is a cross-sectional view taken along section line 20-20 of FIG. 19.
Figure 21:
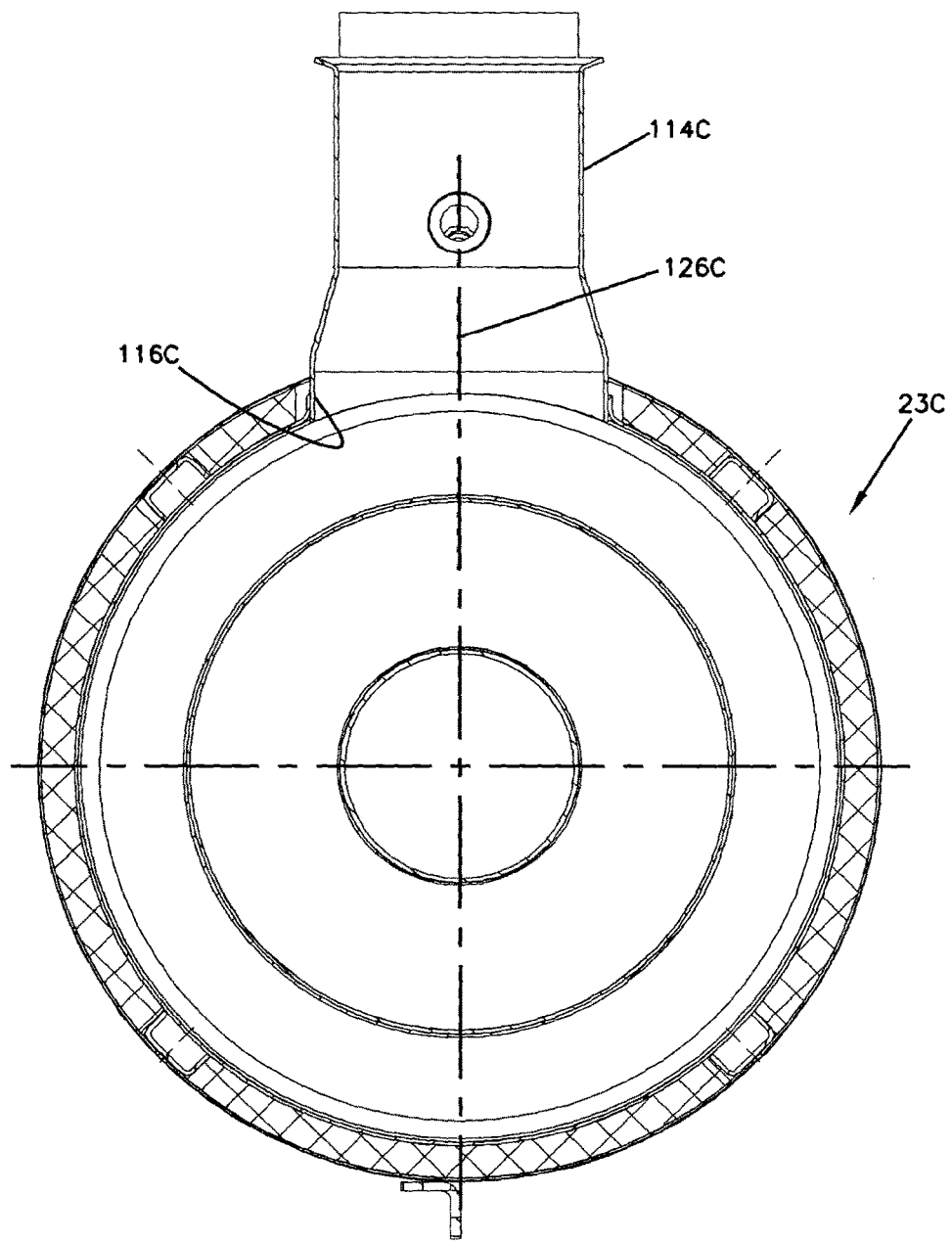
FIG. 21 is a cross-sectional view taken along section line 21-21 of FIG. 20.

FIGS. 19-21 show a fourth exhaust treatment device 23C in accordance with the principles of the present disclosure. It will be appreciated that the exhaust treatment device 23C has a similar configuration as the exhaust treatment device 23. However, the exhaust treatment device 23C has an inlet pipe 114C that is closer to a first end wall 64C as compared to the spacing between the inlet pipe 114 and the first end wall 64. Additionally, the inlet pipe 114C has a tapered configuration adjacent an inner end 116C of the inlet pipe 114C. As shown at FIG. 20, the inlet pipe 114C tapers inwardly toward a central axis 126C of the inlet pipe 114C as the inlet pipe 114C extends toward the interior of the exhaust treatment device 23C. Also, as shown at FIG. 21, the inlet pipe 114C tapers outwardly from the central axis 126C as the inlet pipe 114C extends toward the interior of the exhaust treatment device 23C. This tapered configuration of the inlet pipe 114C provides the inlet pipe 114C with an elongate transverse cross-sectional shape. It is also noted that the exhaust treatment device 23C includes an outlet pipe 120C that is not mitered. Instead, the outlet pipe 120C has a perforated section 49 for receiving exhaust flow from the interior of the exhaust treatment device 23C.

Figure 22:
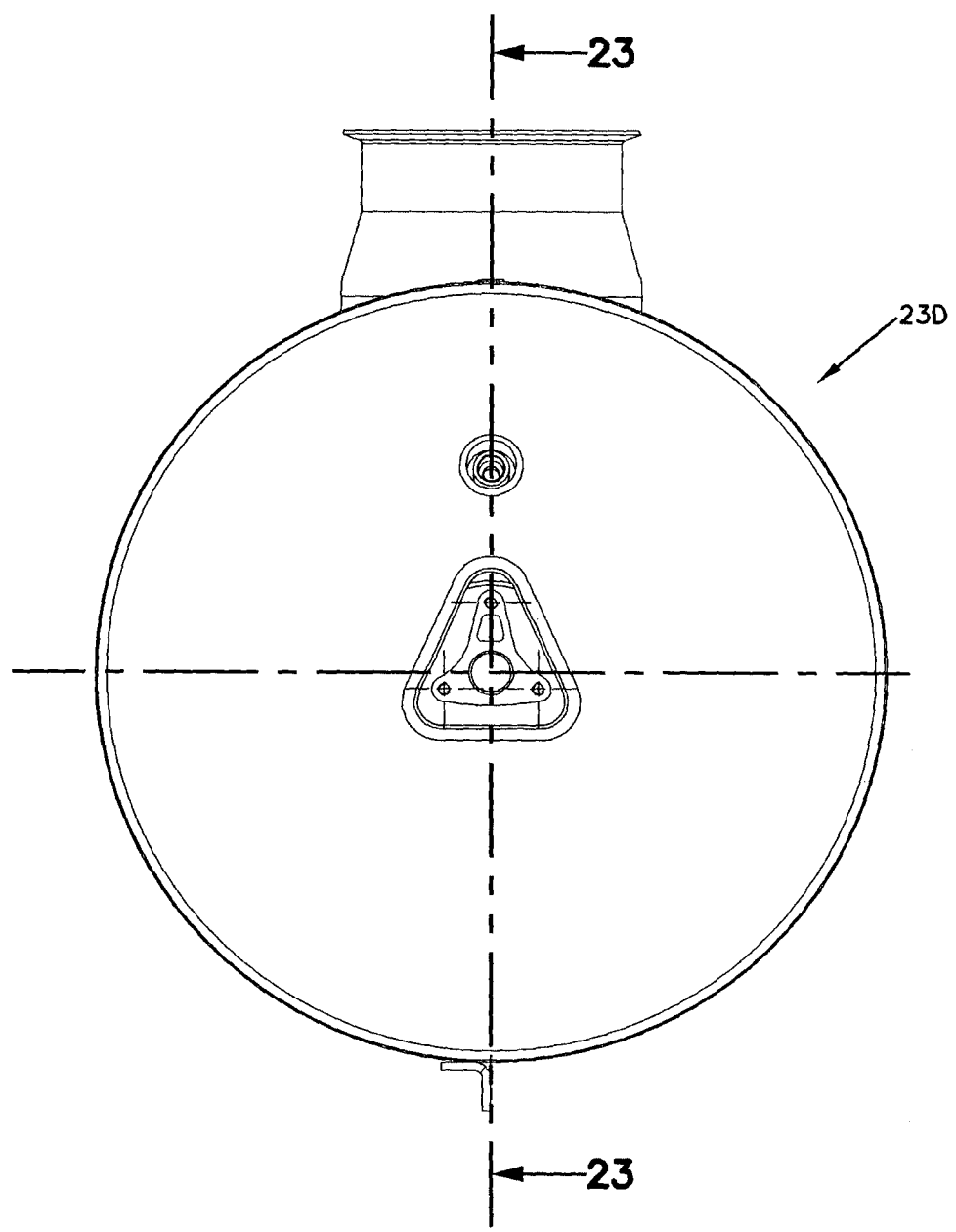
FIG. 22 is an end view of a fifth exhaust treatment device in accordance with the principles of the present disclosure.
Figure 23:
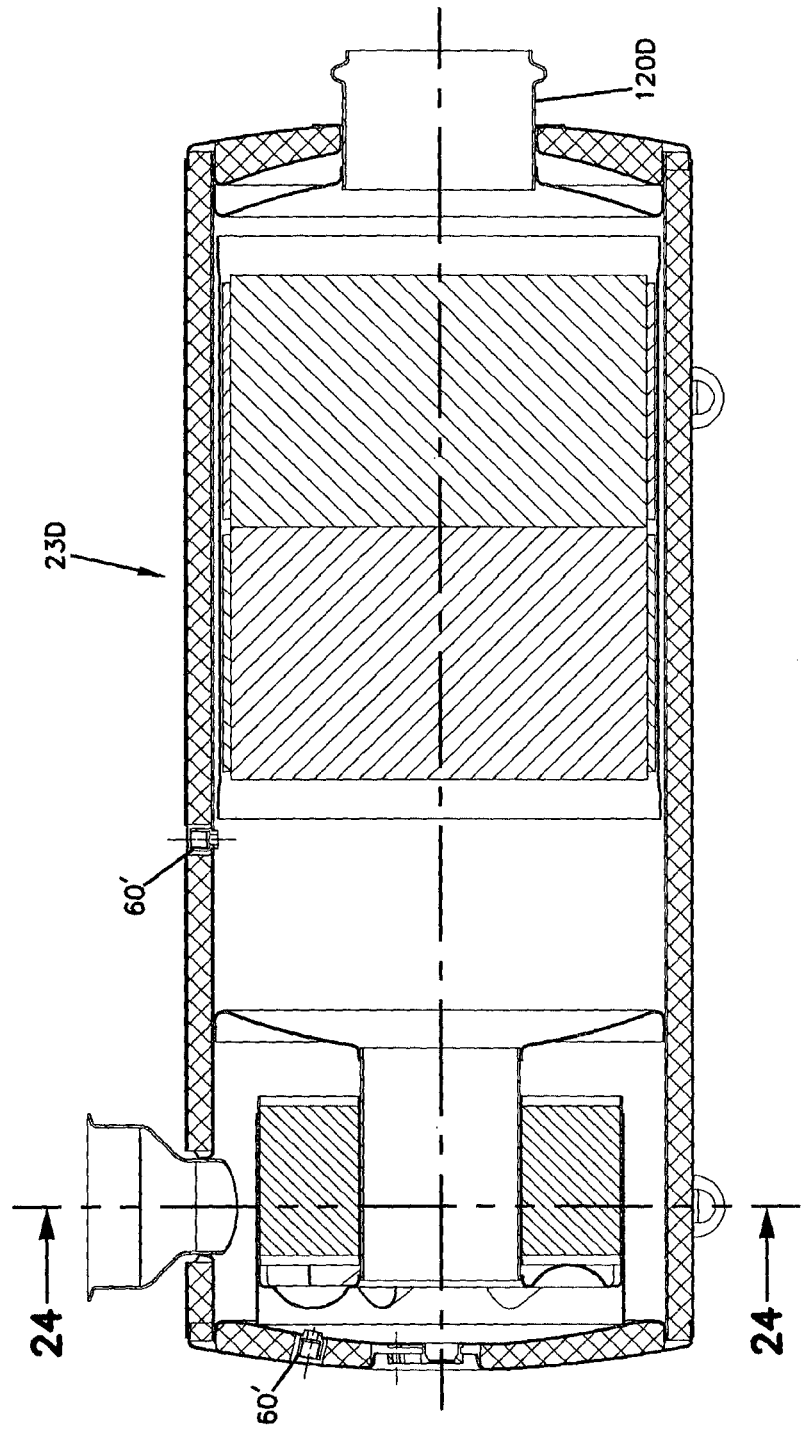
FIG. 23 is a cross-sectional view taken along section line 23-23 of FIG. 22.
Figure 24:
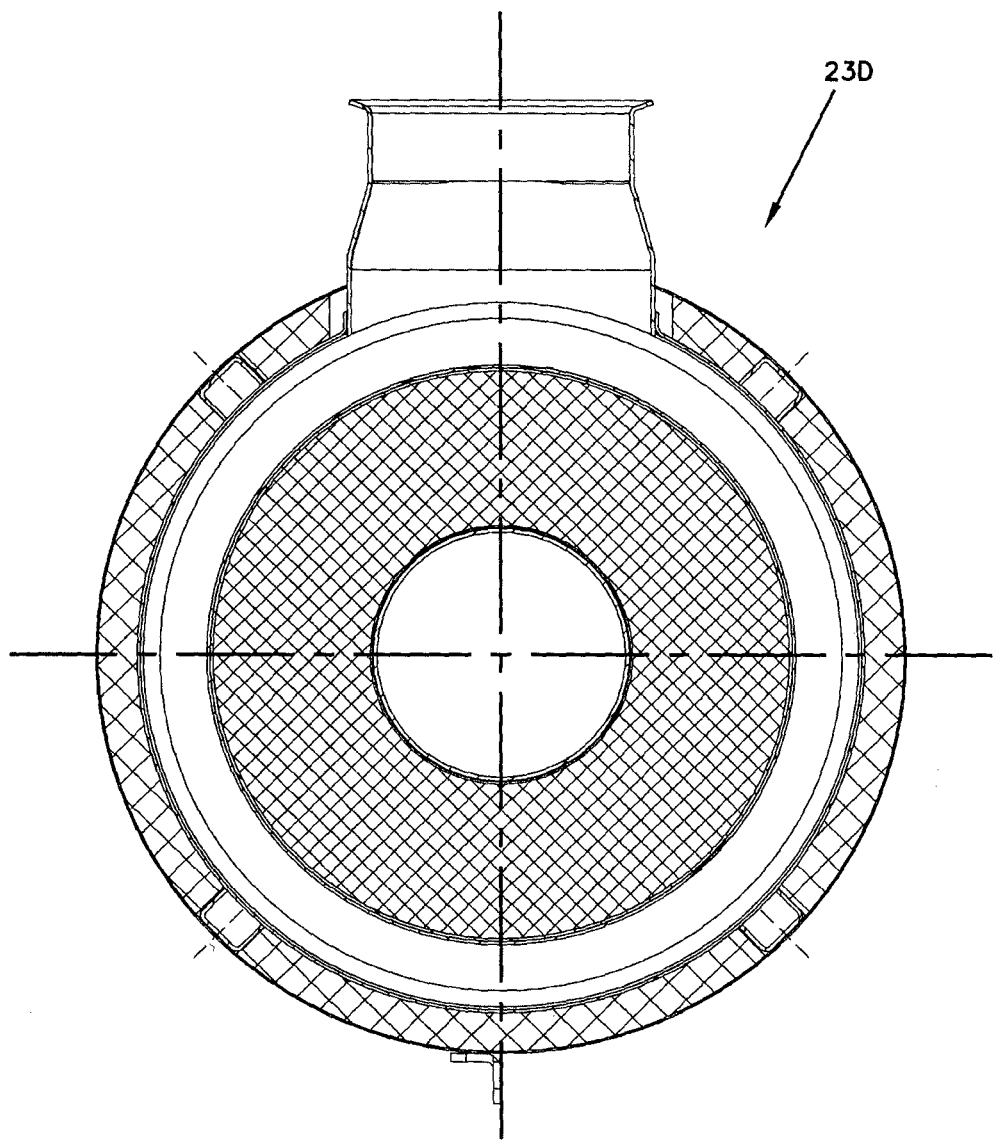
FIG. 24 is a cross-sectional view taken along section line 24-24 of FIG. 23.
Figure 25:
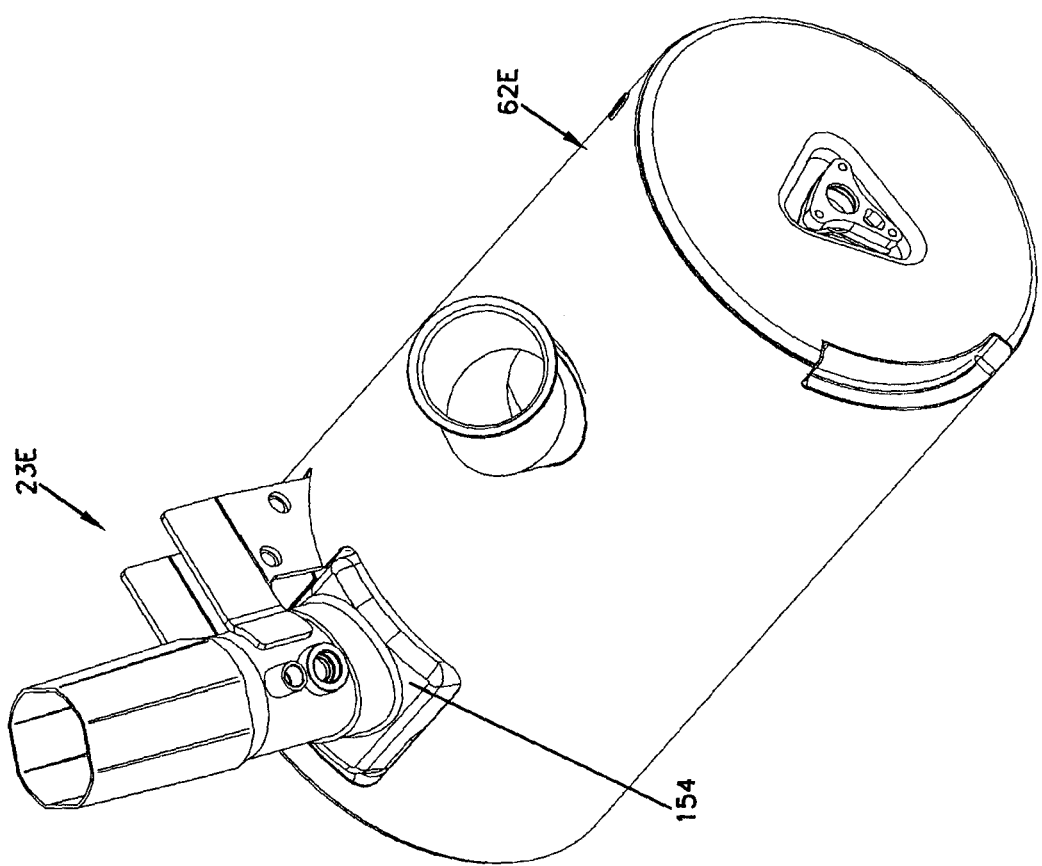
FIG. 25 is a perspective view of a sixth exhaust treatment device in accordance with the principles of the present disclosure.
Figure 26:
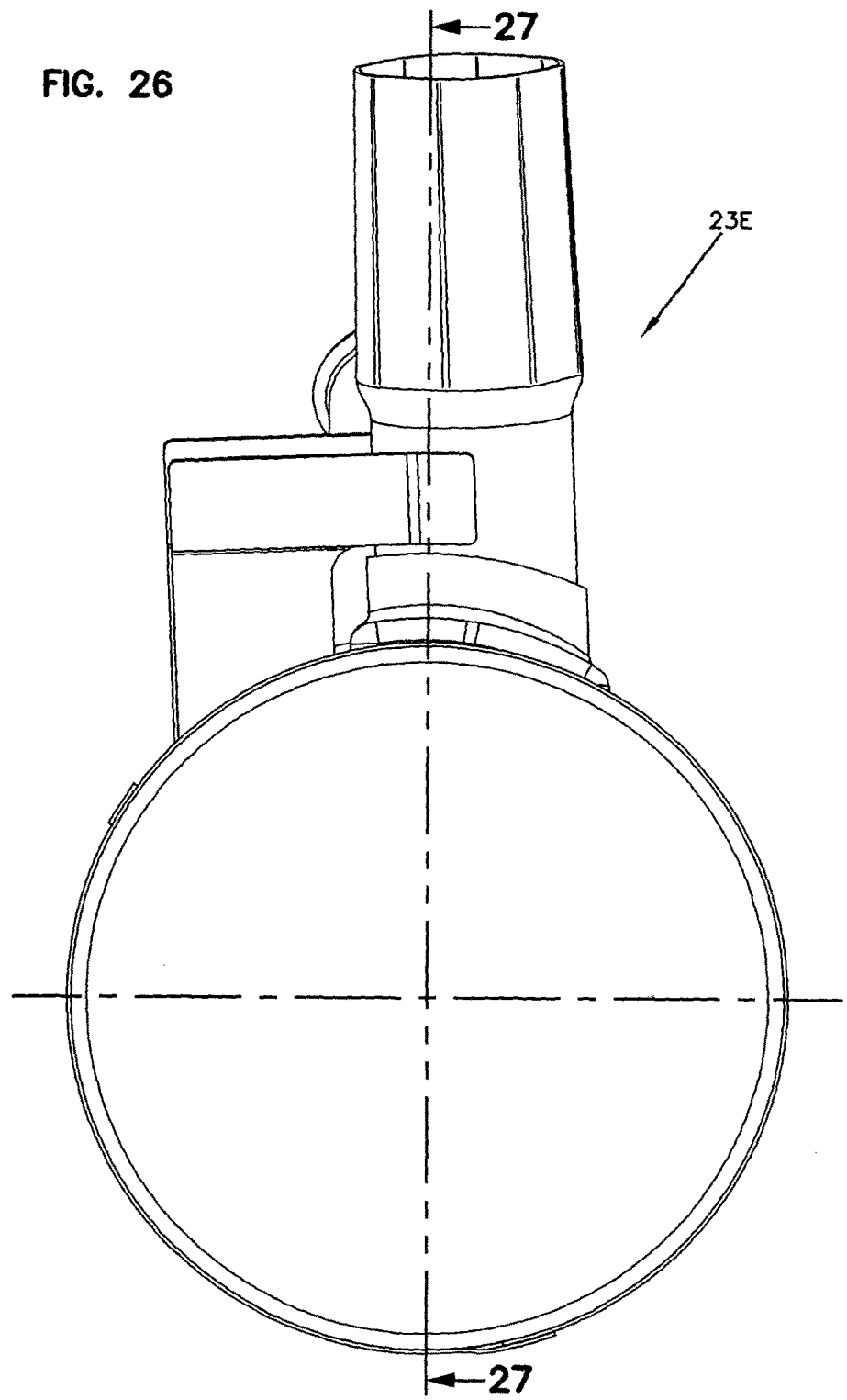
FIG. 26 is an end view of the exhaust treatment device of FIG. 25.
Figure 27:
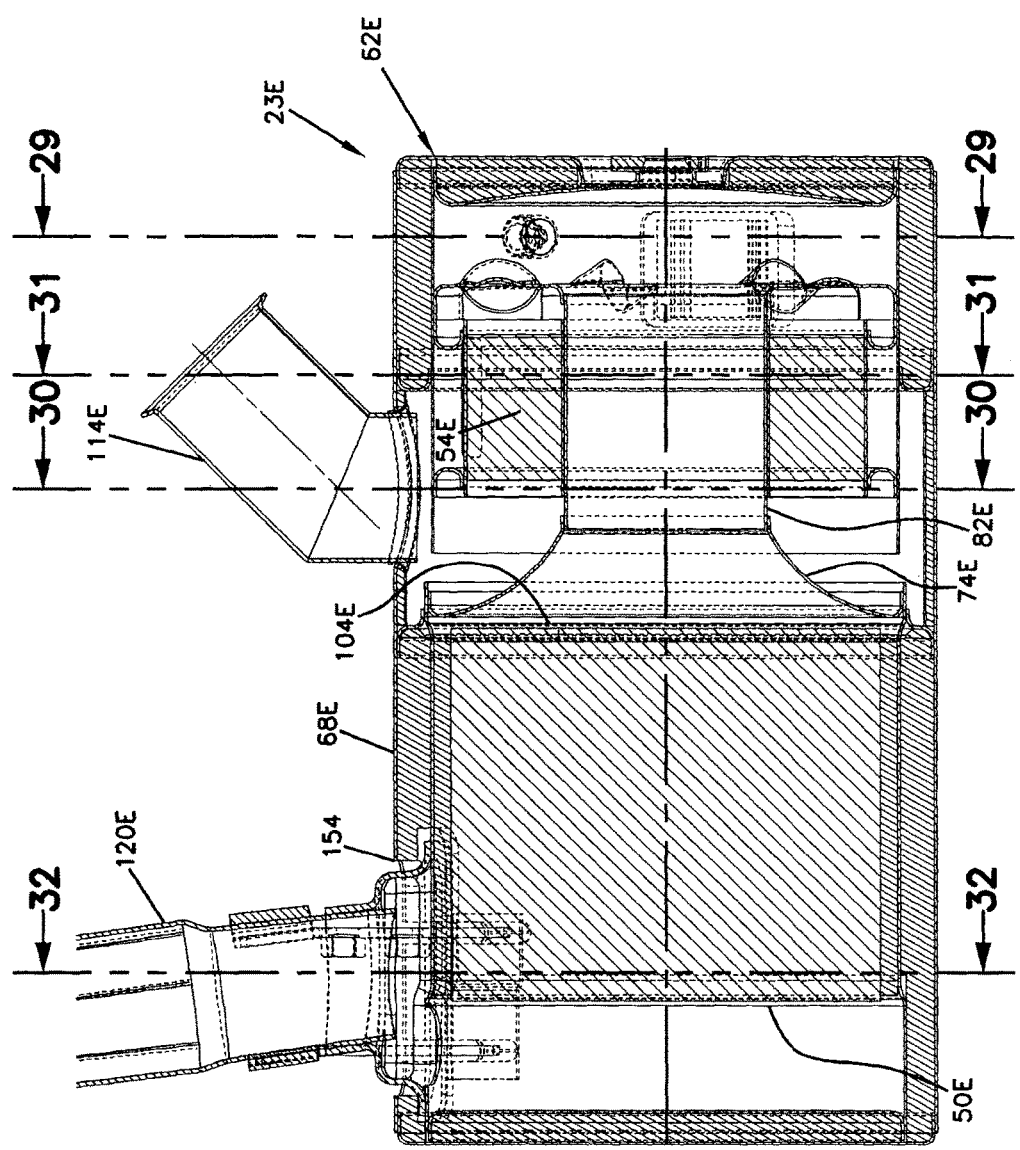
FIG. 27 is a cross-sectional view taken along section line 27-27 of FIG. 26.

FIGS. 22-24 show a fifth exhaust treatment device 23D in accordance with the principles of the present disclosure. The exhaust treatment device 23D has the same configuration as the exhaust treatment device 23C except the exhaust treatment device 23D has an axial outlet pipe 120D (FIG. 23).

Figure 28:
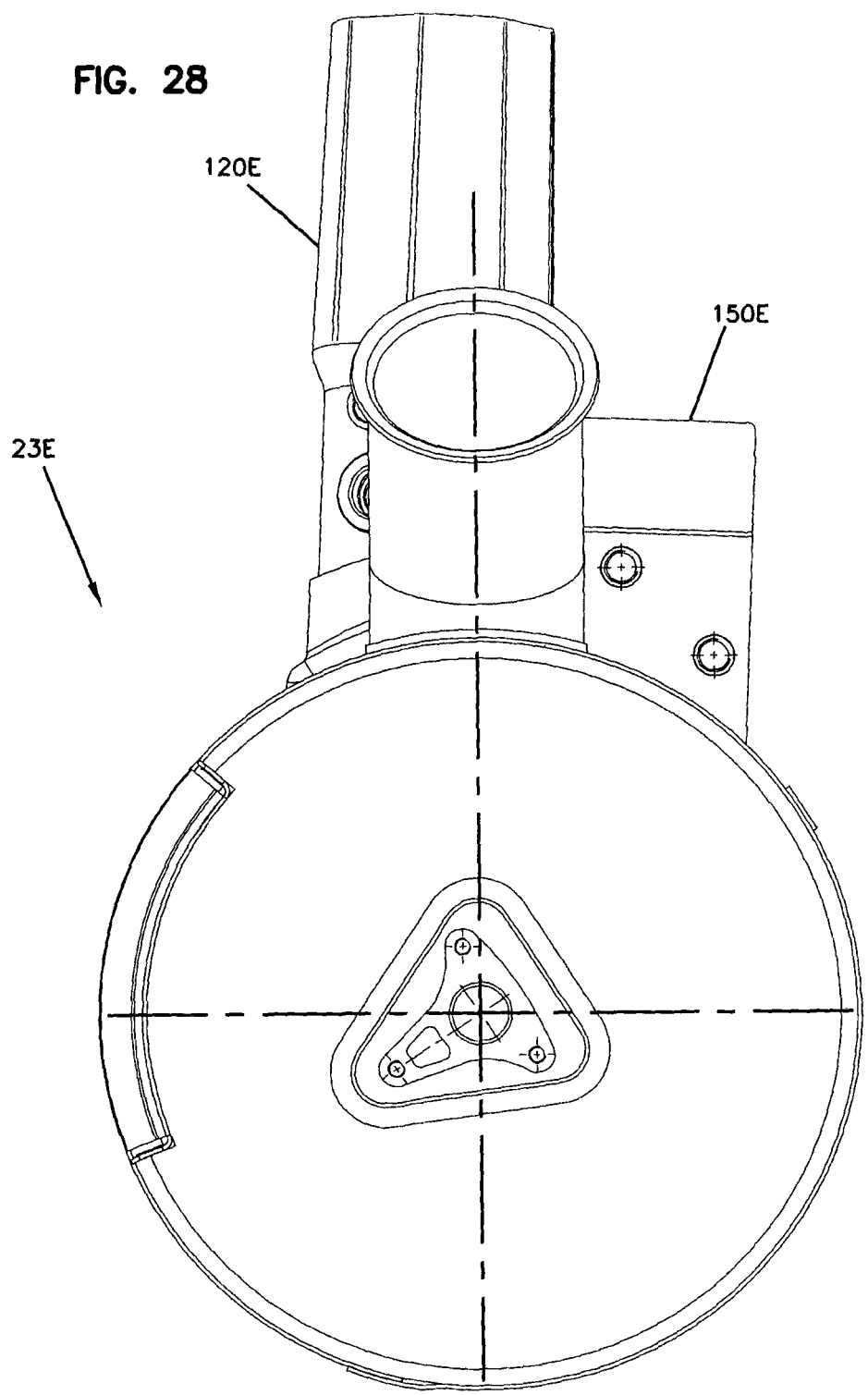
FIG. 28 is an opposite end view of the exhaust treatment device of FIG. 25.
Figure 29:
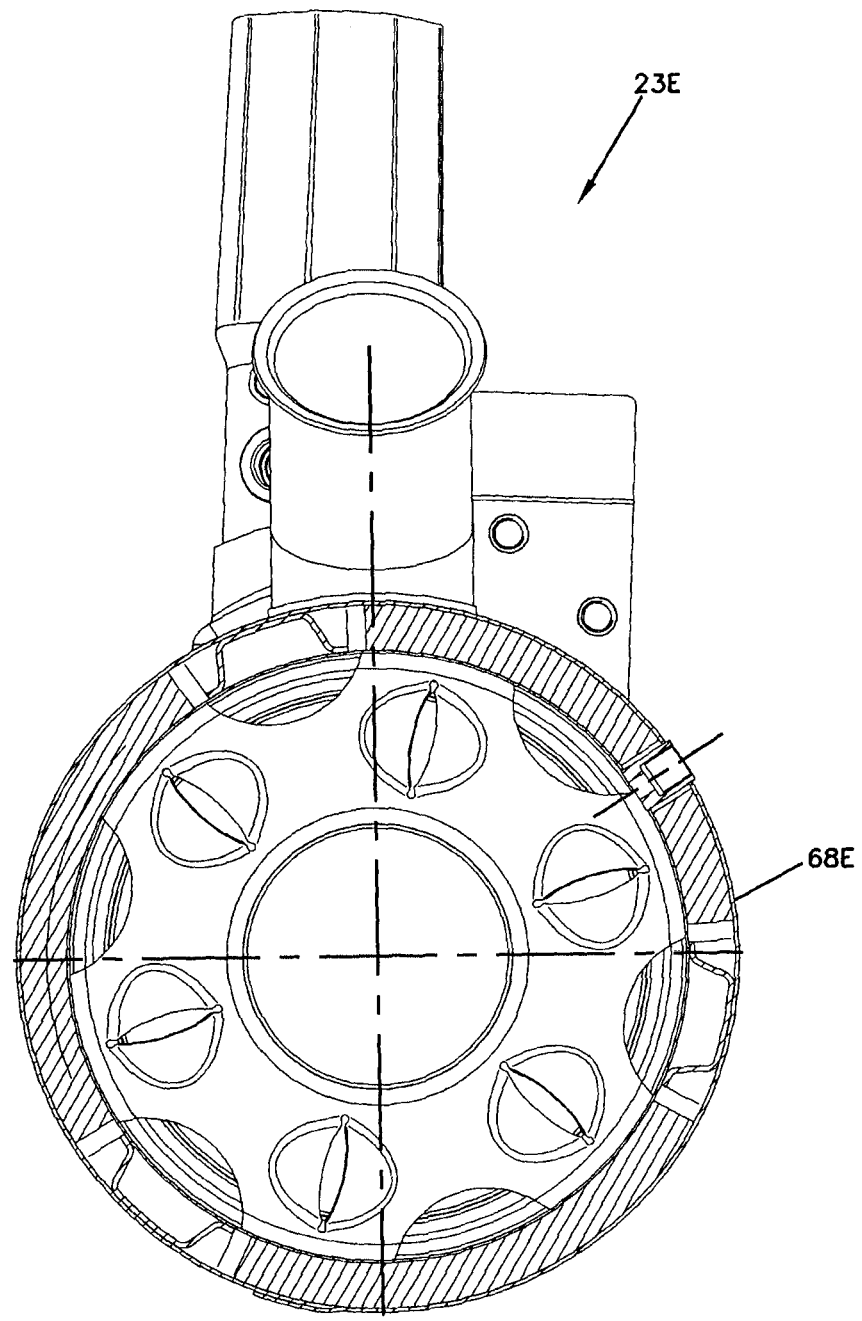
FIG. 29 is a cross-sectional view taken along section line 29-29 of FIG. 27.
Figure 30:
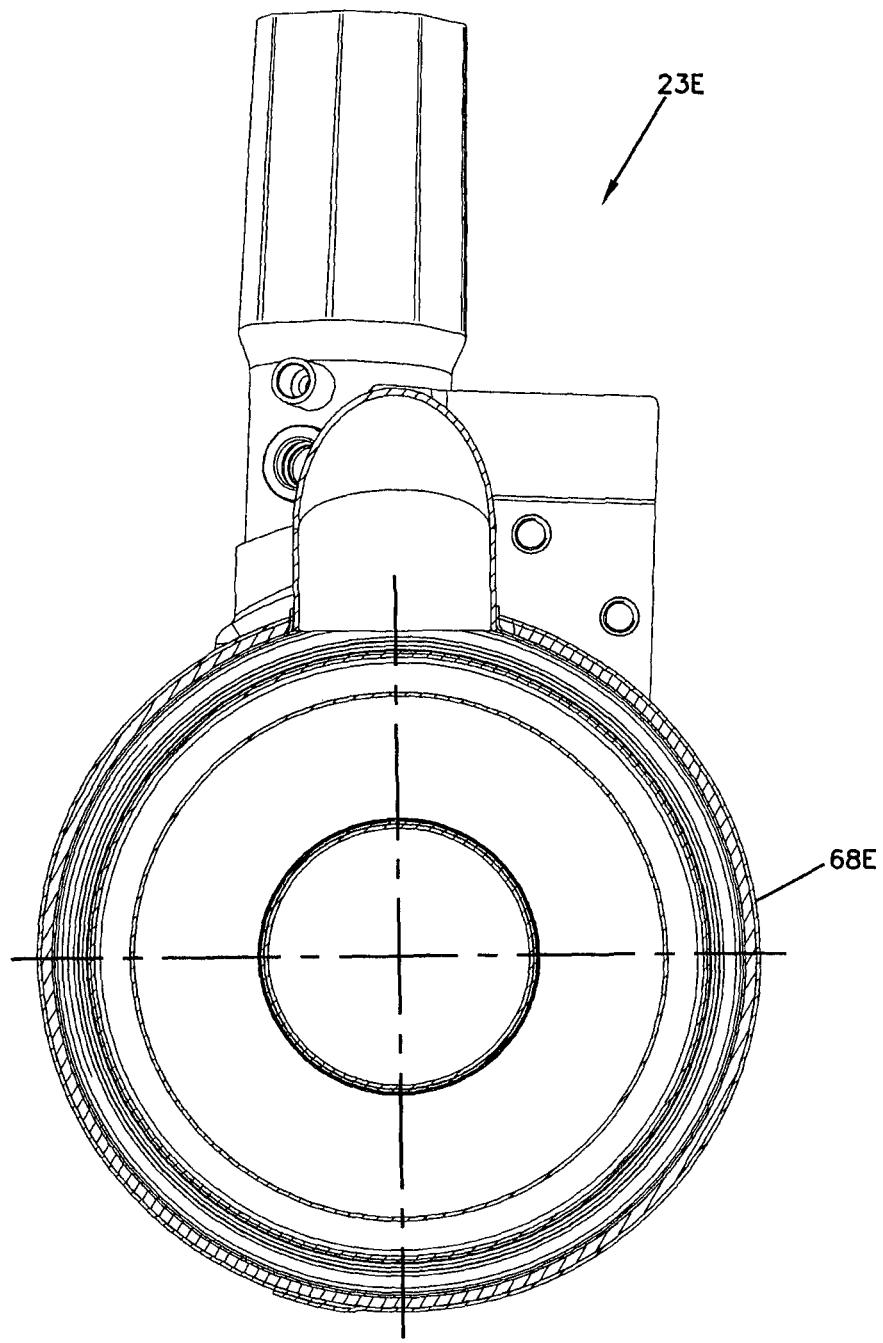
FIG. 30 is a cross-sectional view taken along section line 30-30 of FIG. 27.
Figure 31:
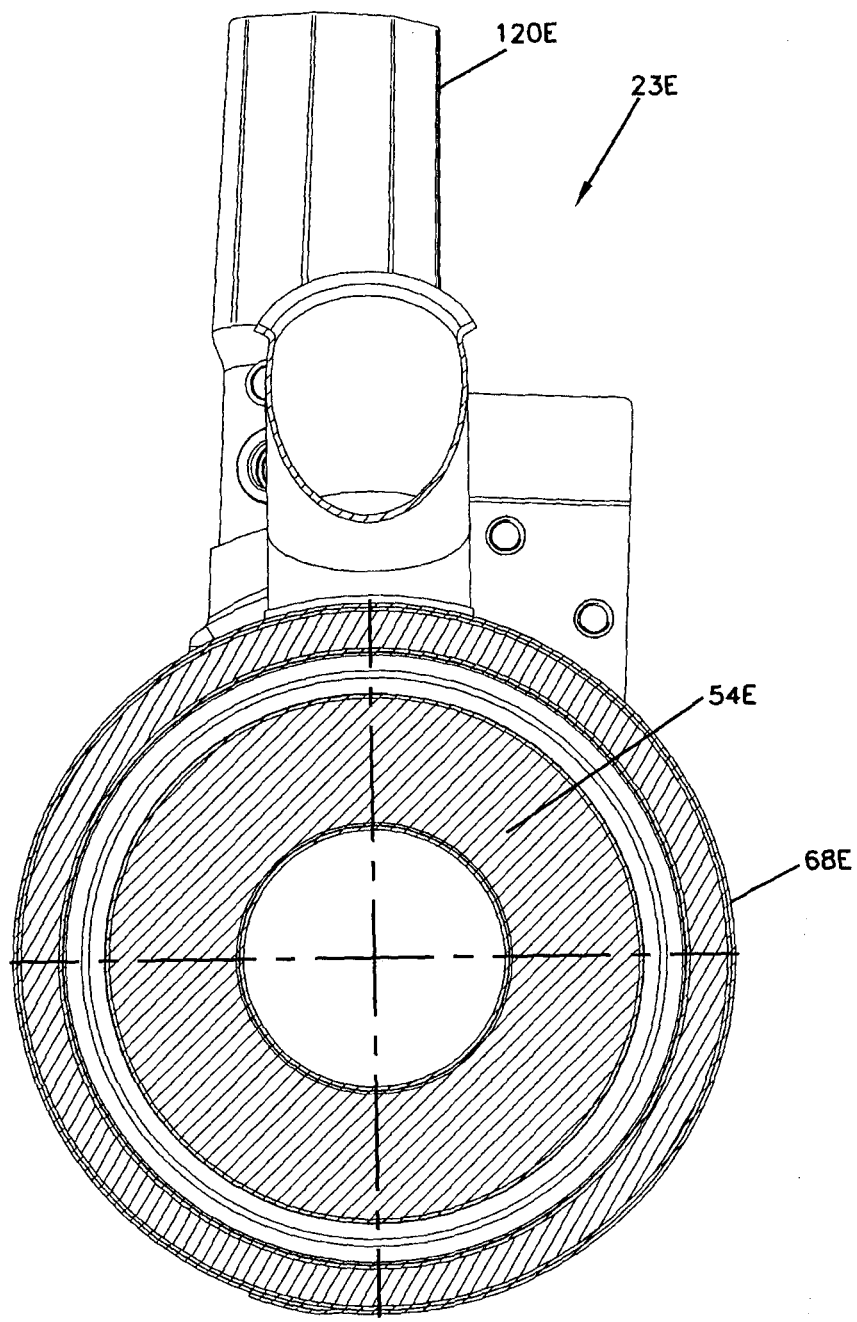
FIG. 31 is a cross-sectional view taken along section line 31-31 of FIG. 27.
Figure 32:
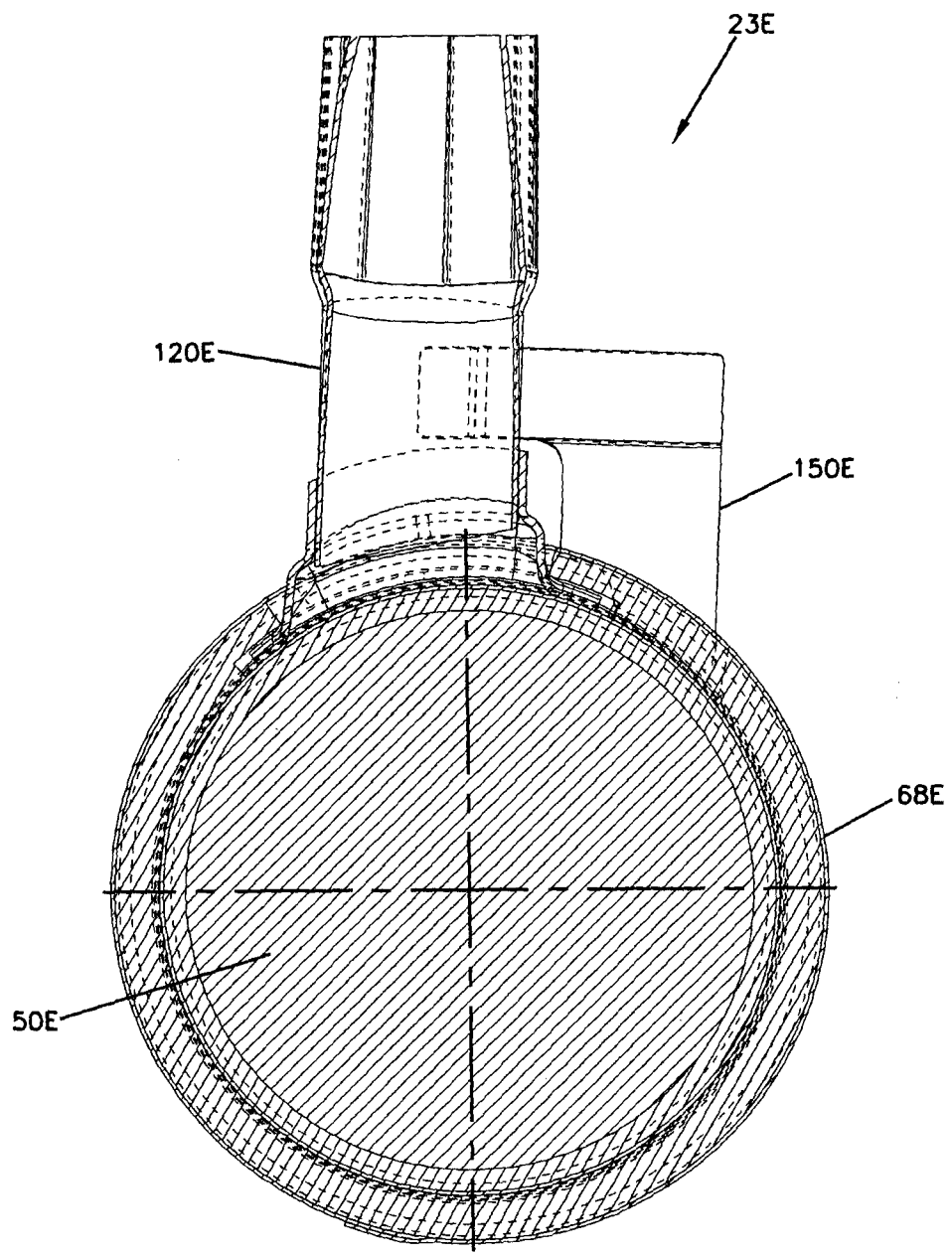
FIG. 32 is a cross-sectional view taken along section line 32-32 of FIG. 27.
Figure 33:
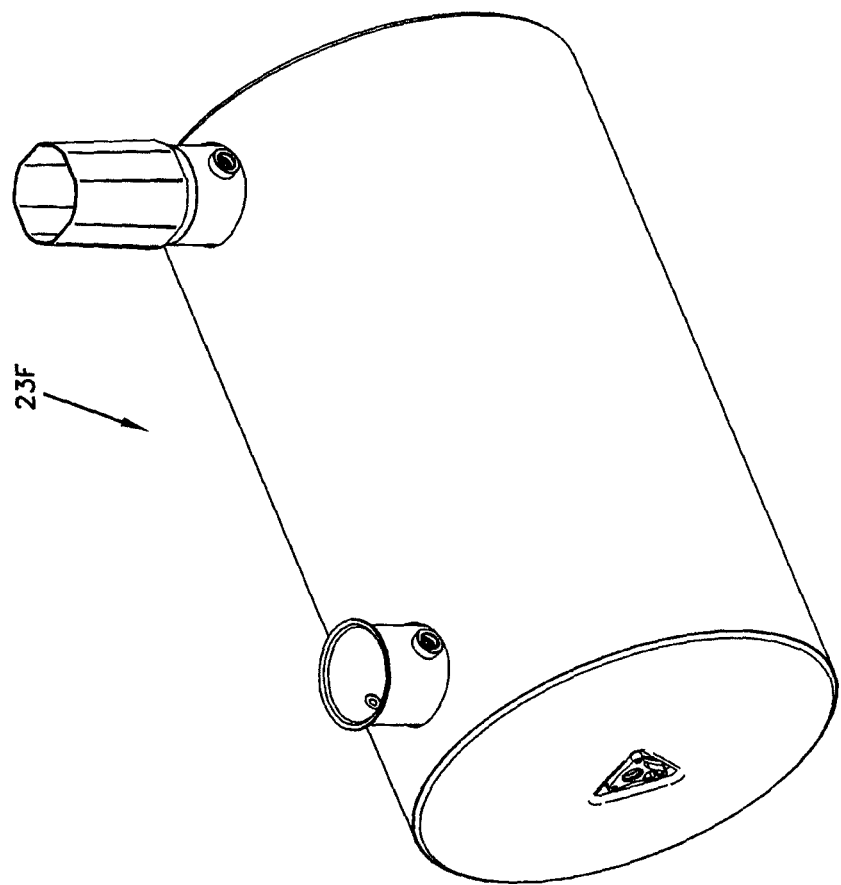
FIG. 33 is a perspective view of a seventh exhaust treatment in accordance with the principles of the present disclosure.
Figure 34:
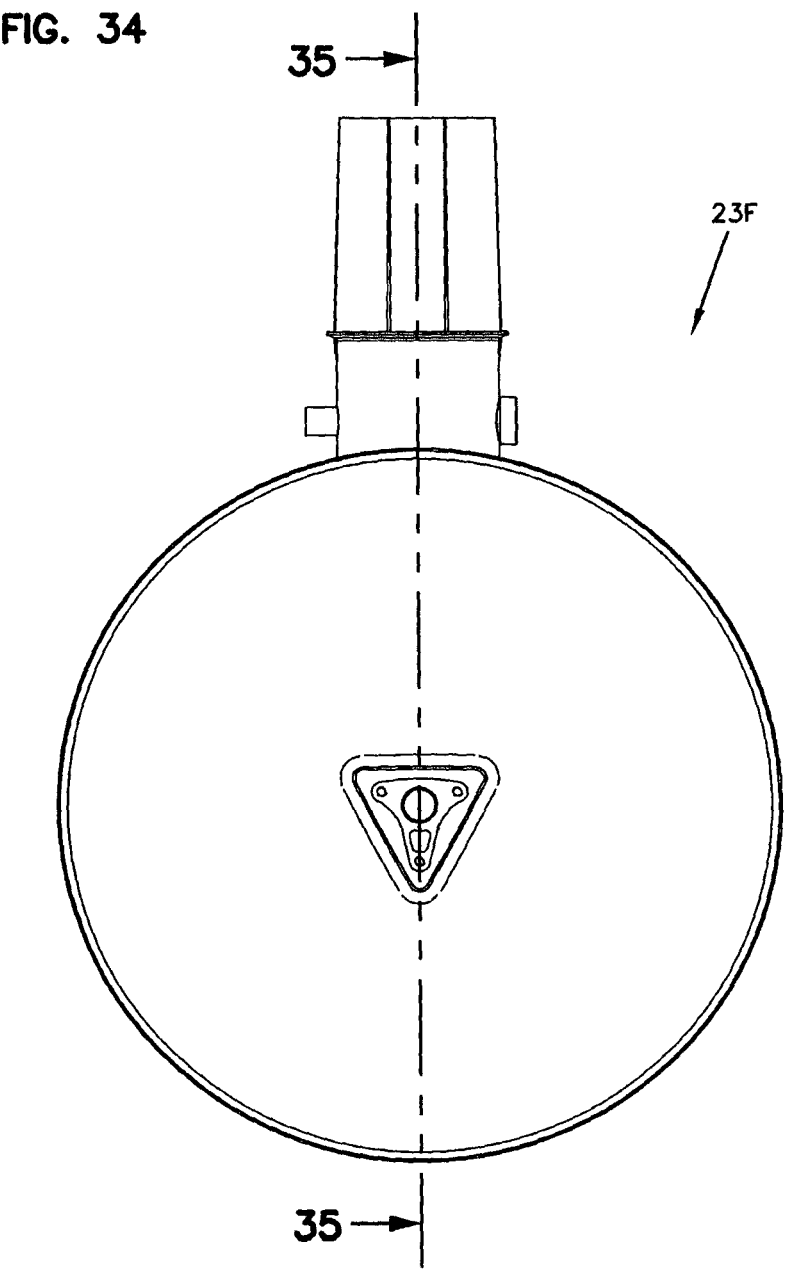
FIG. 34 is an end view of the exhaust treatment device of FIG. 33.
Figure 35:
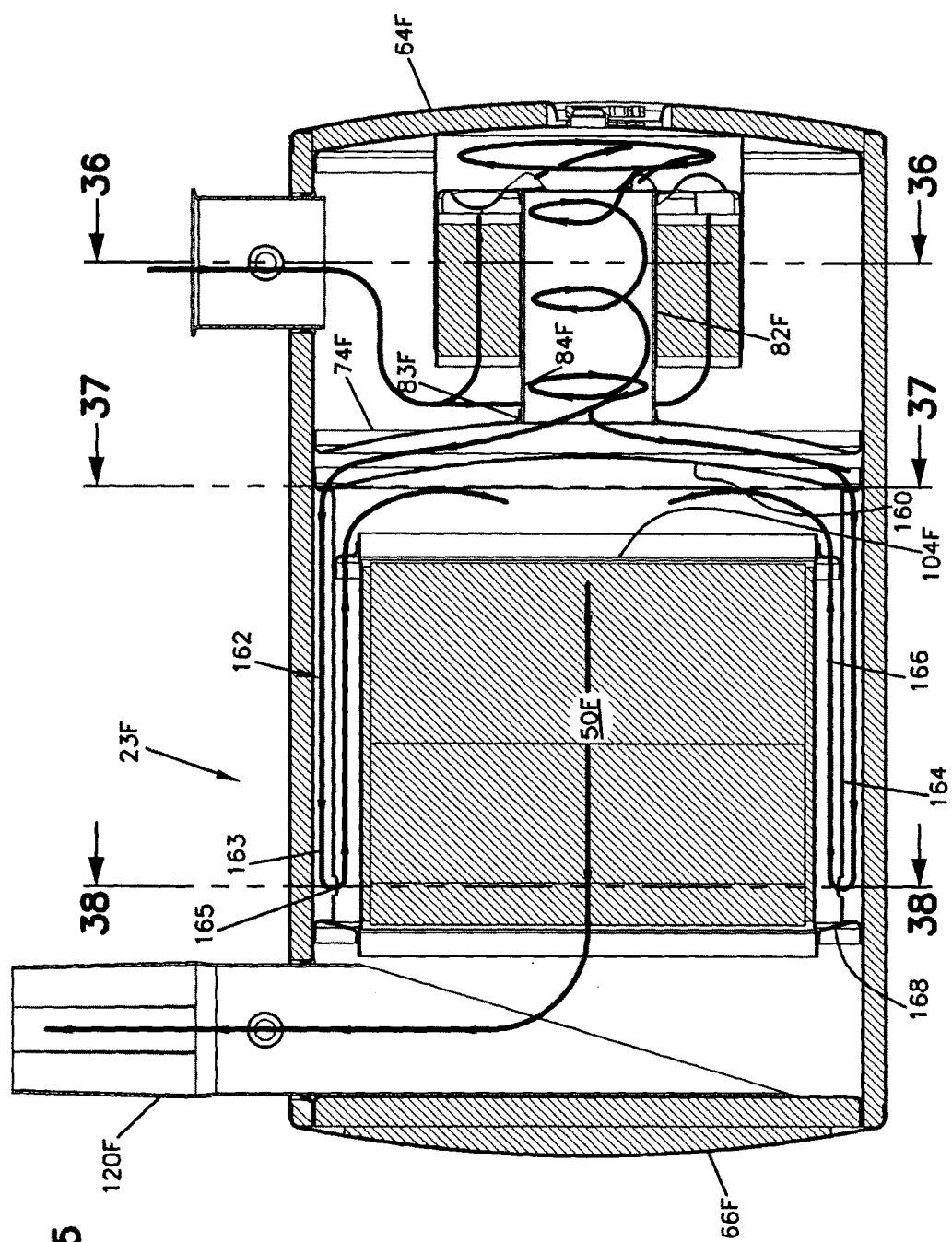
FIG. 35 is a cross-sectional view taken along section line 35-35 of FIG. 34.
Figure 36:
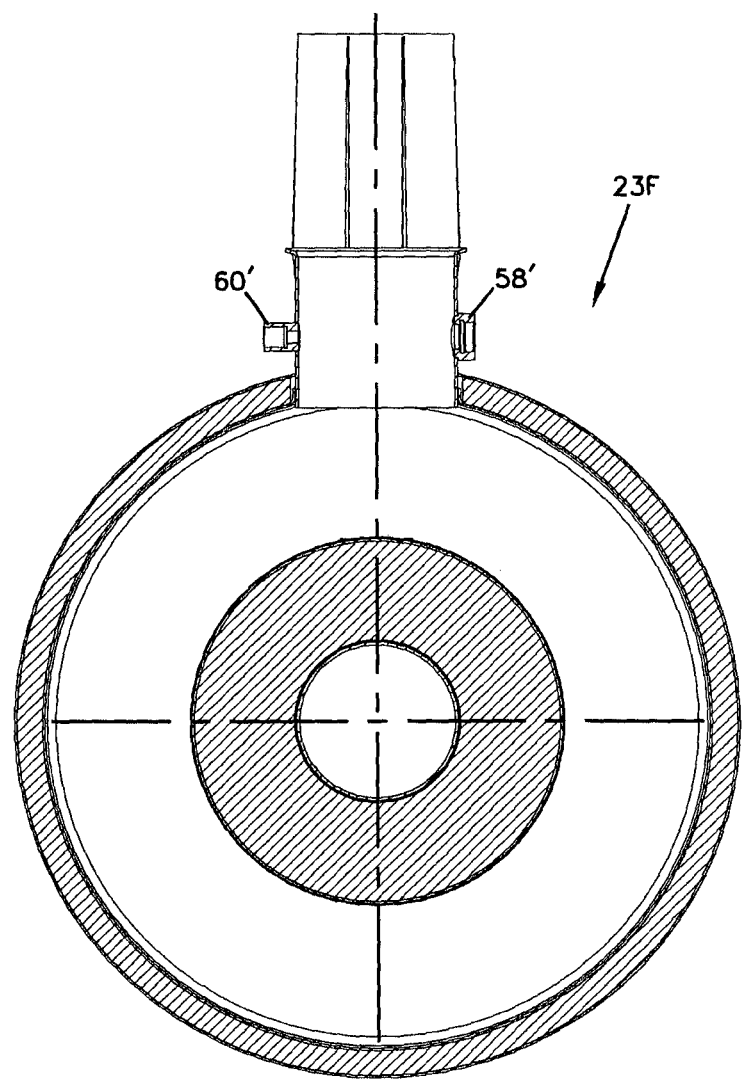
FIG. 36 is a cross-sectional view taken along section line 36-36 of FIG. 35.
Figure 37:
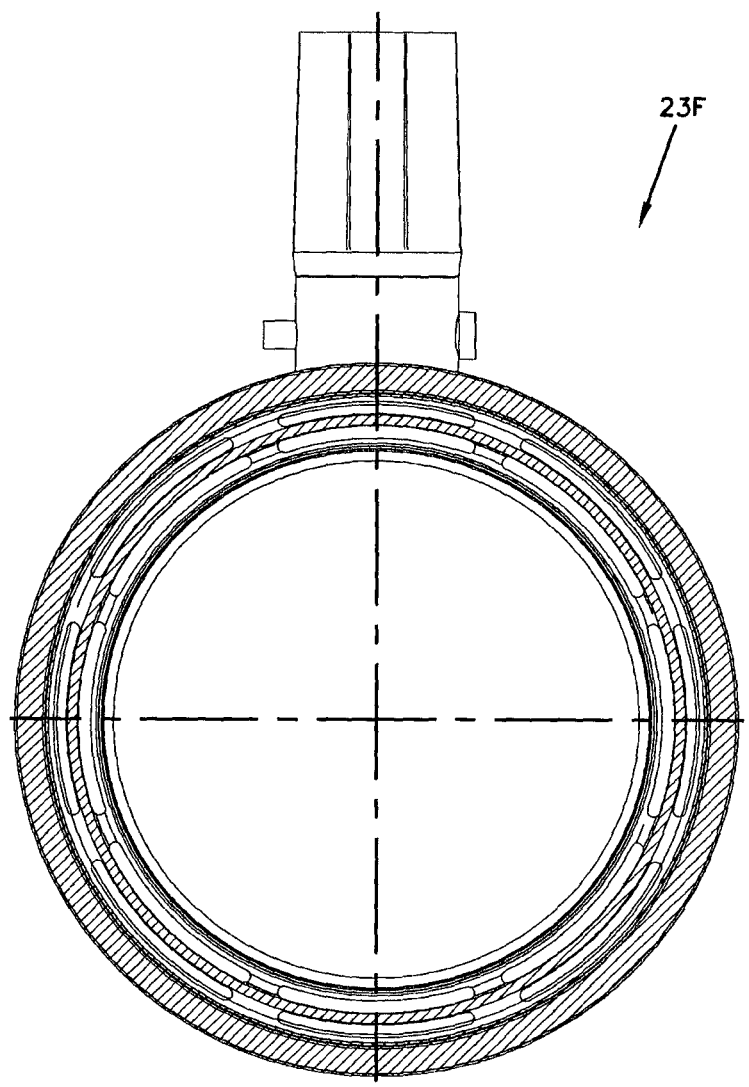
FIG. 37 is a cross-sectional view taken along section line 37-37 of FIG. 35.
Figure 38:
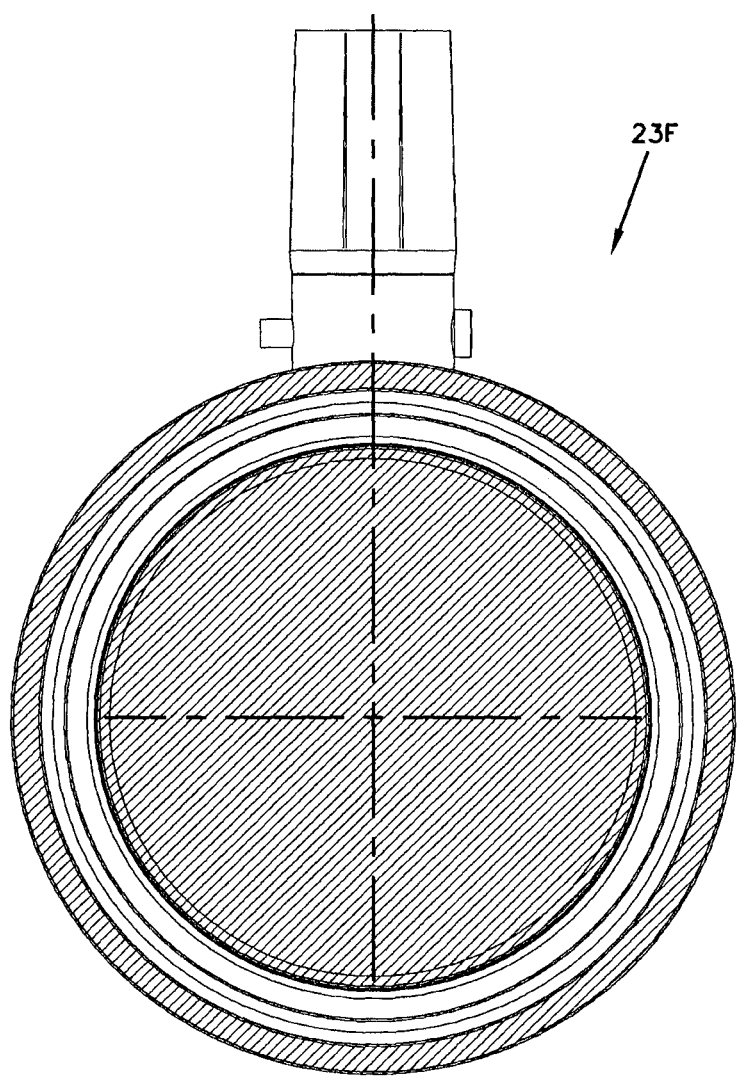
FIG. 38 is a cross-sectional view taken along section line 38-38 of FIG. 35.
Figure 39:
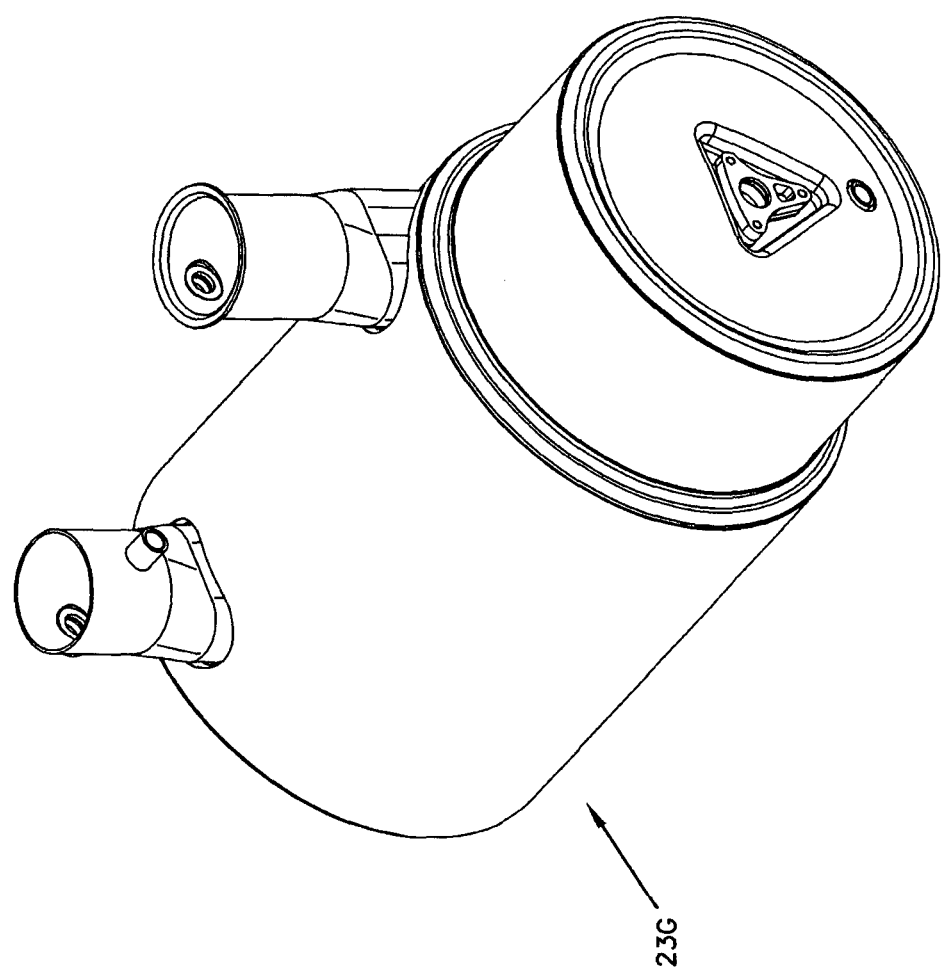
FIG. 39 is a perspective view of an eighth exhaust treatment device in accordance with the principles of the present disclosure.
Figure 40:
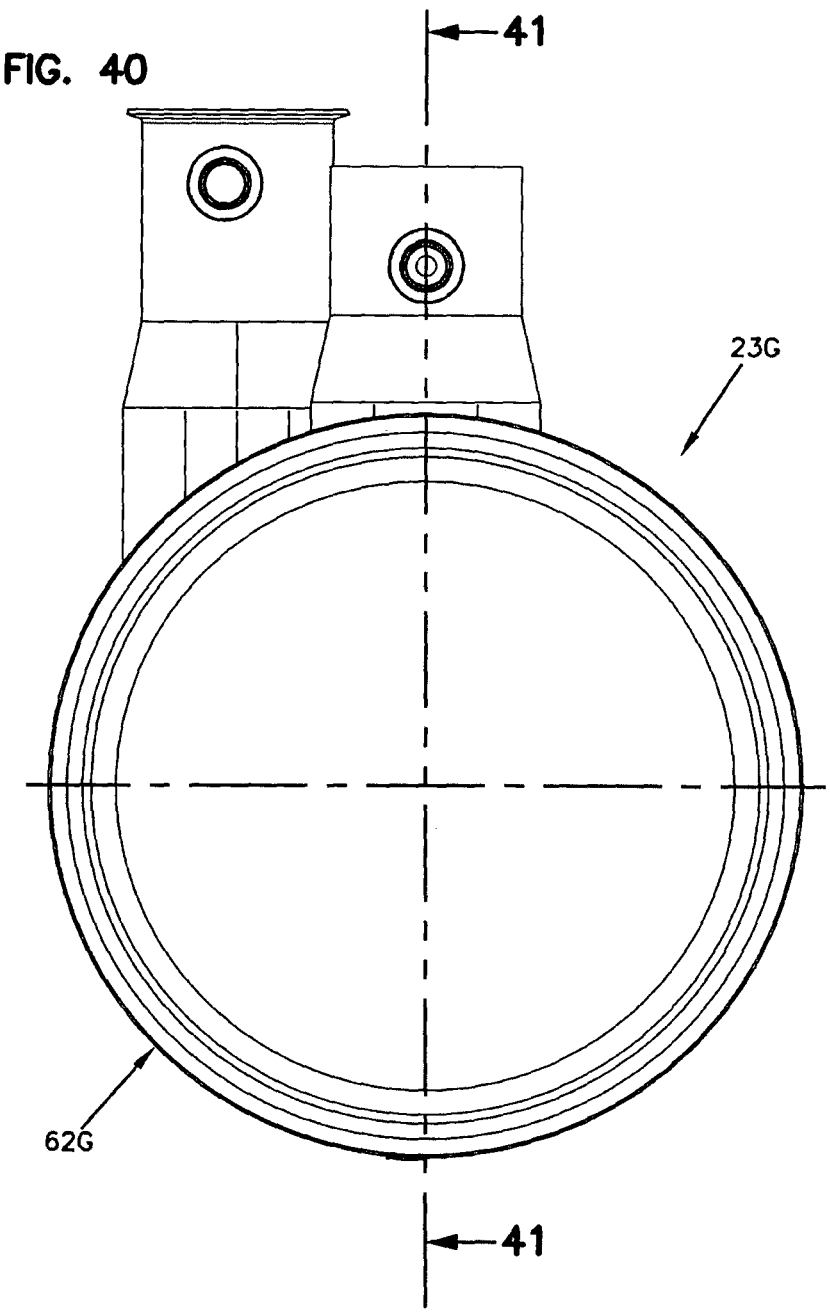
FIG. 40 is an end view of the exhaust treatment device of FIG. 39.
Figure 41:
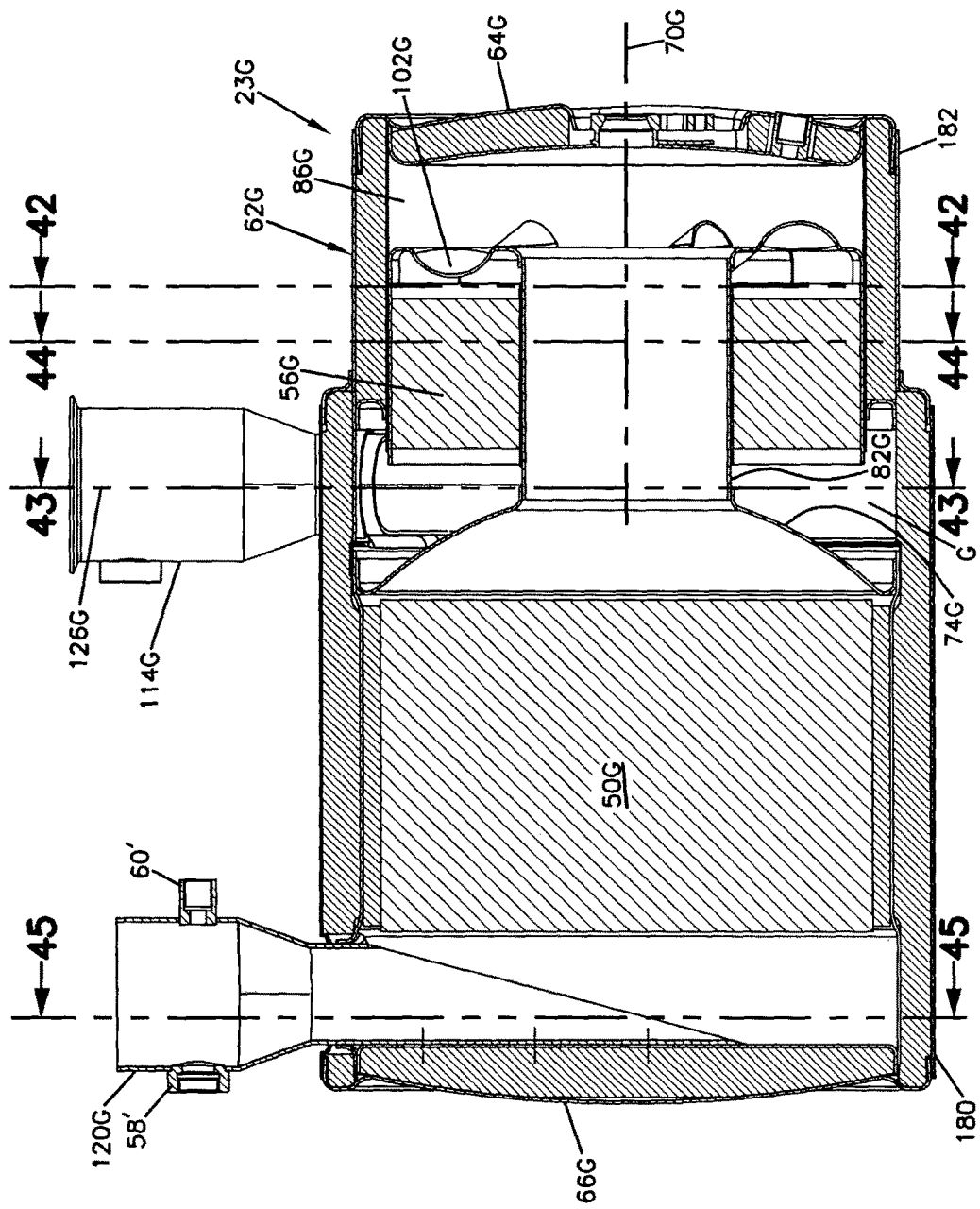
FIG. 41 is a cross-sectional view taken along section line 41-41 of FIG. 40.
Figure 42:
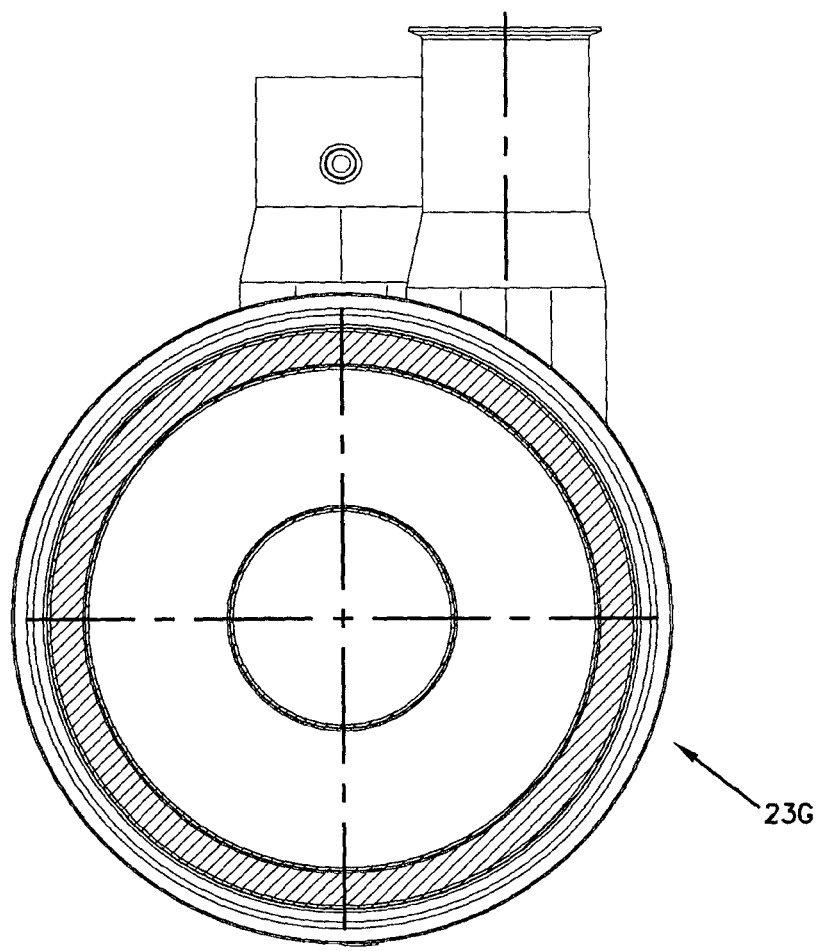
FIG. 42 is a cross-sectional view taken along section line 42-42 of FIG. 41.
Figure 43:
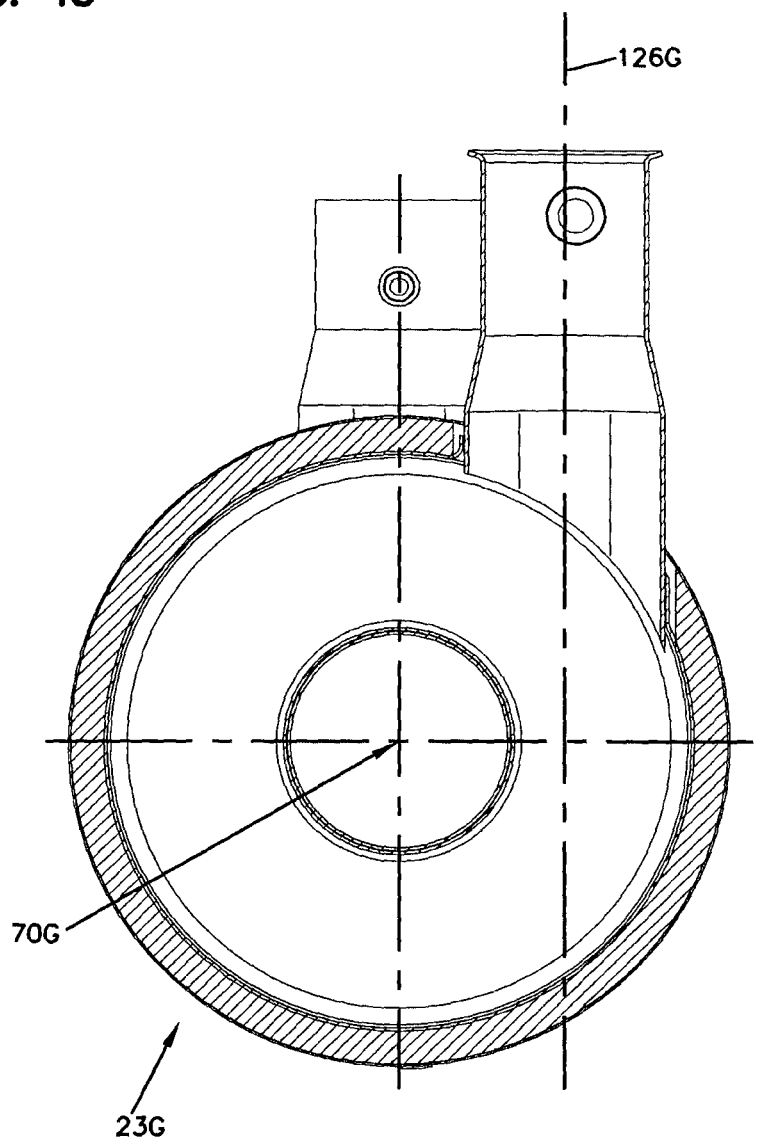
FIG. 43 is a cross-sectional view taken along section line 43-43 of FIG. 41.
Figure 44:
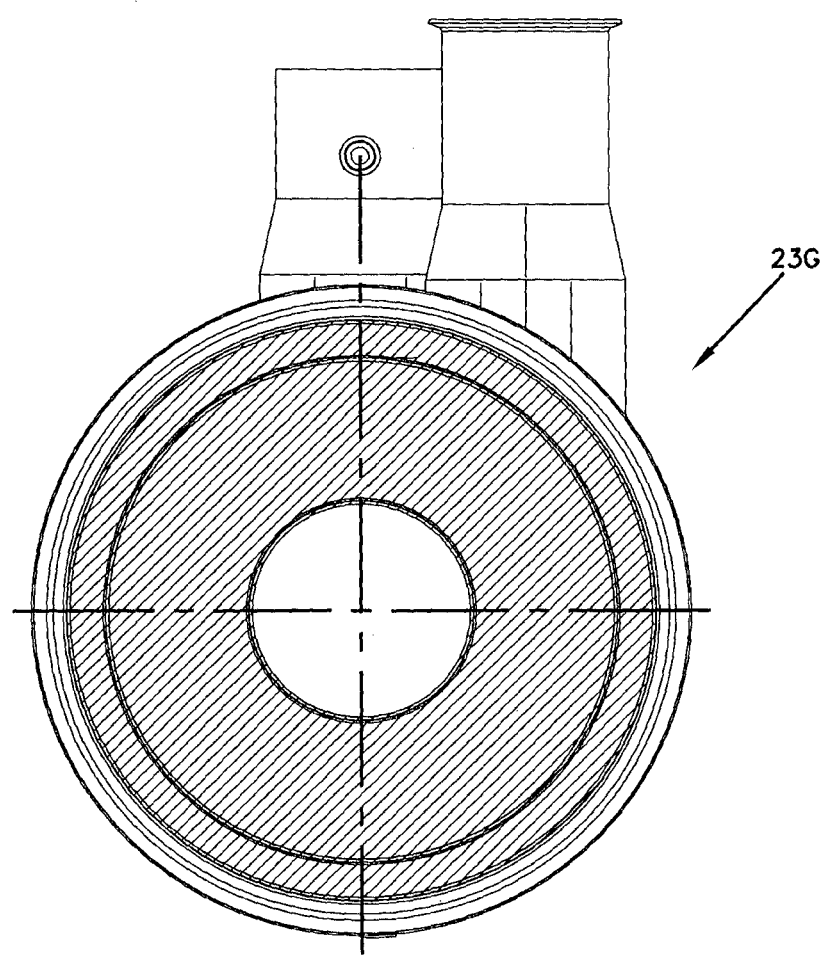
FIG. 44 is a cross-sectional view taken along section line 44-44 of FIG. 41.
Figure 45:
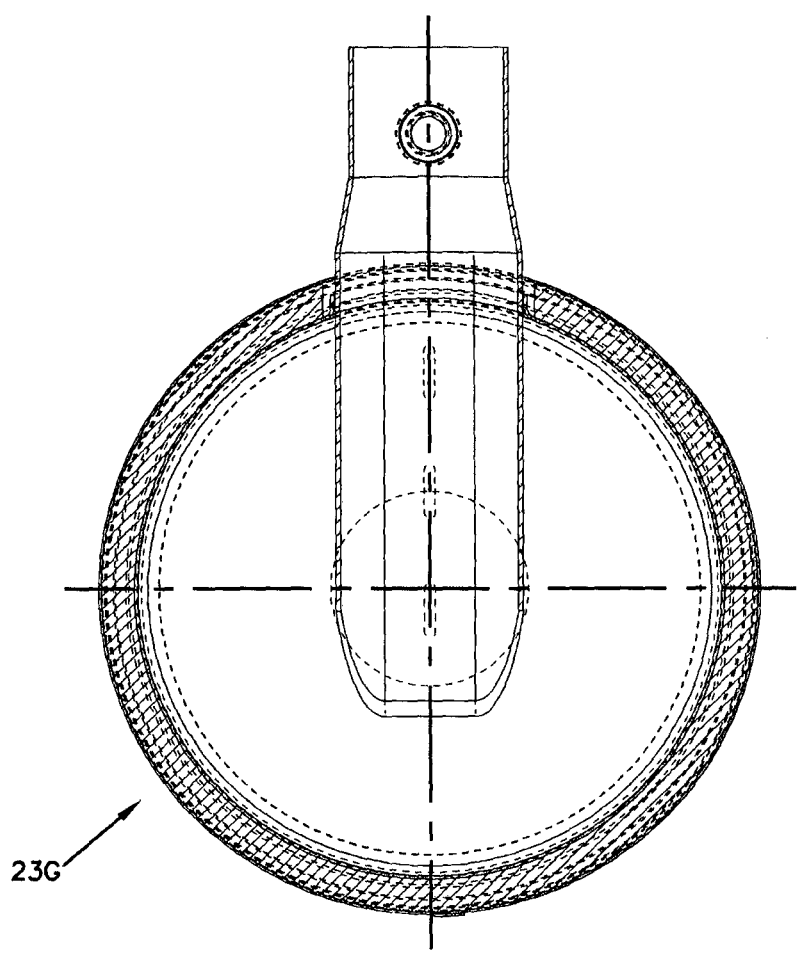
FIG. 45 is a cross-sectional view taken along section line 45-45 of FIG. 41.

FIGS. 25-32 illustrate a sixth exhaust treatment device 23E in accordance with the principles of the present disclosure. The exhaust treatment device 23E is similar in many respects with respect to the previously described embodiments. However, the exhaust treatment device includes a divider wall 74E that provides a gradual diameter transition from an end of an inner conduit 82E to an upstream face 104E of a $NO_x$ treatment substrate 50E. Also, the exhaust treatment device 23E includes an inlet pipe 114E having a bent or angled configuration. The inlet pipe 114E is mounted at an axial location that only partially overlaps an exhausts treatment substrate 54E of the exhaust treatment device 23E. Additionally, the exhaust treatment device 23E includes an outlet pipe 120E that is angled relative to a side wall 68E of the exhaust treatment device 23E and that is reinforced by a reinforcing bracket 150E (FIGS. 28 and 32). The outlet pipe 120E has an outer end that is tapered and segmented. A generally rectangular mounting flange 154 is used to secure the outlet pipe 120E to a side wall 68E of an outer housing 62E of the exhaust treatment device 23E.

FIGS. 33-38 illustrate a seventh exhaust treatment device 23F in accordance with the principles of the present disclosure. The exhaust treatment device 23F has many of the same features described in the previous embodiments. However, the exhaust treatment device 23F includes a structure for enhancing the mixing volume through which the exhaust must pass before reaching an upstream face 104F of a $NO_x$ treatment substrate 50F. For example, the exhaust treatment device includes a divider wall 74F attached to an end 83F of an inner conduit 82F defining a mixing passage 84F. A baffle plate 160 is mounted downstream of the divider wall 74F. The baffle wall 160 diverts flow from the mixing passage 84F radially outwardly toward a serpentine passage arrangement 162. As used herein, "serpentine passage" means a path that doubles back on itself at least once. The serpentine passage arrangement 162 includes an outer annular passage 163 that extends from the baffle 160 toward a second end wall 66F of the exhaust treatment device 23F. The outer annular passage 163 is defined in part by a cylindrical wall 164. The cylindrical wall 164 defines a plurality of openings 165 that provide fluid communication between the outer passage 163 and an inner passage 166. An end wall 168 blocks the ends of the passages 163, 166 to prevent flow from bypassing the $NO_x$ treatment substrate 50F.

As shown by flow path FPF, in use, exhaust flow exiting the inner conduit 82F is directed by the baffle 160 radiating outwardly to the outer passage 163. Flow proceeds along the outer passage 163 toward the second end wall 66F. Flow then proceeds through the openings 165 into the inner passage 166. Once within the inner passage 166, the flow proceeds back toward a first end wall 64F of the exhaust treatment device 23F. Upon exiting the inner passage 166, the exhaust flow enters the $NO_x$ treatment substrate 50F through an upstream face 104F of the $NO_x$ treatment substrate 50F. The flow then proceeds through the $NO_x$ treatment substrate 50F and subsequently exits the exhaust treatment device 23F through an outlet pipe 120F.

FIGS. 39-45 show an eighth exhaust treatment device 23G in accordance with the principles of the present disclosure. The exhaust treatment device 23G has many of the same features described with respect to previous embodiments. However, unlike the previous embodiments, the device 23G has an outer housing 62G has a stepped configuration including an enlarged diameter portion 180 and a reduced diameter portion 182. Inlet and outlet pipes 114G and 120G are mounted through the enlarged diameter portion 180. A first end wall 64G is mounted to the reduced diameter portion 182 and a second end wall 66G is mounted to the enlarged diameter portion 180. A doser mounting location is provided at the first end wall 64G. An exhaust treatment substrate 56G, an inner conduit 82G and a swirl structure 102G are mounted within the reduced diameter portion 182. Similarly, a swirl chamber 86G is provided within the reduced diameter portion 182. A $NO_x$ treatment substrate 50G is mounted within the enlarged diameter portion 180. The outlet pipe 120G has a radial configuration and projects laterally outwardly from the enlarged diameter portion 180. A central axis of the outlet pipe 120G intersects a longitudinal centerline 70G of the exhaust treatment device 23G. The inlet pipe 114G has a tangential configuration. A centerline 126G of the inlet pipe 114G is laterally offset from the central longitudinal axis 70G of the exhaust treatment device 23G. The centerline 126G of the inlet pipe 114G does not intersect the exhaust treatment substrate 56G or an inner conduit 82G of the exhaust treatment device 23G. The inlet pipe 114G is mounted at a location that partially axially overlaps the exhaust treatment substrate 56G. The centerline of the inlet pipe 114G intersects a gap G defined between the exhaust treatment substrate 56G and the divider wall 74G.

Figure 46:
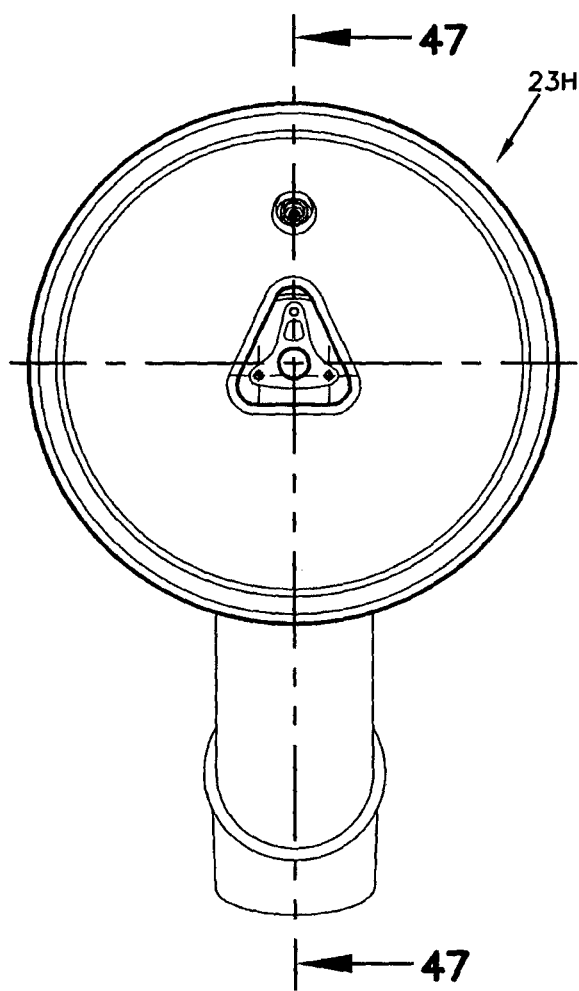
FIG. 46 is an end view of a ninth exhaust treatment device in accordance with the principles of the present disclosure.
Figure 47:
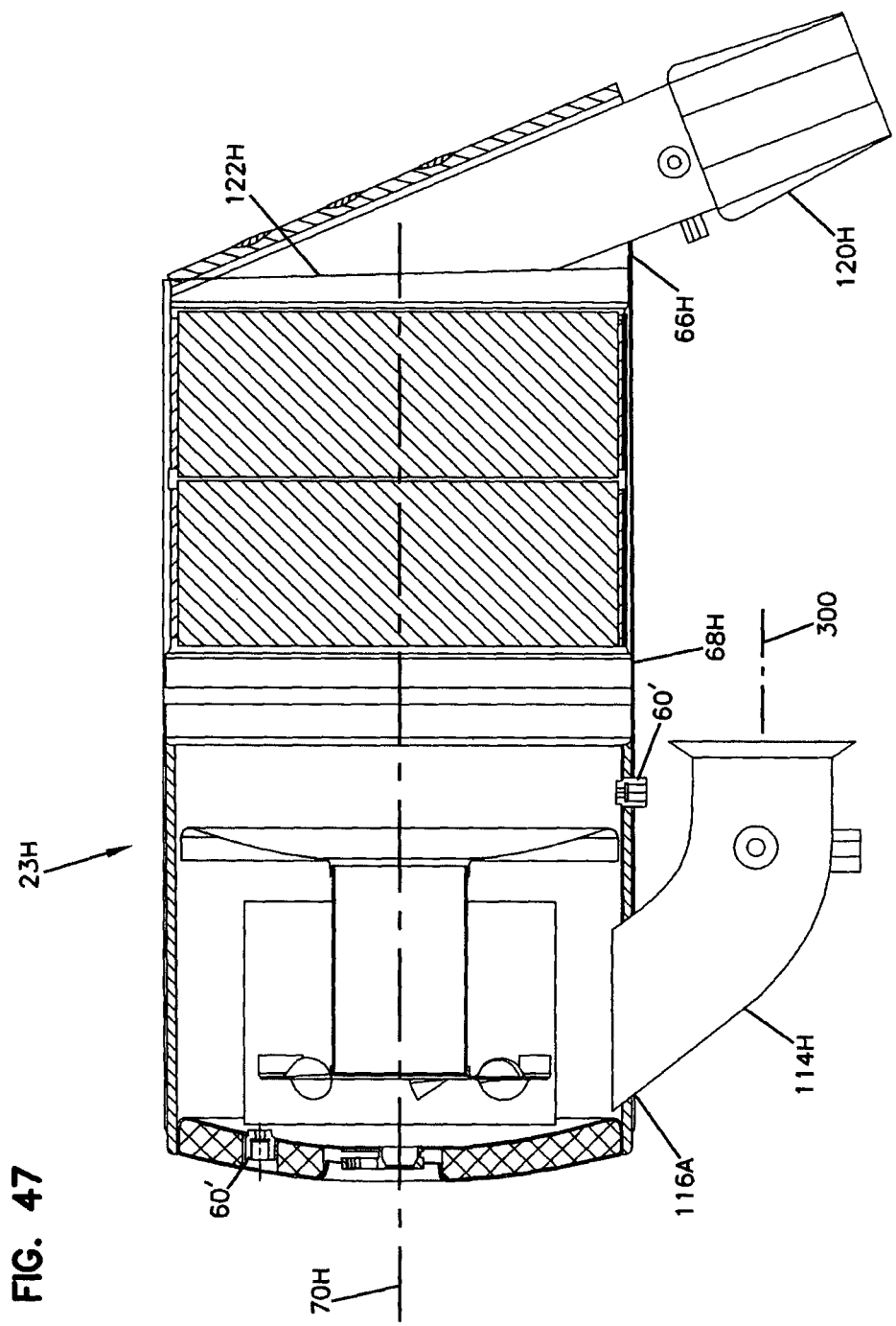
FIG. 47 is a cross-sectional view taken along section line 47-47 of FIG. 46.

FIGS. 46 and 47 show a ninth exhaust treatment device 23H in accordance with the principles of the present disclosure. The exhaust treatment device 23H has many of the same features and structures described with respect to previous embodiments. However, the exhaust treatment device 23H includes an inlet pipe 114H having an inner end 116A that is angled relative to a side wall 68H of the exhaust treatment device 23H. The inlet pipe 114H also is bent such that an outer end of the inlet pipe 114H defines an axis 300 that is parallel to a central longitudinal axis 70H of the exhaust treatment device 23H. Exhaust treatment device 23H also includes an outlet pipe 120H mounted to a second end wall 66H of the exhaust treatment device 23H. The outlet pipe 120H has a mitered inner end 122H attached to the second end wall 66H. Additionally, the outlet pipe 120H is straight and defines a centerline that is angled relative to the second end wall 66H.

Figure 48:
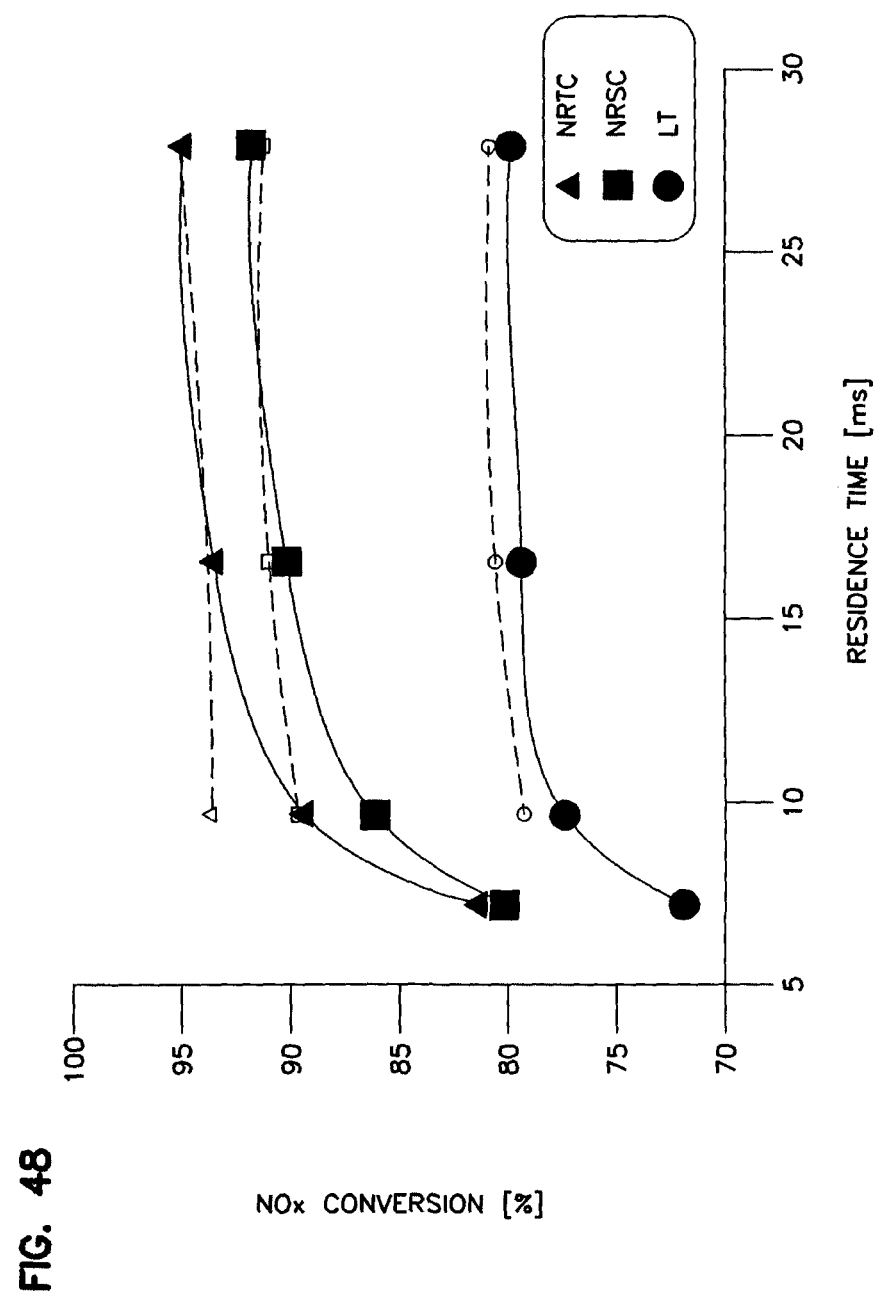
FIG. 48 is a graph showing relationships between mixing volume, degrees of turbulence and $NO_x$ conversion efficiency.

It has been determined that the $NO_x$ conversion efficiency at the $NO_x$ treatment substrate is dependent on the level of mixing/turbulence (e.g., swirl rate) and the mixing volume defined between the dispenser mounting location and the upstream face of the $NO_x$ treatment substrate. In this regard, increased turbulence rates provide improved $NO_x$ conversion at the $NO_x$ treatment substrate. Also, larger mixing volumes and/or residence times (mixing volume/rated flow) also provide improved $NO_x$ conversion at the $NO_x$ treatment substrate. FIG. 48 is a graph that demonstrates this relationship. The solid lines correspond to normal turbulence (e.g., swirl) and the dashed lines correspond to increased turbulence (e.g., swirl). The test data is for a 6.6 L heavy duty diesel engine used on a treatment system having a DOC positioned upstream from the mixing volume and the $NO_x$ treatment substrate. NRSC represents the Non Road Stationary Cycle testing protocol. NRTC represents the Non Road Transient Cycle testing protocol. LT represents four low temperature modes at 230-250 degrees Celsius.

Figure 49:
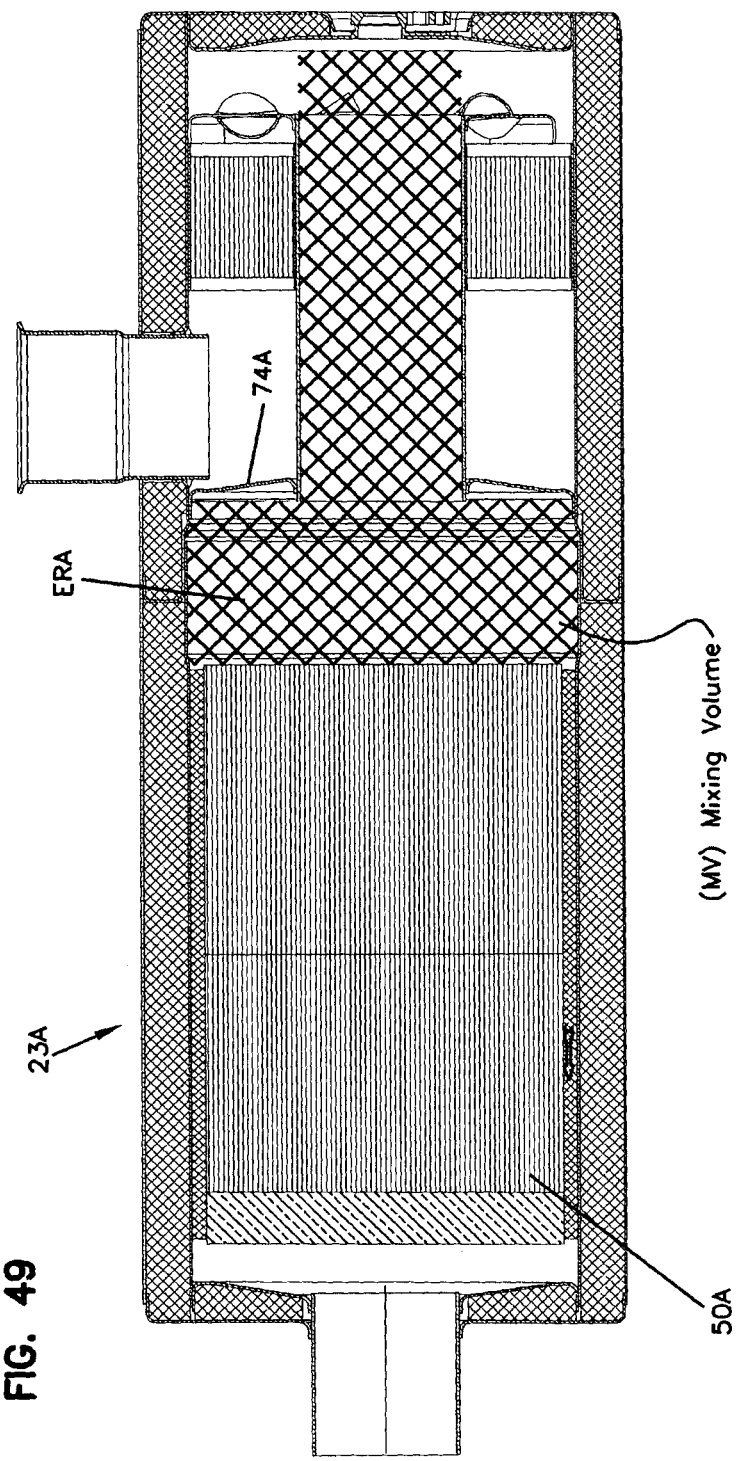
FIG. 49 shows a mixing volume and expansion region of the embodiment of FIG. 11.

It will be appreciated that embodiments of the present disclosure provide compact arrangements that also have aggressive mixing/turbulence/swirling structures and relatively large mixing volumes/residence times. For example, FIG. 49 shows a mixing volume MV for the exhaust treatment device 23A of FIG. 11. As shown at FIG. 49, an expansion region ERA between the divider plate 74A and the $NO_x$ treatment substrate 50A greatly increases the mixing volume MV without adding a significant amount to the overall length of the exhaust treatment device 23A. By using supplemental mixers of the type shown at FIGS. 8 and 9, the volume corresponding to the expansion region ERA can even more effectively be used. Additionally, mixing volume extenders of the type shown in the embodiment of FIG. 35 can further enlarge the mixing volume so as to improve $NO_x$ conversion efficiencies at the $NO_x$ treatment substrate.

Figure 50:
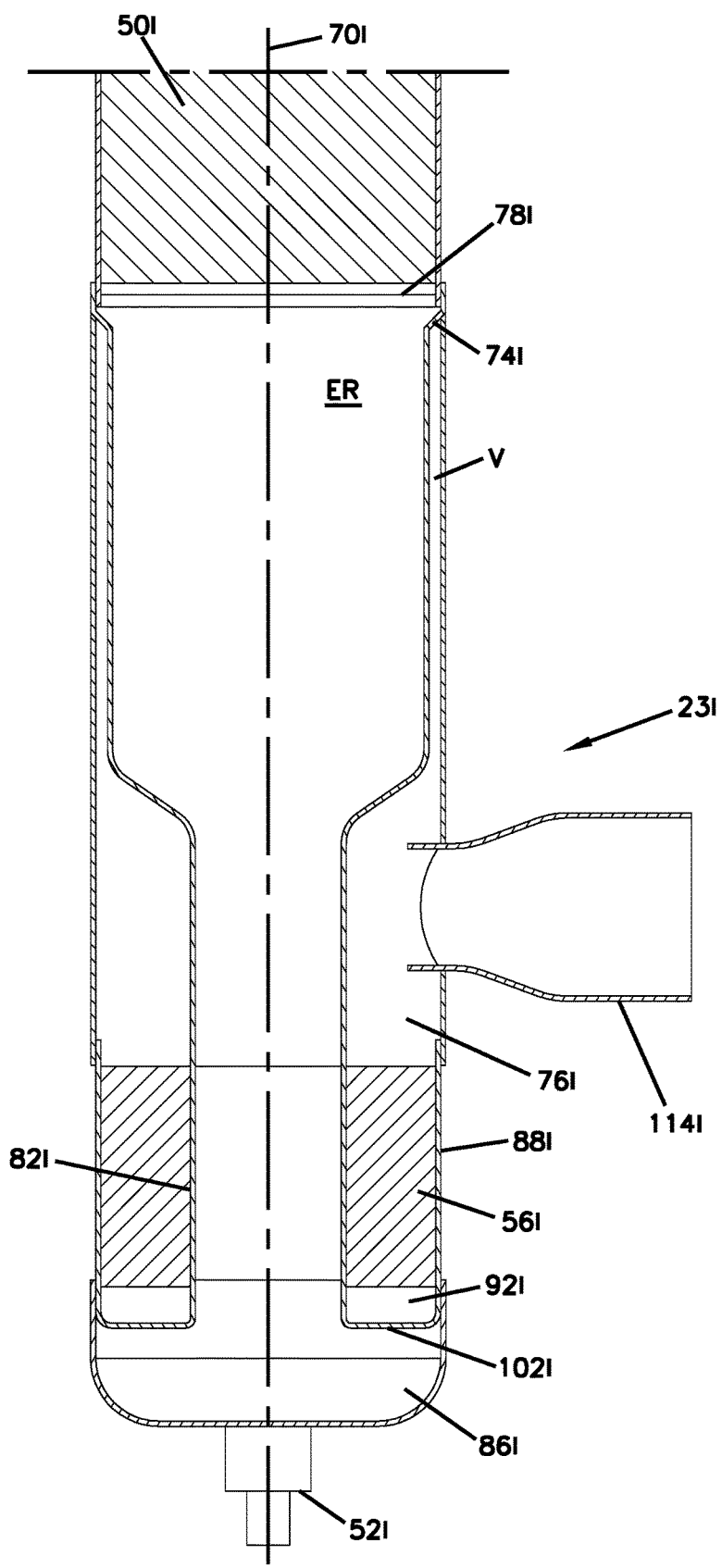
FIG. 50 is a tenth exhaust treatment device in accordance with the principles of the present disclosure.

FIG. 50 shows a tenth exhaust treatment device 23I in accordance with the principles of the present disclosure. The exhaust treatment device 23I has many of the same features and structures described with respect to previous embodiments. The device 23I includes a first region 76I separated from a second region 78I by a divider 74I. A ring-shaped exhaust passage 92I is defined between an inner conduit 82I and an outer conduit 88I. A first portion of the inner conduit 82I provides fluid communication between a swirl chamber 86I and an expansion region ER defined within a second portion of the inner conduit 82I. A $NO_x$ treatment substrate 50I is positioned downstream from the expansion region ER and a reactant dispenser 52I (i.e., a doser, injector, sprayer, nozzle, etc.) is adapted to inject a reactant into the exhaust treatment device 23I upstream from the expansion region ER. An optional substrate 56I (e.g., a DOC or flow-through filter) is positioned within the passage 92I. The first region 76I includes a volume V defined radially between the expansion region ER and the outer conduit 88I. The volume V surrounds the expansion region ER and extends to the divider 74I. The volume V is ring shaped (e.g., circular ring or oblong ring). Relatively hot exhaust enters the first region 76I through an inlet pipe 114I and a portion of the hot exhaust occupies the volume V thereby heating the wall of the expansion region ER to a temperature where reactant is inhibited from depositing (i.e., forming a liquid film) on the inner surface of the wall defining the expansion region ER. The exhaust flows from the first region 76I through the exhaust passage 92I and is swirled within the swirl chamber 86I by a swirl structure 102I. Within the swirl chamber 86I, the flow swirls about a central axis 70I of the device and concurrently is reversed in direction (e.g., turned about 180 degrees) so as to be directed into the inner conduit 82I. The dispenser 52I directs reactant into and through the swirl chamber 86I in a direction toward the inner conduit 82I. The reactant mixes with the exhaust as the exhaust swirls within the inner conduit 82I and the expansion region ER before reaching the $NO_x$ treatment substrate. As described above, the wall of the expansion region ER is heated by the volume V to inhibit reactant from being deposited thereon.

Figure 51:
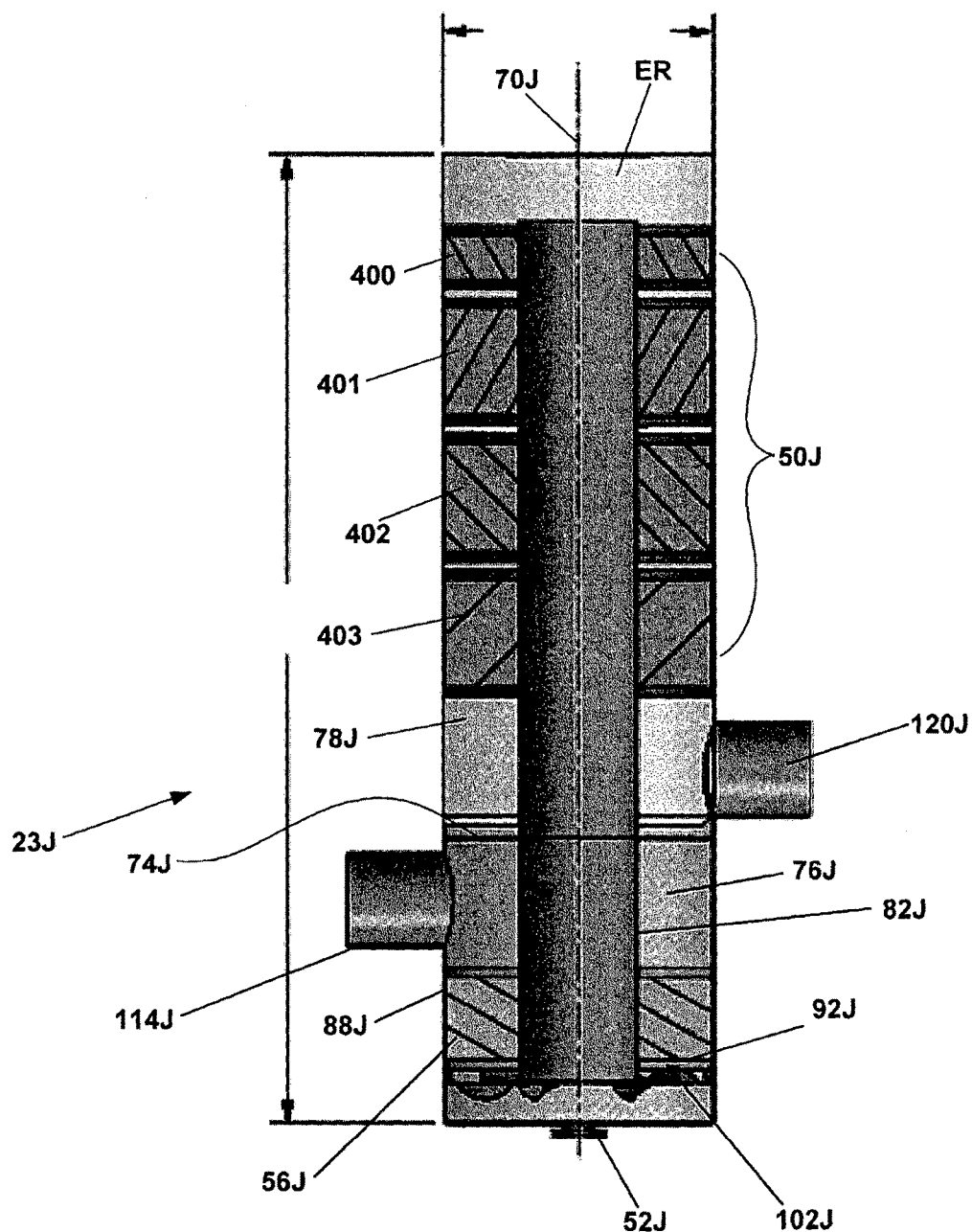
FIG. 51 is an eleventh exhaust treatment device in accordance with the principles of the present disclosure.

FIG. 51 shows an eleventh exhaust treatment device 23J in accordance with the principles of the present disclosure. The exhaust treatment device 23J has many of the same features and structures described with respect to previous embodiments. The device 23J includes a first region 76J separated from a second region 78J by a divider 74J. A ring-shaped exhaust passage 92J is defined between an inner conduit 82J and an outer conduit 88J. The inner conduit 82J provides fluid communication between a swirl chamber 86J and an expansion region ER. An exhaust treatment substrate arrangement 50J is positioned downstream from the expansion region ER and a reactant dispenser 52J (i.e., a doser, injector, sprayer, nozzle, etc.) is adapter to inject a reactant into the exhaust treatment device 23J upstream from the expansion region ER. The exhaust treatment substrate arrangement can include a plurality of substrates positioned in series. The substrates can include exhaust treatment media that are ring-shaped (e.g., circular rings or oblong rings) with hollow interiors. In one example, the ring-shaped substrates can include a ring-shaped flow-through filter 400, a ring-shaped DPF 401, a ring-shaped SCR substrate 402 and a ring-shaped DOC 403. The inner conduit 82J extends through the hollow interiors of the ring-shaped substrates 400-403. An optional ring-shaped substrate 56J (e.g., e.g., a DOC or flow-through filter) is positioned within the passage 92J. Relatively hot exhaust enters the first region 76J through an inlet pipe 114J. The exhaust flows from the first region 76I through the exhaust passage 92J and is swirled within the swirl chamber 86J by a swirl structure 102J.

Within the swirl chamber 86J, the flow swirls about a central axis 70J of the device 23J and concurrently is reversed in direction (e.g., turned about 180 degrees) so as to be directed into the inner conduit 82J. The dispenser 52J directs reactant into and through the swirl chamber 86J in a direction toward the inner conduit 82J. The reactant mixes with the exhaust as the exhaust swirls within the inner conduit 82J. The swirling exhaust flows within the inner conduit 82J through the hollow interiors of the substrates 400-403 to the expansion region ER. At the expansion region ER, the flow reverses direction and flows through the substrates 400-403 for treatment. After being treated at the substrates 400-403, the exhaust exits the exhaust treatment device 23J at outlet pipe 120J.

Figure 52:
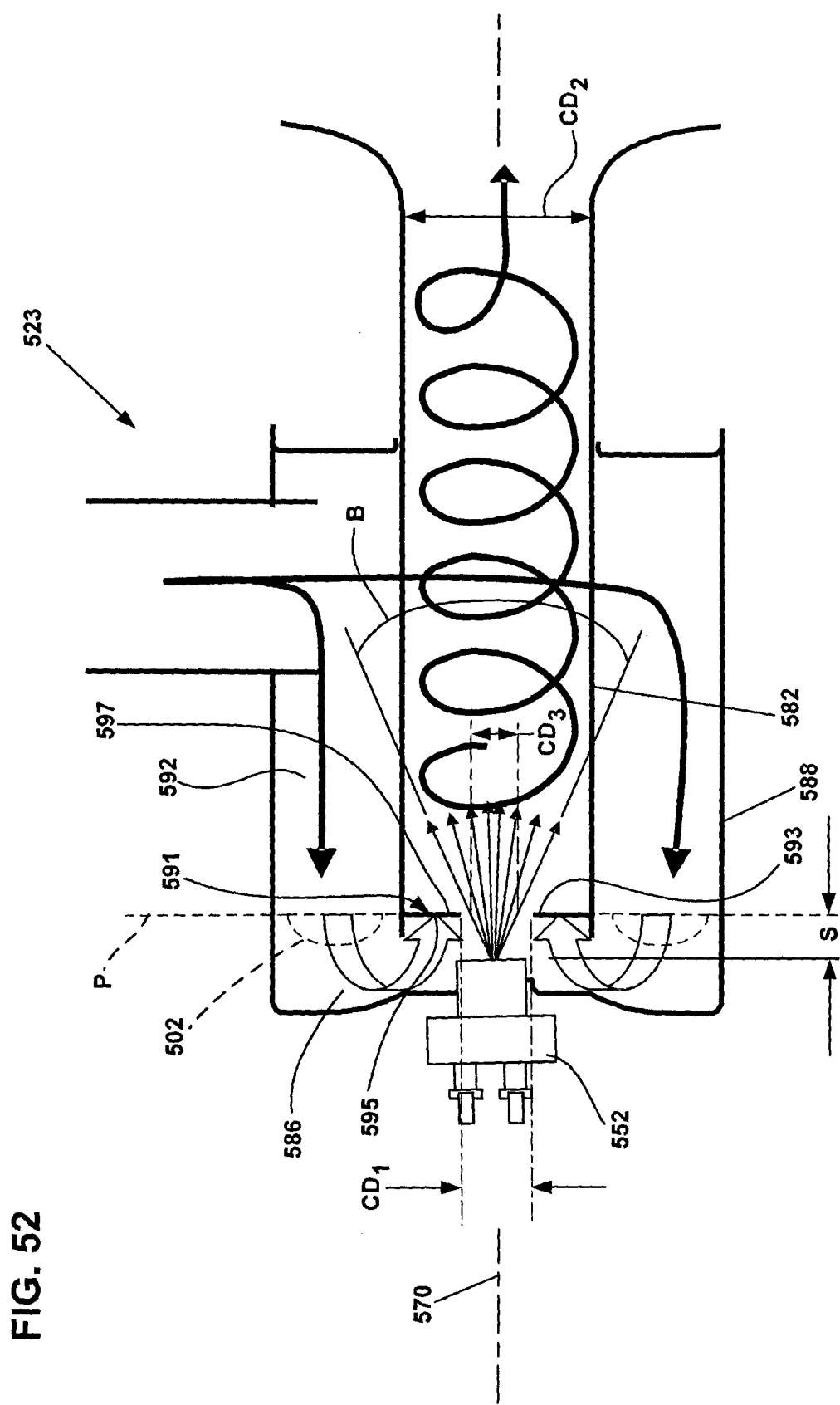
FIG. 52 is shows a mixing arrangement in accordance with the principles of the present disclosure.

FIG. 52 shows a mixing system 523 that can be used with any of the exhaust treatment devices of the present application. The mixing system 523 includes a ring-shaped (e.g., a circular ring or oblong ring) exhaust passage 592 defined between an inner conduit 582 (i.e., a mixing tube) and an outer conduit 588 (e.g., a housing wall). The inner conduit 582 defines a central longitudinal axis 570. A swirl chamber 586 provides fluid communication between the exhaust passage 592 and the interior of the inner conduit 582. A swirl structure 502 of the type previously described can be used to swirl exhaust flow about the axis 570 within the swirl chamber 586. A reactant dispenser 552 is mounted adjacent the swirl chamber 586. In one example, the dispenser 552 is aligned with the axis 570. The dispenser 552 directs reactant into and through the swirl chamber 586 in a direction toward the inner conduit 582. In one example, the dispenser 552 injects reactant is a cone spray pattern having a cone angle B. A swirl concentrator 591 connected to the inner conduit 582. The swirl concentrator 591 is ring-shaped (e.g., a circular ring or oblong ring) and defines a central flow opening 593 having a cross-dimension CD1 (e.g., a diameter) that is smaller than a corresponding cross-dimension CD2 (e.g., an inner diameter) defined by the inner conduit 582. The central flow opening 593 can be aligned with the axis 570 and can be round, oval, oblong, polygonal or have other transverse cross-sectional shapes. The swirl concentrator 591 is depicted as a flat baffle or plate aligned along a plane P. In other examples, the swirl concentrator could be curved. The swirl concentrator 591 has an upstream side 595 and a downstream side 597. The dispenser 552 is positioned and configured to minimize impingement of liquid reactant on the upstream side 595 of the swirl concentrator 591. For example, the cone angle B of the dispenser 552 and the spacing S of the dispenser 552 from the swirl concentrator 591 are selected such that the cross-dimension CD3 of the spray cone at the swirl concentrator 591 is less than or equal to the cross-dimension CD1. Also, the spray cone can be co-axial with the axis 570. Other structures for providing a cross-dimension reduction (e.g., a deformation in the inner conduit, a venture insert, or other structures) can also be used to form the swirl concentrator.

The swirl concentrator 591 enhances mixing by generating turbulence. In certain examples, the reactant spray does not substantially impact the flow concentrator so significant localized wetting does not take place at the upstream side 595 of the flow concentrator 591. In use, larger droplets of reactant spray have sufficient momentum from injection to pass through the swirl chamber 586 and the flow concentrator 591 without getting entrained in the swirling flow within the recirculation zone defined within the swirl chamber 586. Smaller droplets may become entrained in the swirling flow of the swirl chamber 586. However, such droplets are small enough to quickly evaporate without causing deposits or impingement on the flow concentrator 591 in liquid form. The initial swirling is generated prior to the flow concentrator and prior to the point of reactant injection. The reduction in cross-sectional passage area provided by the swirl concentrator 591 amplifies the swirl thereby increasing swirl intensity. The combination of turbulence and increased swirl intensity provides effective localized mixing of the reactant with the exhaust.

In use of the mixing system 523, exhaust flows through the exhaust passage 592 and is swirled within the swirl chamber 586. Within the swirl chamber 586, the flow swirls about the axis 570 and concurrently is reversed in direction (e.g., turned about 180 degrees) so as to be directed into the inner conduit 582 through the swirl concentrator 591. The swirl concentrator 591 generates turbulence and intensifies swirling within inner conduit 582. The dispenser 552 directs reactant into and through the swirl chamber 586 in a direction toward the inner conduit 582. Larger droplets of reactant are carried through the swirl concentrator 591 and mix with the exhaust within the inner conduit 582. Smaller droplets can be vaporized within the swirl chamber 586. From the inner conduit 582, the mixture of exhaust and reactant are carried downstream to an aftertreatment substrate such as a $NO_x$ treatment substrate.

A selective catalytic reduction (SCR) catalyst device is typically used in an exhaust system to remove undesirable gases such as nitrogen oxides (NOx) from the vehicle's emissions. SCR's are capable of converting NOx to nitrogen and oxygen in an oxygen rich environment with the assistance of reactants such as urea or ammonia, which are injected into the exhaust stream upstream of the SCR through the doser 52.

A lean NOx catalyst device is also capable of converting NOx to nitrogen and oxygen. In contrast to SCR's, lean NOx catalysts use hydrocarbons as reducing agents/reactants for conversion of NOx to nitrogen and oxygen. The hydrocarbon is injected into the exhaust stream upstream of the lean NOx catalyst. At the lean NOx catalyst, the NOx reacts with the injected hydrocarbons with the assistance of a catalyst to reduce the NOx to nitrogen and oxygen. While the exhaust treatment system is described as including an SCR, it will be understood that the scope of the present disclosure is not limited to an SCR as there are various catalyst devices, such as those described below, that can be used in accordance with the principles of the present disclosure.

Lean NOx traps use a material such as barium oxide to absorb NOx during lean burn operating conditions. During fuel rich operations, the NOx is desorbed and converted to nitrogen and oxygen by reaction with hydrocarbons in the presence of catalysts (precious metals) within the traps.

Catalytic converters (diesel oxidation catalysts or DOC's) are typically used in an exhaust system to convert undesirable gases such as carbon monoxide and hydrocarbons from a vehicle's exhaust into carbon dioxide and water. DOC's can have a variety of known configurations. Exemplary configurations include substrates defining channels that extend completely therethrough. Exemplary catalytic converter configurations having both corrugated metal and porous ceramic substrates/cores are described in U.S. Pat. No. 5,355,973, which is hereby incorporated by reference in its entirety. The substrates preferably include a catalyst. For example, the substrate can be made of a catalyst, impregnated with a catalyst or coated with a catalyst. Exemplary catalysts include precious metals such as platinum, palladium and rhodium, and other types of components such as base metals or zeolites.

Diesel engine exhaust contains particulate matter, the emission of which is regulated for environmental and health reasons. This particulate matter generally constitutes a soluble organic fraction ("SOF") and a remaining portion of hard carbon. The soluble organic fraction may be partially or wholly removed through oxidation in an oxidation catalyst device such as a catalytic converter; however, this typically results in a reduction of only about 20 percent of total particulate emissions or less.

In one non-limiting embodiment, a catalytic converter can have a cell density of at least 200 cells per square inch, or in the range of 200-400 cells per square inch. A preferred catalyst for a catalytic converter is platinum with a loading level greater than 30 grams/cubic foot of substrate. In other embodiments the precious metal loading level is in the range of 30-100 grams/cubic foot of substrate. In certain embodiments, the catalytic converter can be sized such that in use, the catalytic converter has a space velocity (volumetric flow rate through the DOC/volume of DOC) less than 150,000/hour or in the range of 50,000-150,000/hour.

Flow-through filters partially intercept solid PM particles in exhaust. Some flow-through filters may exhibit a filtration efficiency of 50% or less. Certain flow-through filters do not require all of the exhaust gas traveling through the filter to pass through a filter media having a pore size sufficiently small to trap particulate material. One embodiment of a flow-through filter includes a plurality of flow-through channels that extend longitudinally from the entrance end to the exit end of the flow-through filter. The flow-through filter also includes filter media that is positioned between at least some of the flow-through channels. The filter further includes flow diversion structures that generate turbulence in the flow-through channels. The flow diversion structures also function to divert at least some exhaust flow from one flow-through channel to another flow-through channel. As the exhaust flow is diverted from one flow-through channel to another, the diverted flow passes through the filter media causing some particulate material to be trapped within the filter media. This flow-through-type filter yields moderate filtration efficiencies, typically up to 50% per filter, with relatively low back pressure.

A catalyst coating (e.g., a precious metal coating) can be provided on the flow-through channels of the flow-through filter to promote the oxidation of the soluble organic fraction (SOF) of the particulate matter in the exhaust or to promote the oxidation of certain gases. To enhance to combustion of carbon at the filter media, the filter media can also be coated with a catalyst (e.g., a precious metal such as platinum).

Diesel particulate filters (DPF) are configured to remove particulate material from an exhaust stream by mechanical filtration such that particulate matter (e.g., hard carbon) is collected within the diesel particulate filters. Diesel particulate filters can be catalyzed to foster the oxidation of SOF or other contaminants. Diesel particulate filters typically need to be regenerated through a process where material collected therein is removed through a combustion process. An example diesel particulate reduction device is a wall-flow filter having a monolith ceramic substrate including a "honey-comb" configuration of plugged passages as described in U.S. Pat. No. 4,851,015 that is hereby incorporated by reference in its entirety. Example materials for manufacturing the substrate include cordierite, mullite, alumina, SiC, refractory metal oxides, or other materials conventionally used as catalyzed substrates. Such filters generally have particulate filtration efficiencies greater 75 percent and typically greater than 90 percent.

In many of the above embodiments, a doser is not shown. Instead, generally triangular doser mounting locations are provided at the first end walls of such embodiments. It will be appreciated that in use, dosers are mounted at such locations.

While the exhaust treatment substrate positioned downstream from the mixing arrangement and doser is repeatedly referred to as a $NO_x$ treatment substrate, it will be appreciated that such substrate can also be referred to generally as an "exhaust treatment substrate" since in other embodiments in accordance with the principles of the present disclosure the substrate can be adapted for removing/reducing contaminants other than $NO_x$ and the doser 52 can be adapted for delivering reactants suitable for promoting the removal of such alternative contaminants.

In other embodiments, the exhaust treatment substrate positioned downstream of the doser can include the combination of a DOC positioned upstream from a DPF. In such embodiments, the doser can dispense a reactant such as fuel that is combusted at the DOC thereby generating heat for regenerating the DPF by combusting particulate matter collected on the DPF. Various modifications and alterations of this disclosure will become apparent to those skilled in the art without departing from the scope and spirit of this disclosure, and it should be understood that the scope of this disclosure is not to be unduly limited to the illustrative embodiments set forth herein.

The invention claimed is:

1. An exhaust treatment device comprising:
an outer housing including opposite first and second end walls and a length that extends between the first and second end walls, the outer housing also including a side wall that extends along the length from the first end wall to the second end wall, the outer housing defining an interior space;
a divider wall within the interior space of the outer housing, the divider wall being positioned at an intermediate location along the length of the outer housing, the divider wall separating the interior space of the outer housing into a first region and a second region, the first region being defined between the divider wall and the first end wall and the second region being defined between the divider wall and the second end wall;
a device inlet that is in fluid communication with the first region of the interior space;
a device outlet that is in fluid communication with the second region of the interior space;
an exhaust treatment substrate mounted in the second region of the interior space;
an exhaust treatment and mixing assembly including:
a swirl chamber positioned adjacent to the first end wall of the outer housing;
a mixing passage defined by an inner conduit that extends along the length of the outer housing, the mixing passage providing fluid communication between the swirl chamber and the second region of the interior space;
a swirl concentrator for intensifying swirl within the inner conduit, the swirl concentrator being connected to the inner conduit and defining a flow opening having a cross-dimension CD1 that is smaller than a corresponding cross-dimension CD2 of the inner conduit;
an exhaust passage that surrounds the inner conduit, the exhaust passage being configured to direct exhaust flow into the swirl chamber;

a swirl structure for swirling the exhaust flow directed from the exhaust passage into the swirl chamber; and a dispenser mounting location provided at the first end wall of the outer housing for mounting a dispenser used for dispensing a reactant into the swirl chamber, the dispenser mounting location being upstream of the swirl concentrator.

2. The exhaust treatment device of claim 1, wherein the device inlet is defined through the side wall of the outer housing.

3. The exhaust treatment device of claim 1, wherein the exhaust passage that surrounds the inner conduit has an inlet end spaced from the divider wall by an axial gap.

4. The exhaust treatment device of claim 1, wherein the dispenser is mounted at the dispenser mounting location, the dispenser being configured for dispensing the reactant into the swirl chamber.

5. The exhaust treatment device of claim 4, wherein an upstream face of the treatment substrate is spaced less than 750 millimeters from the dispenser mounting location.

6. The exhaust treatment device of claim 1, wherein the device inlet is provided at an axial position that at least partially axially overlaps inner conduit.

7. The exhaust treatment device of claim 1, wherein the exhaust treatment substrate is a $NO_x$ treatment substrate.

8. The exhaust treatment device of claim 1, wherein the exhaust treatment substrate is ring-shaped and defines a hollow interior, wherein the inner conduit extends through the hollow interior of the exhaust treatment substrate, and wherein exhaust reverses direction after passing through the inner conduit and flows through a media of the exhaust treatment substrate for treatment before reaching the device outlet.

9. The exhaust treatment device of claim 1, wherein the exhaust treatment substrate includes multiple substrates arranged in series.

10. The exhaust treatment device of claim 9, wherein the multiple substrates include at least one filter and at least one SCR substrate.

11. The exhaust treatment device of claim 1, wherein the flow opening is aligned along a central axis of the inner conduit.

12. The exhaust treatment device of claim 1, wherein the swirl concentrator includes a ring-shaped plate that defines the flow opening.

13. The exhaust treatment device of claim 1, wherein the dispenser is mounted at the dispenser mounting location, wherein the swirl concentrator has an upstream side, and wherein the dispenser is positioned and configured to inhibit reactant spray from impinging upon the upstream side of the swirl concentrator.

14. The exhaust treatment device of claim 13, wherein the dispenser sprays the reactant in a spray pattern, wherein the spray pattern is sprayed through the flow opening, and wherein the spray pattern has a diameter at the swirl concentrator that is less than or equal to the cross-dimension CD1.

15. The exhaust treatment device of claim 14, wherein the spray pattern is conical.

16. A mixing arrangement comprising;

a conduit defining a central longitudinal axis;

a swirl structure disposed external of the conduit for swirling exhaust about the central longitudinal axis;

a swirl concentrator disposed within the conduit for intensifying swirl within the conduit, the swirl concentrator defining a flow opening aligned with the central longitudinal axis, the flow opening having a cross-dimension CD1 that is smaller than a corresponding cross-dimension CD2 of a passage of the conduit;

the swirl structure being located upstream from the swirl concentrator; and a reactant dispenser positioned upstream from the swirl concentrator, the reactant dispenser being configured to spray reactant along the central longitudinal axis and through the flow opening, the reactant dispenser being positioned and configured such that the reactant spray does not impinge upon an upstream side of the swirl concentrator.

17. The mixing arrangement of claim 16, wherein the dispenser sprays the reactant in a spray pattern, wherein the spray pattern is sprayed through the flow opening, and wherein the spray pattern has a diameter at the swirl concentrator that is less than or equal to the cross-dimension CD1.

18. The mixing arrangement of claim 17, wherein the spray pattern is conical.

19. The mixing arrangement of claim 16, wherein the conduit extends from a first end to a second end, the first end of the conduit located at the swirl structure and the second end of the conduit being spaced from the swirl structure, wherein the swirl concentrator is disposed towards the first end of the conduit.

\* \* \* \* \*